(12) United States Patent
Gierach

(10) Patent No.: US 10,262,336 B2
(45) Date of Patent: Apr. 16, 2019

(54) NON-CONVERTING PUBLISHER ATTRIBUTION WEIGHTING AND ANALYTICS SERVER AND METHOD

(71) Applicant: Karl Gierach, Irvine, CA (US)

(72) Inventor: Karl Gierach, Irvine, CA (US)

(73) Assignee: ACCELERIZE INC., Newport Beach, CA (US)

( * ) Notice: Subject to any disclaimer, the term of this patent is extended or adjusted under 35 U.S.C. 154(b) by 446 days.

(21) Appl. No.: 15/262,011

(22) Filed: Sep. 12, 2016

(65) Prior Publication Data

US 2018/0075482 A1    Mar. 15, 2018

(51) Int. Cl.
*G06Q 30/00* (2012.01)
*G06Q 30/02* (2012.01)

(52) U.S. Cl.
CPC ..... *G06Q 30/0254* (2013.01); *G06Q 30/0201* (2013.01)

(58) Field of Classification Search
None
See application file for complete search history.

(56) References Cited

U.S. PATENT DOCUMENTS

| | | |
|---|---|---|
| 6,772,129 B2 | 8/2004 | Alvarez et al. |
| 7,130,808 B1 | 10/2006 | Ranka et al. |
| 7,194,425 B2 | 3/2007 | Nyhan et al. |
| 7,739,708 B2 | 6/2010 | Carson et al. |
| 7,937,286 B2 | 5/2011 | Newman et al. |
| 7,949,561 B2 | 5/2011 | Briggs |
| 8,108,254 B2 | 1/2012 | Lin et al. |
| 8,768,766 B2 | 7/2014 | Ellis et al. |

(Continued)

FOREIGN PATENT DOCUMENTS

| | | |
|---|---|---|
| WO | 2011063116 A2 | 5/2011 |
| WO | 2011069073 A1 | 6/2011 |
| WO | 2012102741 A1 | 8/2012 |

OTHER PUBLICATIONS

"Natural Inheritance", 1889 by Francis Galton (266 pages) http://galton.org/books/natural-inheritance/pdf/galton-nat-inh-1up-clean.pdf.

(Continued)

*Primary Examiner* — Alvin L Brown
(74) *Attorney, Agent, or Firm* — Legalforce RAPC Worldwide

(57) ABSTRACT

A method of an attribution server. The method determines publishing channels for advertisements in a marketing campaign to analyze their marketing effectiveness for purchasable items using a processor and a memory of the attribution server. Data points are associated with users. A K-th order attribution model is constructed. Independent and dependent variables of the attribution model are associated with various types of marketing data. An observation matrix and a conversion vector are determined. A regression analysis is performed with refining steps. Insignificant second order cross terms of the attribution model are identified and removed. A modified K-th order attribution model is constructed. Another regression analysis is performed to find optimal model parameters. The attribution server computes attribution scores associated with the publishing channels based on the attribution models and the optimal model parameters from regressions, and communicates the attribution scores to a marketer client through a network upon a request.

20 Claims, 19 Drawing Sheets

(56) References Cited

U.S. PATENT DOCUMENTS

| | | |
|---|---|---|
| 2005/0028188 A1 | 2/2005 | Latona et al. |
| 2005/0149396 A1 | 7/2005 | Horowitz et al. |
| 2006/0026063 A1 | 2/2006 | Collins |
| 2009/0228338 A1 | 9/2009 | Brandman et al. |
| 2011/0246267 A1 | 10/2011 | Williams et al. |
| 2011/0276387 A1 | 11/2011 | Rice, Jr. et al. |
| 2014/0244345 A1 | 8/2014 | Sollis et al. |

OTHER PUBLICATIONS

"Factorization Machines", Data Mining (ICDM), IEEE 10th International Conference; Dec. 13, 2010 by Steffen Rendle (1 page) http://ieeexplore.ieee.org/document/5694074/.

"The Elements of Statistical Learning", Data mining, Inference, and Prediction, Second edition, Aug. 2008, by Trevor Hastie et al. (764 Pages) http://statweb.stanford.edu/~tibs/ElemStatLearn/printings/ESLII_print10.pdf.

"Data-driven Multi-touch Attribution Models" KDD-2011, Aug. 21, 2011 by Xuhui Shao et al. (7 Pages) http://www.turn.com.akadns.net/sites/default/files/whitepapers/TURN_Tech_WP_Data-driven_Muiti-touch_Attribution_Models.pdf.

"An Analysis of Variance Test for Normality (Complete Samples)", Biometrika, (vol. 52, No. 3/4), Dec. 1965, by S. S. Shapiro et al. (22 pages) http://sci2s.ugr.es/keel/pdf/algorithm/articulo/shapiro1965.pdf.

"An Introduction to Data Analysis & Presentation", 2001 by Timothy Shortell (4 pages) http://academic.brooklyn.cuny.edu/soc/courses/712/chap20.html.

PROCESS FLOW 1650A

PROCESS FLOW
1850A

NON-CONVERTING PUBLISHER ATTRIBUTION WEIGHTING AND ANALYTICS SERVER AND METHOD

FIELD OF TECHNOLOGY

This disclosure relates generally to the field of web-based technology to improve advertising attribution, and more particularly, to method of a non-converting publisher attribution weighting and analytics server.

BACKGROUND

Promotion and advertising through the Internet may be performed by a publisher (e.g., search engines, email marketing, social networks, in-app advertisement, and/or other publishing channels). The publisher may charge advertisers based on a responsive action taken by a potential customer on the publisher's electronic platform (e.g., website, app, etc.). For example, the responsive action may be a "click" on the advertisement. The advertiser may be charged based on the number of clicks on the advertisement displayed on the electronic platform (e.g., "click-through advertising").

However, sometimes the potential customer may not purchase a good or service on the electronic platform (or mobile app) of the advertiser within a threshold amount of time. When this happens, the potential customer may be referred to as a "non-converting" customer. In the past, analyzing the behavior of the non-converting customer may not be possible. Furthermore, determining which publishers have the highest frequency of non-converting customers may not be possible. For this reason, the advertiser may unnecessarily spend money on publishers that have a high percentage of non-converting customers because they are unable to determine characteristics needed to exclude those publishers (and users) which do not have a high percentage of non-conversion.

Conversion may also be a point at which a recipient of a marketing message performs a desired action. Conversion may be people responding to a call-to-action. Conversion may be people visiting a website (a publishing channel for advertisements) to take an action the advertiser wants them to take. Opening an email (another publishing channel for advertisements) may be a conversion. Clicking on the call-to-action link inside the email may be another conversion. Going to the landing page and filling out a registration form and/or reading a content may be a conversion. Buying a product may be the ultimate conversion.

An attribution model may be the rule, or set of rules, that determines how credit for sales and/or conversions is assigned to touchpoints and/or other factors in conversion paths. An Attribution Model may be a mechanism that may allow one to place a numerical value on advertising mediums (e.g. aggregators, publishers, publishing channels for advertisements) or individual publishers. The larger the numerical value, the more of an effect that this particular entity may have on conversions within a campaign from a holistic perspective.

Attribution models may analyze impressions, clickstreams, touch points within those clickstreams, a quick succession of clicks, etc. Some attribution models may fail to take statistical behavior of real marketing data into account and/or may fail to exploit powerful regression analysis tools of real marketing data. In addition, many attribution models may fail to consider non-conversions, considering only what might have worked but not what may not work. Many attribution models may fail to consider/ identify the shining stars, poorest performers, and the middle of the road advertising channels.

Marketers may need to plan a marketing campaign within a certain time window with a limited budget. Marketers may need to consider the cost of making and placing advertisements in various marketing channels and/or publishing channels for advertisement (e.g. traditional channels such as sponsorship, billboards, printed matters, posters, newspaper, magazine, television, radio, shopping malls, airport, and new media such as social media, digital and mobile websites, email blast based on certain mailing lists, web-based email platforms such as Gmail™ Hotmail™, Yahoo! Mail™, communication systems such as Google Hangout™, Adobe Connect™, Skype™, Cisco WebEx, Citrix GoToMeeting™, Fuze™, search engines such as Google™ and Bing™, social media such as Facebook™, Twitter™, Whatapps™, Tumblr™, Instagram™, and Snapchat™, content web sites such as YouTube™ and Vimeo™, digital magazines, blogs, games, news pages, special interest web sites, direct sale/reseller web sites, etc.), available time slots and pricing of the marketing channels, the effectiveness of the marketing channels (publishing channels for advertisements) in reaching various segments of targeted customers (e.g. young people with age ranging from 13 to 18 with special interest such as sports or fashion, middle aged male approaching retiring age with retirement needs, or stay-at-home housewife with young children, etc.) and in generating conversions in a certain timing of the year (e.g. Christmas, Thanksgiving, Easter, New Year, Mother's Day, Father's Day, Valentine's Day, Memorial Day, Independence Day, spring break, summer holiday, back-to-school, graduation, etc.) and under certain marketing conditions (NBA Final, NCAA Final, NFL Final, NHL Final, Wimbleton Final, World Cup, Olympic games, Election, etc.).

Marketers may need an attribution model that may assist them in assessing and/or deciding which marketing channels to engage for a marketing campaign. Marketers may need an attribution model that may give unbiased, consistent scores of the publishing channels for advertisements that reflect statistical behavior in past and present data (historical data).

SUMMARY

Disclosed are a method, a device and/or a system of non-converting publisher attribution weighting and analytics server. In one aspect, a method, a device and/or a system of a non-converting publisher attribution weighting and analytics server includes determining 'P' number of publishing channels for advertisements in a first marketing campaign for a set of purchasable items using a processor and a memory communicatively coupled with the processor. Further, the method the device and/or the system monitors a marketing effectiveness of the P publishing channels in generating converted users each with a desirable action and/or a purchase from the set of purchasable items in the first marketing campaign. The marketing effectiveness of the P publishing channels is analyzed using the processor and the memory based on a set of marketing data from a data collection server in a cloud.

The set of marketing data includes 'N1' number of first data points of a set of first marketing data collected in a first marketing condition in the first marketing campaign up to a time T1 and 'N2' number of second data points of a set of second marketing data collected in at least one auxiliary marketing campaign in a second marketing condition related to the first marketing condition. The set of first marketing data and the set of second marketing data are subsets of the set of marketing data.

Further, the method determines whether a particular data point among the N1 first data points is associated with a user. The particular data point is a set including a conversion value associated with the user. The conversion value is based on the desirable action, a first related action related to the desirable action, a second related action related to the purchase, an amount of the purchase, and/or an amount of gained units of the purchase and/or a profit of the purchase. In addition, the conversion value is non-negative and/or the conversion value is zero if the user is a non-converted user without a desirable action and/or a purchase from the set of purchasable items.

The set of the particular data point also includes 'R' number of types of marketing data associated with the user for each of the P publishing channels such that 'T' number of numerical quantities associated with the user are generated. T is not greater than a multiplicative product of P and R. Further, the method constructs a 'K'-th order attribution model where K is an integer greater than one. The K-th order attribution model includes 'M' number of independent variables including $X\_1, X\_2 \ldots$ and $X\_M$. In addition, the K-th order attribution model includes a dependent variable $Y\_1$ to be estimated by a linear combination of more than one terms of the M independent variables.

The linear combination of the K-th order estimate of the dependent variable $Y\_1$ includes a zero-th order constant term with a zero-th order model parameter. Further, the K-th order estimate of the dependent variable $Y\_1$ includes M number of first order linear terms, each including one of the M independent variables weighted by one of M number of first order model parameters. Further, the K-th order estimate of dependent variable $Y\_1$ includes $(M)(M-1)/2$ number of second order cross terms each including a first function of two of the M independent variables weighted by one of $(M)(M-1)/2$ number of second order model parameters.

Further, the method associates the M independent variables of the K-th order attribution model with a set of M functions of the T numerical quantities associated with the user associated with the particular data point. The method associates the dependent variable $Y\_1$ of the K-th order attribution model with a second function of the conversion value associated with the user. The method of the non-converting publisher attribution weighting and analytics server determines a first observation matrix X1 of size N×M based on the set of marketing data and the K-th order attribution model, where N=N1+N2.

The N1 rows of the first observation matrix X1 corresponds to the N1 first data points of the set of first marketing data collected in the first marketing condition in the first marketing campaign up to the time T1. The N2 rows of the first observation matrix X1 corresponds to the N2 second data points of the set of second marketing data collected in the at least one auxiliary marketing campaign in the second marketing condition related to the first marketing condition. The M columns of the first observation matrix X1 corresponds to the set of M functions associated with the M independent variables of the K-th order attribution model applied to the T numerical quantities associated with data points of the set of marketing data.

Further, the method determines a first conversion vector Y1 of size N×1 based on the set of marketing data. The N1 elements of the first conversion vector Y1 includes the second function of the conversion values of the N1 first data points of the set of first marketing data collected in the first marketing condition in the first marketing campaign up to the time T1. The N2 elements of the first conversion vector Y1 includes the second function of the conversion values of the N2 second data points of the set of second marketing data collected in the at least one auxiliary marketing campaign in the second marketing condition related to the first marketing condition.

All positive conversion values corresponding to a first set of converted users are not less than a first positive threshold 'TH1'. The first set of converted users are associated with the N1 first data points of the set of first marketing data. All positive conversion values corresponding to a second set of converted users are not less than a second positive threshold 'TH2' where TH2 is not greater than TH1. The second set of converted users is associated with the N2 second data points of the set of second marketing data.

Further, the method performs a first regression analysis based on the first observation matrix X1 and the first conversion vector Y1 to find a first set of optimal model parameters of the K-th order attribution model that best estimate the dependent variable $Y\_1$ by the linear combination of the more than one terms of the M independent variables with respect to a first goodness-of-fit measure. In addition, the method performs at least one refining step to identify a set of insignificant second order cross terms of the K-th order attribution model.

Furthermore, the method constructs a second K-th order attribution model based on the K-th order attribution model with the M independent variables including $X\_1, X\_2 \ldots$ and $X\_M$. In the second K-th order attribution model, the dependent variable $Y\_1$ is also estimated by a linear combination of more than one terms of the M independent variables which include at least zero-th order terms, first order linear terms and second order cross terms. The linear combination includes the zero-th order constant term with the zero-th order model parameter which is identical to the corresponding term in the K-th order attribution model. The linear combination also includes the M first order linear terms each including one of the M independent variables weighted by one of the M first order model parameters, which are identical to the corresponding terms in the K-th order attribution mode. The linear combination further includes the $(M)(M-1)/2$ second order cross terms of the K-th order attribution mode (each cross term including the first function of two of the M independent variables weighted by one of the $(M)(M-1)/2$ second order model parameters) minus the set of insignificant second order cross terms of the K-th order attribution model identified in the at least one refining step. Further, the method constructs a modified second K-th order attribution model by replacing the first function of two of the M independent variables in the second K-th order attribution model by a third function of two of the M independent variables. The second K-th order attribution model is effectively the K-th order attribution model with the set of insignificant second order cross terms removed. The modified second K-th order attribution model is effectively the K-th order attribution model with the set of insignificant second order cross terms removed and with the first function of the second order cross terms replaced by the third function.

The method further associates the M independent variables of the modified second K-th order attribution model with a second set of M functions of the T numerical quantities associated with the user. In addition, method associates the dependent variable $Y\_1$ of the modified second K-th order attribution model with a fourth function of the conversion value associated with the user.

Further, the method determines a second observation matrix X2 of size N×(M2) based on the set of marketing data, the modified second K-th order attribution model, and the second set of M functions where M2 is not less than M and not also greater than M+(M)(M−1)/2 when K=2. M columns of the M2 columns of the second observation matrix X2 are obtained similar to the M columns of the first observation matrix X1 except that the set of M functions is replaced by the second set of M functions. Each of the M columns of the second observation matrix X2 is obtained by applying one of the second set of M functions to the T numerical values. Each of the remaining (M2−M) of the M2 columns of the second observation matrix X2 corresponds to the second order cross terms of the modified second K-th order attribution model. Each of the (M2-M) columns of the second observation matrix X2 is obtained by applying the third function to two quantities. Each of the two quantities is one of the second set of M functions applied to the T numerical quantities associated with the data points of the set of marketing data.

Further, the method determines a second conversion vector Y2 of size N×1 based on the set of marketing data. The second conversion vector Y2 is obtained similar to the first conversion vector Y1 except that the second function is replaced by the fourth function. The second conversion vector Y2 is obtained by applying the fourth function to the conversion values. In addition, the method performs a second regression analysis, based on the second observation matrix X2 and the second conversion vector Y2 to find a second set of optimal model parameters of the modified second K-th order attribution model that best estimates the dependent variable Y_1 by the linear combination of the more than one terms of the M independent variables with respect to a second goodness-of-fit measure.

In addition, the method computes attribution scores associated with the P publishing channels based on the K-th order attribution model, the modified second K-th order attribution model, the first set of optimal model parameters and the second set of optimal model parameters. Further the method receives a request through a network for the attribution scores associated with the P publishing channels from a marketer client communicatively connected to the processor and the memory through the network. Also, the method communicates the attribution scores associated with the P publishing channels to the marketer client through the network.

The method of the non-converting publisher attribution weighting and analytics server may have N2=0 such that the set of second marketing data collected in the at least one auxiliary marketing campaign in the second marketing condition related to the first marketing condition may be not used. The N2 second data points of the set of second marketing data collected in the at least one auxiliary marketing campaign in the second marketing condition related to the first marketing condition may be chosen according to criteria associated with the first marketing condition of the first marketing campaign, a history of past marketing conditions and/or a relevancy factor of marketing conditions.

The R types of marketing data associated with the user may include a click-stream data type, an impression data type and/or an event data type, each associated with P numerical quantities associated with the user. Each of the P numerical quantities associated with the click-stream data type may be associated with a set of clicks associated with one of the P publishing channels and the user, and may be associated with a set of timings corresponding to the set of clicks. Each of the P numerical quantities associated with the impression data type may be associated with a set of impressions associated with one of the P publishing channels and the user, and may be associated with a set of timings corresponding to the set of impressions. Each of the P numerical quantities associated with the event data type may be associated with a set of enumerated relevant events associated with one of the P publishing channels and the user, and/or may be associated with a set of timings corresponding to the set of enumerated relevant events.

Among the set of M functions of the T numerical quantities associated with the user associated with the M independent variables of the K-th order attribution model, one of the set of M functions may be a particular numerical quantity associated with a particular type of marketing data and/or an aggregation of numerical quantities associated with the particular type of marketing data.

The second function of the conversion value associated with the user (wherein the second function may be associated with the dependent variable Y_1 of the K-th order attribution model) may simply be the conversion value associated with the user. A numerical quantity associated with the user may be set to zero if corresponding type of marketing data of corresponding publishing channel associated with the user is not available.

Elements of the first observation matrix X1 associated with the user and elements of the first conversion vector Y1 associated with the user may be scaled by a scaling factor smaller than one. This may be applied when the particular data point associated with the user is determined to be less reliable. This may be applied so as to reduce the impact of the less reliable data. The scaling factor may be adaptively determined based on a measure of reliability of the particular data point. The first regression analysis and/or the second regression analysis may include an application of a numerical minimization algorithm, a linear regression algorithm, and/or a factorization machine algorithm.

The first goodness-of-fit measure and/or the second goodness-of-fit measure may be a sum of square error, a sum of absolute error, a sum of high order error, a sum of robust error, a weighted sum of square error, a weighted sum of absolute error, a weighted sum of high order error, and/or a weighted sum of robust error. Each robust error may include and/or user square error for error magnitude less than a threshold 'TH5', and/or absolute error for error magnitude greater than the threshold TH5.

The first regression analysis may include an application of the numerical minimization algorithm and the factorization machine algorithm to obtain a factorized matrix V of size M×L, where L may be an integer not greater than M. The at least one refining step may include a first step and a second step to identify the set of insignificant second order cross terms of the K-th order attribution model. The first step may include computing a matrix Q=V*(V^T) of size M×M which may be a matrix multiplication of the factorized matrix V and its matrix transpose. Further, the first step may include computing a row mean rowMean_Q and a row standard deviation rowSD_Q for each row of the matrix Q.

In addition, the first step may include identifying all elements in the row of the matrix Q that may be less than a row-adaptive threshold 'TH3' and may classify them as unimportant, where TH3=rowMean_Q+C*rowSD_Q is the row mean plus A times row standard deviation where C may be greater than 1.

The second step may include, for a second order cross term with two independent variables X_i and X_j, identifying all of 'A' number of data points in which both $X\_i$ and $X\_j$ are collected. Further, the second step may include determining 'B' number of converted users among the A data points in which both $X\_i$ and $X\_j$ are collected. In addition, the second step may also include classifying the second order cross term with the two independent variables $X\_i$ and $X\_j$ as unimportant if a monotonic non-decreasing function of the fraction B/A is less than a threshold 'TH4'. A second order cross term being classified as unimportant by either the first step and/or the second step may be identified as insignificant.

The first function of two of the M independent variables in the second order cross terms of the K-th order attribution model may be the multiplicative product of the two independent variables and/or a Boolean product wherein true is analogous to 1 and false is analogous to 0, and where inputs to the product may be any one of true and false where a numerical quantity associated with the marketing data point is determined to be determined to be true if the value is greater than 0 and false otherwise. The third function (e.g., function takes K variables for the Kth order model) of the M independent variables in the second order cross terms of the modified second K-th order attribution model may be a mean square, a root mean square, an arithmetic mean, a geometric mean and/or a harmonic mean (e.g., function takes K variables for the Kth order model) of the M independent variables.

The attribution score of a publishing channel may be based on selected first order linear terms of the K-th order attribution model associated with the publishing channel, selected first order linear terms of the modified second K-th order attribution model associated with the publishing channel, selected second order cross terms of the K-th order attribution model associated with the publishing channel, and/or selected second order cross terms of the modified second K-th order attribution model associated with the publishing channel.

The method may include receiving another request through the network for conditional attribution scores of the P publishing channels (under a specific condition from the marketer client). The method may further include extracting and deriving a first subset of the N1 first data points of the set of first marketing data and a second subset of the N2 second data points of the set of second marketing data (under the specific condition). The method may include determining a third observation matrix X3 and a third conversion vector Y3 based on the first subset of the N1 first data points and the second subset of the N2 second data points.

The method may include performing a third regression analysis based on the third observation matrix X3 and the third conversion vector Y3 to find a third set of optimal model parameters of the modified second K-th order attribution model (that best estimate the dependent variable $Y\_1$ by the linear combination of the more than one term of the M independent variables with respect to a third goodness-of-fit measure). The method may further include computing the conditional attribution scores of the P publishing channels based on the K-th order attribution model, the second K-th order attribution model, the modified second K-th order attribution model, the first set of optimal model parameters, the second set of optimal model parameters and/or the third set of optimal model parameters. The method may communicate the conditional attribution scores of the P publishing channels to the marketer client through the network.

The method may further include constructing an expanded K-th order attribution model and/or an expanded modified second K-th order attribution model by expanding the K-th order attribution model and/or the modified second K-th order attribution model to include 'S' number of additional independent variables $X\_(M+1) \ldots X\_(M+S)$ and S additional first order linear terms for the S additional independent variables. The method may further include associating the S additional independent variables with a set of S additional functions of the T numerical quantities associated with the user associated with the particular data point.

The method may further include expanding the first observation matrix X1 and/or the second observation matrix X2 by adding S additional columns corresponding to the S additional functions. The method may further include performing the first regression analysis based on an expanded first observation matrix X1 and the first conversion vector Y1 (to find a first set of optimal expanded model parameters of the expanded K-th order attribution model) and/or the second regression analysis based on an expanded second observation matrix X2 and the second conversion vector Y2 to find a second set of optimal expanded model parameters of the expanded modified second K-th order attribution model.

The first goodness-of-fit measure and/or the second goodness-of-fit measure may be the weighted sum of square error, the weighted sum of absolute error, the weighted sum of high order error and/or the weighted robust error measure. Errors corresponding to the N1 first data points may have larger weights than errors corresponding to the N2 second data points in the weighted sum of square error, the weighted sum of absolute error, the weighted sum of high order error, and/or the weighted robust error measure, so that the N1 first data points have larger influence than the N2 second data points in the first regression analysis and/or the second regression analysis.

In another aspect, a method of a non-converting publisher attribution weighting and analytics server includes determining 'P' number of publishing channels for advertisements in a marketing campaign for a set of purchasable items using a processor and a memory communicatively coupled with the processor. Further, the method monitors a marketing effectiveness of the P publishing channels in generating converted users each with a desirable action and/or a purchase from the set of purchasable items in the marketing campaign. The marketing effectiveness of the P publishing channels is analyzed using the processor and the memory based on a set of marketing data from a data collection server in a cloud.

The set of marketing data includes 'N' number of data points of marketing data collected in the marketing campaign. Further, the method includes determining a particular data point among the N data points associated with a user. The particular data point is a set which includes a conversion value based on the desirable action, a first related action related to the desirable action, a second related action related to the purchase, an amount of the purchase, an amount of gained units of the purchase and/or a profit of the purchase. The conversion value is non-negative and the conversion value is zero if the user is a non-converted user without the desirable action and/or the purchase from the set of purchasable items.

The particular data point is a set which includes 'R' number of types of marketing data associated with the user for each of the P publishing channels such that 'T' number of numerical quantities associated with the user are generated. In addition, the method includes constructing a 'K'-th order attribution model where K is an integer greater than one. The K-th order attribution model includes M number of independent variables including $X\_1, X\_2, \ldots$ and $X\_M$. Further, the K-th order attribution model includes a dependent variable $Y\_1$ to be estimated by a linear combination of more than one terms of the independent variables. The linear combination includes a zero-th order constant term with a zero-th order model parameter. The linear combination further includes M number of first order linear terms each being one of the M independent variables weighted by one of M number of first order model parameters. The linear combination further includes $(M)(M-1)/2$ number of second order cross terms each being a first function of two of the M independent variables weighted by one of $(M)(M-1)/2$ number of second order model parameters.

The method associates the M independent variables of the K-th order attribution model with a set of M functions of the T numerical quantities associated with the user associated with the particular data point. Each of the set of M functions is a particular numerical quantity associated with a particular type of marketing data and/or an aggregation of the T numerical quantities associated with the particular type of marketing data.

The method further includes associating the dependent variable $Y\_1$ of the K-th order attribution model with a second function of the conversion value associated with the user. In addition, method further includes determining a first observation matrix X1 of size N×M based on the set of marketing data and the K-th order attribution model. The N rows of the first observation matrix X1 correspond to the N data points of the marketing data collected in the marketing campaign. The M columns of the first observation matrix X1 correspond to the set of M functions associated with the M independent variables of the K-th order attribution model applied to the T numerical quantities associated with the data points of the set of marketing data.

In addition, the method includes determining a first conversion vector Y1 of size N×1, with N elements of the first conversion vector Y1 is the second function of conversion values of the N data points of the marketing data collected in the marketing campaign. All positive conversion values corresponding to a set of converted users associated with the N data points are not less than a positive threshold 'TH1'. The method performs a first regression analysis based on the first observation matrix X1 and the first conversion vector Y1 to find a first set of optimal model parameters of the K-th order attribution model that best estimate the dependent variable $Y\_1$ by the linear combination of the more than one terms of the M independent variables with respect to a first goodness-of-fit measure.

The first regression analysis includes an application of a gradient descent algorithm which is a minimization algorithm and/or a factorization machine algorithm to obtain a factorized matrix V of size M×L, with L being an integer not greater than M. The method performs a first refining step and a second refining step to identify a set of insignificant second order cross terms of the K-th order attribution model.

The first refining step includes, for a second order cross term with two independent variables $X\_i$ and $X\_j$, computing a matrix $Q=V*(V^T)$ of size M×M which is the matrix multiplication of the factorized matrix V and its matrix transpose. The first refining step further includes classifying the second order cross term with the two independent variables $X\_i$ and $X\_j$ as unimportant if the (ij)-th element of matrix Q is less than a 'TH3' percentile in the i-th row of the matrix Q in terms of absolute magnitude. The second refining step includes, for the second order cross term with two independent variables $X\_i$ and $X\_j$, classifying the second order cross term with the two independent variables $X\_i$ and $X\_j$ as unimportant if the percentage of converted users among the data points in which both $X\_i$ and $X\_j$ are collected is smaller than a threshold 'TH4'. Any second order cross term classified as unimportant by the first refining step and/or the second refining step is identified as insignificant.

Further, the method includes constructing a second K-th order attribution model which is the K-th order attribution model minus the set of insignificant second order cross terms identified in the first refining step and the second refining step. In addition, method constructs a modified second K-th order attribution model by replacing the first function of two of the M independent variables in the second K-th order attribution model by a third function of two of the M independent variables. The method associates the M independent variables of the modified second K-th order attribution model with a second set of M functions of the T numerical quantities associated with the user. The method associates the dependent variable $Y\_1$ of the modified second K-th order attribution model with a fourth function of the conversion value associated with the user.

The method determines a second observation matrix X2 of size N×(M2) based on the set of marketing data, the modified second K-th order attribution model, and the second set of M functions, where M2 is not less than M and not greater than $M+(M)(M-1)/2$. M columns of the M2 columns of the second observation matrix X2 correspond to the M columns of the first observation matrix X1 with the set of M functions replaced by the second set of M functions. Each of the remaining (M2−M) columns of the M2 columns of the second observation matrix X2 corresponds to the third function of two through K quantities in the second order cross terms of the modified second K-th order attribution model. Each of the two quantities is one of the second set of M functions applied to the T numerical quantities associated with data points of the set of marketing data.

The method determines a second conversion vector Y2 of size N×1 based on the marketing data. The second conversion vector Y2 is the first conversion vector Y1 with the second function replaced by the fourth function.

Further, the method performs a second regression analysis based on the second observation matrix X2 and the second conversion vector Y2 to find a second set of optimal model parameters of the modified second K-th order attribution model that best estimate the dependent variable $Y\_1$ by the linear combination of the more than one terms of the independent variables with respect to a second goodness-of-fit measure.

Further, the method computes attribution scores associated with the P publishing channels based on the K-th order attribution model, the modified second K-th order attribution model, the first set of optimal model parameters and/or the second set of optimal model parameters.

Yet further, the method receives a request through a network for the attribution scores associated with the P publishing channels from a marketer client communicatively connected to the processor and the memory through the network. In addition, the attribution scores associated with the P publishing channels is communicated to the marketer client through the network.

The method may set each of the T numerical quantities associated with the user to be zero if the corresponding type of marketing data of the user is "not available" and/or "non-existent".

In yet another aspect, a method of a non-converting publisher attribution weighting and analytics server includes determining 'P' number of publishing channels for advertisements in a marketing campaign for a set of purchasable items using a processor and a memory communicatively coupled with the processor. In addition, the method monitors a marketing effectiveness of the P publishing channels in generating converted users each with a desirable action and/or a purchase from the set of purchasable items in the marketing campaign. The marketing effectiveness of the P publishing channels are analyzed using the processor and the memory based on a set of marketing data from a data collection server in a cloud.

The set of marketing data includes 'N' number of data points of marketing data collected in the marketing campaign from time T1 to time T2 (e.g., alternative to [0011] in which marketing data is collected up to time T1).

The method determines that a particular data point among the N data points is associated with a user. The particular data point is a set which includes a conversion value associated with the user based on the desirable action, a first related action related to the desirable action, a second related action related to the purchase, an amount of the purchase, and/or an amount of gained units of the purchase and a profit of the purchase. In addition, the conversion value is non-negative. The conversion value is zero if the user is a non-converted user without the desirable action and/or the purchase from the set of purchasable items.

The particular data point is a set including 'R' number of types of marketing data associated with the user for each of the P publishing channels such that 'T' number of numerical quantities associated with the user are generated. Further, the method constructs a 'K'-th order attribution model where K is an integer greater than one. The K-th order attribution model includes 'M' number of independent variables including $X\_1, X\_2 \ldots$ and $X\_M$. In addition, the K-th order attribution model includes a dependent variable $Y\_1$ to be estimated by a linear combination of more than one term of the M independent variables.

The linear combination includes a zero-th order constant term with a zero-th order model parameter. Further, the linear combination includes M number of first order linear terms each with one of the M independent variables weighted by one of M number of first order model parameters. Further, the linear combination includes $(M)(M-1)/2$ number of second order cross terms each including a first function of two of the M independent variables weighted by one of $(M)(M-1)/2$ number of second order model parameters. The first function of the two independent variables is the multiplication of the two independent variables.

Further, the method associates the M independent variables of the K-th order attribution model with a set of M functions of the T numerical quantities associated with the user associated with the particular data point. Each of the M functions is a particular numerical quantity associated with a particular type of marketing data and a collection of numerical quantities associated with the particular type of marketing data to provide a flexibility to internally perform aggregations and/or other calculations. In addition, the method associates the dependent variable $Y\_1$ of the K-th order attribution model with a second function of the conversion value associated with the user. The second function of the conversion value is the conversion value.

The method further includes determining a first observation matrix X1 of size N×M based on the marketing data and the K-th order attribution model. The N rows of the first observation matrix X1 correspond to the N data points of the marketing data collected in the marketing campaign. The M columns of the first observation matrix X1 correspond to the set of M functions associated with the M independent variables of the K-th order attribution model applied to the T numerical quantities associated with data points of the set of marketing data.

The method further includes determining a first conversion vector Y1 of size N×1, with N elements of the first conversion vector Y1 are conversion values of the N data points of the marketing data collected in the marketing campaign. All positive conversion values corresponding to a set of converted users associated with the N data points are not less than a positive threshold 'TH1'. The method performs a first regression analysis based on the first observation matrix X1 and the first conversion vector Y1 to find a first set of optimal model parameters of the K-th order attribution model that best estimates the dependent variable $Y\_1$ by the linear combination of the more than one terms of the independent variables with respect to a first goodness-of-fit measure.

The first regression analysis includes the application of a gradient descent algorithm which is a minimization algorithm and/or a factorization machine algorithm to obtain a factorized matrix V of size M×L, where L is an integer not greater than M. The method performs at least one refining step to identify a set of insignificant second_order cross terms of the K-th order attribution model. The at least one refining step includes computing a matrix $Q=V*(V^\wedge T)$ of size M×M which is the matrix multiplication of the factorized matrix V and its matrix transpose.

Further, the at least one refining step computes a row mean rowMean_Q and a row standard deviation rowSD_Q for each row of matrix Q. Further, the at least one refining step identifies all elements in the row of matrix Q that are less than a row-adaptive threshold 'TH3' as insignificant, where TH3=rowMean_Q+C*rowSD_Q is the row mean plus C times row standard deviation, where C is greater than 0.0 and less than <3. The at least one refining step to further include, for each of the second order cross term with two independent variables, identifying all of 'A' number of data points in which the two independent variables are collected.

The at least one refining step to further include determining 'B' number of converted users among the A data points in which the two independent variables are collected. The at least one refining step further includes identifying the second order cross term with the two independent variables as insignificant if the fraction B/A is less than a threshold 'TH4'. The method further constructs a second K-th order attribution model which is the K-th order attribution model minus the set of insignificant second order cross terms identified in the first refining step and/or the second refining step.

Further, the method constructs a modified second K-th order attribution model by replacing the first function of two of the M independent variables in the second K-th order attribution model by a third function of two of the M independent variables. The method associates the M independent variables of the modified second K-th order attribution model with a second set of M functions of the T numerical quantities associated with the user. In addition, the method associates the dependent variable $Y\_1$ of the modified second K-th order attribution model with a fourth function of the conversion value associated with the user.

Further, the method determines a second observation matrix X2 of size N×(M2) based on the set of marketing data, the modified second K-th order attribution model, and the second set of M functions, where M2 is not less than M. The M columns of the second observation matrix X2 corresponds to the M columns of the first observation matrix X1 with the set of M functions replaced by the second set of M functions. Each of the remaining (M2−M) columns of the second observation matrix X2 corresponds to one of the second order cross terms of the modified second K-th order attribution model. Each of the remaining (M2−M) column is the third function of two quantities. Each of the two quantities is one of the second set of M functions applied to the T numerical quantities associated with the data points of the set of marketing data.

The method determines a second conversion vector Y2 of size N×1 based on the marketing data. The second conversion vector Y2 is the first conversion vector Y1 with the second function replaced by the fourth function. Further the method performs a second regression analysis based on the second observation matrix X2 and the second conversion vector Y2 to find a second set of optimal model parameters of the modified second K-th order attribution model that best estimates the dependent variable Y_1 by the linear combination of the more than one terms of the independent variables with respect to a second goodness-of-fit measure.

Further, the method computes attribution scores associated with the P publishing channels based on the K-th order attribution model, the modified second K-th order attribution model, the first set of optimal model parameters and the second set of optimal model parameters. Further, the method receives a request through a network for the attribution scores associated with the P publishing channels from a marketer client communicatively connected to the processor and the memory through the network. In addition, the attribution scores associated with the P publishing channels is communicated to the marketer client through the network.

BRIEF DESCRIPTION OF THE FIGURES

The embodiments of this disclosure are illustrated by way of example and not limitation in the figures of the accompanying drawings, in which like references indicate similar elements and in which.

Figure 1:
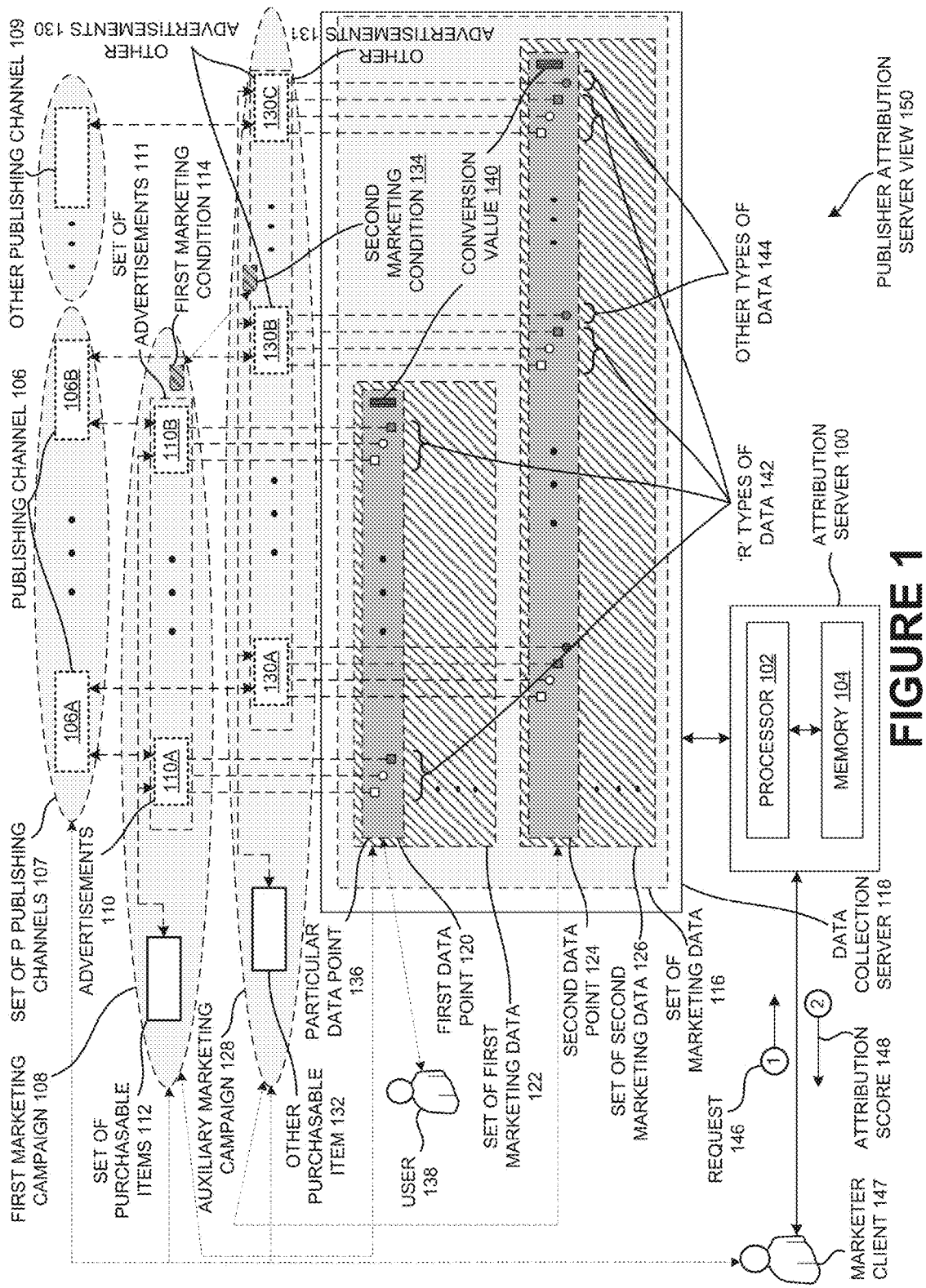
FIG. 1 is a publisher attribution server view illustrating a non-converting publisher attribution weighting and analytics server (e.g., attribution server) computing an attribution score associated with P publishing channels based on a conversion value associated with a user of P publishing channels and communicating it to a marketer client on receiving a request through a network, according to one embodiment.

Other features of the present embodiments will be apparent from accompanying drawings and from the disclosure that follows.

DETAILED DESCRIPTION

Disclosed is a method, a device and/or a system of a non-converting publisher attribution weighting and analytics server. In one embodiment, a method, a device and/or a system of a non-converting publisher attribution weighting and analytics server (e.g. attribution server 100) includes determining 'P' number of publishing channels (e.g. set of 'P' publishing channels 107) for advertisements 110 in a first marketing campaign 108 for a set of purchasable items 112 using a processor 102 and a memory 104 communicatively coupled with the processor 102. Further, the method, the device and/or the system monitor a marketing effectiveness of the P publishing channels (e.g. publishing channel 106) in generating converted users (e.g. converted user 202, a user 138 with a purchase 204 and/or a desirable action 205) each with a desirable action 205 (e.g. a click on a link, a landing on a webpage, a bookmark of a webpage, a repeated visit, a browsing of merchandise webpages, a selection of a purchasable item, a viewing/processing of a shopping basket, a watching of a video, a click of "like" and/or other response buttons on a social media, a download of an item, an installation of an app, a search for related items/services, a check-out procedure, a purchase attempt) and/or a purchase 204 from the set of purchasable items 112 in the first marketing campaign 108. The marketing effectiveness of the P publishing channels (e.g., publishing channel 106) are analyzed using the processor 102 and the memory 104 based on a set of marketing data 116 from a data collection server 118 in a cloud.

The set of marketing data 116 includes 'N1' number of first data points 120 of a set of first marketing data 122 collected in a first marketing condition 114 in the first marketing campaign 108 up to a time T1 (e.g., set of timings 306) and 'N2' number of second data points 124 of a set of second marketing data 126 collected in at least one auxiliary marketing campaign 128 (e.g., past marketing campaigns, recent marketing campaigns, concurrent market campaigns, future marketing campaigns, related marketing campaigns, relevant marketing campaigns, campaigns of similar/related purchasable items, campaigns with similar/related delivery methods, etc.) in a second marketing condition 134 related to the first marketing condition 114. The set of first marketing data 122 and the set of second marketing data 126 are subsets of the set of marketing data 116.

Further the method determines whether a particular data point 136 among the N1 first data points 120 is associated with a user 138, according to one embodiment. The particular data point 136 is a set including a conversion value 140 associated with the user 138. The conversion value is based on the desirable action 205, a first related action related to the desirable action 205, a second related action related to the purchase 204, an amount of the purchase 204, and/or an amount of gained units of the purchase 204 and/or a profit of the purchase 204. In addition, the conversion value 140 is non-negative and/or the conversion value 140 is zero (e.g. zero conversion value 206) if the user 138 is a non-converted user 200 without a desirable action 205 and/or a purchase 204 from the set of purchasable items 112, according to one embodiment.

The set of the particular data point 136 also includes 'R' number of types of marketing data (e.g. 'R' types of data 142) associated with the user 138 for each of the P publishing channels (e.g. publishing channel 106) such that 'T' number of numerical quantities (e.g. set of 'T' numerical values 316) associated with the user 138 are generated. T is not greater than a multiplicative product (e.g. multiplicative product 1100) of P and R. Further the method constructs a 'K'-th order attribution model 410 where K is an integer greater than one. The K-th order attribution model 410 includes 'M' number of independent variables (e.g. set of independent variables 416) including $X\_1$, $X\_2$ . . . and $X\_M$. In addition, the K-th order attribution model 410 includes a dependent variable $Y\_1$ (e.g. dependent variable 414) to be estimated by a linear combination of more than one terms of the M independent variables (e.g. independent variables 418), according to one embodiment.

The linear combination of the K-th order estimate of the dependent variable $Y\_1$ (e.g., dependent variable 414) includes a zero-th order constant term with a zero-th order model parameter 420. Further, the K-th order estimate of the dependent variable $Y\_1$ (e.g., dependent variable 414) includes M number of first order linear terms (e.g., M first order linear terms 422), each including one of the M independent variables (e.g. independent variables 418) weighted by one of M number of first order model parameters 424. Further, K-th order estimate of the dependent variable $Y\_1$ (e.g., dependent variable 414) includes (M)(M−1)/2 number of second order cross terms (e.g., (M)(M−1)/2 second order cross terms 426) each including a first function of two of the M independent variables (e.g., first function of two independent variables 430) weighted by one of (M)(M−1)/2 number of second order model parameters (e.g., second order model parameters 428), according to one embodiment.

Further, the method associates the M independent variables (e.g., independent variables 418) of the K-th order attribution model 410 with a set of M functions 432 of the T numerical quantities (e.g., set of 'T' numerical values 316) associated with the user 138 associated with the particular data point 136. The method associates the dependent variable $Y\_1$ (e.g., dependent variable 414) of the K-th order attribution model 410 with a second function 434 of the conversion value 140 associated with the user 138. The method of the non-converting publisher attribution weighting and analytics server (e.g. attribution server 100) determines a first observation matrix X1 402 of size N×M based on the set of marketing data 116 and the K-th order attribution model 410, where N=N1+N2, according to one embodiment.

The N1 rows of the first observation matrix X1 402 corresponds to the N1 first data points 120 of the set of first marketing data 122 collected in the first marketing condition 114 in the first marketing campaign 108 up to the time T1 (e.g., set of timings 306). The N2 rows of the first observation matrix X1 402 corresponds to the N2 second data points 124 of the set of second marketing data 126 collected in the at least one auxiliary marketing campaign 128 in the second marketing condition 134 related to the first marketing condition 114. The M columns of the first observation matrix X1 402 corresponds to the set of M functions 432 associated with the M independent variables (e.g., independent variables 418) of the K-th order attribution model 410 applied to the T numerical quantities (e.g., set of 'T' numerical values 316) associated with data points (e.g., first data point 120) of the set of marketing data 116, according to one embodiment.

Further, the method determines a first conversion vector Y1 400 of size N×1 based on the set of marketing data 116. The N1 elements of the first conversion vector Y1 400 includes the second function 434 of the conversion values (e.g., conversion value 140) of the N1 first data points 120 of the set of first marketing data 122 collected in the first marketing condition 114 in the first marketing campaign 108 up to the time T1 (e.g., set of timings 306). The N2 elements of the first conversion vector Y1 400 includes the second function 434 of the conversion values (e.g. conversion value 140) of the N2 second data points 124 of the set of second marketing data 126 collected in the at least one auxiliary marketing campaign 128 in the second marketing condition 134 related to the first marketing condition 114, according to one embodiment.

All positive conversion values (e.g. positive conversion value 208) corresponding to a first set of converted users (e.g., converted user 202) are not less than a first positive threshold 'TH1'. The first set of converted users (e.g., converted user 202) is associated with the N1 first data points 120 of the set of first marketing data 122. All positive conversion values (e.g. positive conversion value 208) corresponding to a second set of converted users (e.g., converted user 202) are not less than a second positive threshold 'TH2' where TH2 is not greater than TH1. The second set of converted users (e.g., converted user 202) is associated with the N2 second data points 124 of the set of second marketing data 126, according to one embodiment.

Further, the method performs a first regression analysis 500 based on the first observation matrix X1 402 and the first conversion vector Y1 400 to find a first set of optimal model parameters 504 of the K-th order attribution model 410 that best estimate the dependent variable Y_1 (e.g., dependent variable 414) by the linear combination of the more than one terms of the M independent variables (e.g., set of independent variables 416) with respect to a first goodness-of-fit measure 800. In addition, the method performs at least one refining step 502 to identify a set of insignificant second order cross terms 506 of the K-th order attribution model 410, according to one embodiment.

Furthermore, the method constructs a second K-th order attribution model 605 based on the K-th order attribution model 410 with the M independent variables (e.g., set of independent variables 416) including X_1, X_2 . . . and X_M. In the second K-th order attribution model 410, the dependent variable Y_1 (e.g., dependent variable 414) is also estimated by a linear combination of more than one terms of the M independent variables (e.g., set of independent variables 416) which include at least zero-th order terms, first order linear terms and second order cross terms. The linear combination includes the zero-th order constant term with the zero-th order model parameter 420 which is identical to the corresponding term in the K-th order attribution model. The linear combination also includes the M first order linear terms 422 each including one of the M independent variables (e.g., set of independent variables 416) weighted by one of the M first order model parameters 424, which are identical to the corresponding terms in the K-th order attribution model, according to one embodiment.

The linear combination further includes the (M)(M−1)/2 second order cross terms 426 of the K-th order attribution model (each cross term including the first function of two of the M independent variables (e.g., first function of two independent variables 430) weighted by one of the (M)(M−1)/2 second order model parameters) minus the set of insignificant second order cross terms 506 of the K-th order attribution model 410 identified in the at least one refining step 502). Further, the method constructs a modified second K-th order attribution model 606 by replacing the first function of two of the M independent variables (e.g., first function of two independent variables 430) in the second K-th order attribution model 605 by a third function of two of the M independent variables (e.g., third function of two independent variables 1004). The second K-th order attribution model 606 is effectively the K-th order attribution model 410 with the set of insignificant second order cross terms 506 removed. The modified second K-th order attribution model 606 is effectively the K-th order attribution model 410 with the set of insignificant second order cross terms removed and with the first function of the second order cross terms replaced by the third function, according to one embodiment.

The method further associates the M independent variables (e.g., set of independent variables 416) of the modified second K-th order attribution model 606 with a second set of M functions 1300 of the T numerical quantities (e.g., set of 'T' numerical values 316) associated with the user 138. In addition, method associates the dependent variable Y_1 (e.g., dependent variable 414) of the modified second K-th order attribution model 606 with a fourth function of the conversion value 140 associated with the user 138. Further, the method determines a second observation matrix X2 602 (e.g. second observation matrix X2 1304) of size N×(M2) based on the set of marketing data 116, the modified second K-th order attribution model 606, and the second set of M functions 1300 where M2 is not less than M and not also greater than M+(M)(M−1)/2 when K==2, according to one embodiment.

M columns of the M2 columns of the second observation matrix X2 602 (e.g., second observation matrix X2 1304) are obtained similar to the M columns of the first observation matrix X1 402 except that the set of M functions 432 is replaced by the second set of M functions 1300. Each of the M columns of the second observation matrix X2 602 is obtained by applying one of the second set of M functions to the T numerical values. Each of the remaining (M2−M) of the M2 columns of the second observation matrix X2 602 (e.g., second observation matrix X2 1304) corresponds to the second order cross terms of the modified second K-th order attribution model 606. Each of the (M2−M) columns of the second observation matrix X2 602 is obtained by applying the third function to two quantities (e.g., third function of two independent variables 1004). Each of the two quantities in the second order cross terms of the modified second K-th order attribution model 606 is one of the second set of M functions 1300 applied to the T numerical quantities (e.g. set of 'T' numerical values 316) associated with the data points of the set of marketing data 116, according to one embodiment.

Further, the method determines a second conversion vector Y2 604 of size N×1 based on the set of marketing data 116. The second conversion vector Y2 604 is obtained similar to the first conversion vector Y1 400 except that the second function 434 is replaced by the fourth function 1308. The second conversion vector Y2 604 is obtained by applying the fourth function 1308 to the conversion values 140. In addition, the method performs a second regression analysis 600, based on the second observation matrix X2 602 (e.g., second observation matrix X2 1304) and the second conversion vector Y2 604 to find a second set of optimal model parameters 608 of the modified second K-th order attribution model 606 that best estimates the dependent variable Y_1 (e.g., dependent variable 414) by the linear combination of the more than one terms of the M independent variables (e.g., set of independent variables 416) with respect to a second goodness-of-fit measure 801, according to one embodiment.

In addition, the method computes attribution scores (e.g., attribution score 148) associated with the P publishing channels (e.g., publishing channel 106) based on the K-th order attribution model 410, the modified second K-th order attribution model 606, the first set of optimal model parameters 504 and the second set of optimal model parameters 608. Further the method receives a request 146 through a network for the attribution scores 148 associated with the P publishing channels (e.g., publishing channel 106) from a marketer client 147 communicatively connected to the processor 102 and the memory 104 through the network. Also, the method communicates the attribution scores 148 associated with the P publishing channels (e.g. publishing channel 106) to the marketer client 147 through the network, according to one embodiment. The marketer client 147 may be an advertiser, an event/product/concept/value/belief/opinion promoter, a marketing company, an advertising company, a commercial company, a manufacturer, an importer, a dealer, a distributer, a chain store, a franchise, a distribution/retail network, a for-profit company, a not-for-profit company/organization/entity, an individual, a government unit, a local entity, a foreign entity, an international entity, etc.

The method of the non-converting publisher attribution weighting and analytics server (e.g., attribution server 100) may have N2=0 such that the set of second marketing data 126 collected in the at least one auxiliary marketing campaign 128 in the second marketing condition 134 related to the first marketing condition 114 may be not used. The N2 second data points 124 of the set of second marketing data 126 collected in the at least one auxiliary marketing campaign 128 in the second marketing condition 134 related to the first marketing condition 114 may be chosen according to criteria associated with the first marketing condition 114 of the first marketing campaign 108, a history of past marketing conditions (e.g. first marketing condition 114, second marketing condition 134) and/or a relevancy factor of marketing conditions (e.g. first marketing condition 114, second marketing condition 134), according to one embodiment.

The R types of marketing data (e.g., 'R' types of data 142) associated with the user 138 may include a click-stream data type 302, an impression data type 300 and/or an event data type 304, each associated with P numerical quantities associated with the user 138. Each of the P numerical quantities (e.g., P columns of click stream data 406) associated with the click-stream data type 302 may be associated with a set of clicks (e.g. clicks 303) associated with one of the P publishing channels (e.g., publishing channel 106) the user 138, and may be associated with a set of timings 306 corresponding to the set of clicks (e.g., clicks 303). Each of the P numerical quantities (e.g., P columns of impression data 404) associated with the impression data type 300 may be associated with a set of impressions (e.g., impression data 301) associated with one of the P publishing channels (e.g., publishing channel 106) the user 138, and may be associated with a set of timings 306 corresponding to the set of impressions (e.g., impression data 301), according to one embodiment.

Among the P numerical quantities (e.g., P columns of event data 408) associated with the event data type 304 may be associated with a set of enumerated relevant events (e.g., event 305) associated with one of the P publishing channels (e.g. publishing channel 106) the user 138, and/or a set of timings 306 corresponding to the set of enumerated relevant events (e.g. event 305).

Among the set of M functions 432 of the T numerical quantities (e.g., set of 'T' numerical values 316) associated with the user 138 associated with the M independent variables (e.g. set of independent variables 416) of the K-th order attribution model 410, one of the set of M functions may be a particular numerical quantity (e.g., numerical value 310) associated with a particular type of marketing data (e.g., set of marketing data 116) and/or an aggregation of numerical quantities 312 associated with the particular type of marketing data (e.g., set of marketing data 116), according to one embodiment.

The second function 434 of the conversion value 140 associated with the user 138 (wherein the second function may be associated with the dependent variable Y_1 (e.g., dependent variable 414) of the K-th order attribution model 410) may simply be the conversion value 140 associated with the user 138. A numerical quantity associated with the user 138 may be set to zero if corresponding type of marketing data (e.g., set of marketing data 116) of corresponding publishing channel 106 associated with the user 138 is not available, according to one embodiment.

Elements of the first observation matrix X1 402 associated with the user 138 and elements of the first conversion vector Y1 400 associated with the user 138 may be scaled by a scaling factor smaller than one. This may be applied when the particular data point 136 associated with the user 138 is determined to be less reliable. This may be applied so as to reduce the impact of the less reliable data. The scaling factor may be adaptively determined based on a measure of reliability of the particular data point 136. The first regression analysis 500 and/or the second regression analysis 600 may include an application of a numerical minimization algorithm, a linear regression algorithm, and/or a factorization machine algorithm, according to one embodiment.

The first goodness-of-fit measure 800 and/or the second goodness-of-fit measure 801 may be a sum of square error 802, a sum of absolute error 804, a sum of high order error 806, a sum of robust error 808, a weighted sum of square error 812, a weighted sum of absolute error 814, a weighted sum of high order error 816, and/or a weighted sum of robust error 818. Each robust error may include and/or use square error for error magnitude less than a threshold 'TH5', and/or absolute error for error magnitude greater than the threshold TH5, according to one embodiment.

The first regression analysis 500 may include an application of the numerical minimization algorithm and the factorization machine algorithm to obtain a factorized matrix V of size M×L, where L may be an integer not greater than M. The at least one refining step 502 may include a first step and a second step to identify the set of insignificant second order cross terms 506 of the K-th order attribution model 410. The first step (e.g. refining step 502) may include computing a matrix Q=V*(V^T) of size M×M which may be a matrix multiplication of the factorized matrix V and its matrix transpose. Further, the first step (e.g. refining step 502) may include computing a row mean rowMean_Q and a row standard deviation rowSD_Q for each row of the matrix Q, according to one embodiment.

In addition, the first step (e.g., refining step 502) may include identifying all elements in the row of the matrix Q that may be less than a row-adaptive threshold 'TH3' and may classify them as unimportant, where TH3=rowMean_Q+C*rowSD_Q is the row mean plus A times row standard deviation where C may be greater than 1.

The second step (e.g., refining step 502) may include for a second order cross term with two independent variables X_i and X_j, identifying all of 'A' number of data points (e.g. first data point 120, second data point 124) in which both X_i and X_j are collected, according to one embodiment.

Further, the second step (e.g., refining step 502) may include determining 'B' number of converted users (e.g. converted user 202) among the A data points (e.g., first data point 120, second data point 124) in which both X_i and X_j are collected. In addition, the second step (e.g. refining step 502) may also include classifying the second order cross term with the two independent variables 418 X_i and X_j as unimportant if a monotonic non-decreasing function of the fraction B/A is less than a threshold 'TH4'. A second order cross term being classified as unimportant by either the first step (e.g., refining step 502) and/or the second step (e.g. refining step 502) may be identified as insignificant, according to one embodiment.

The first function of two of the M independent variables (e.g., first function of two independent variables 430) in the second order cross terms of the K-th order attribution model 410 may be the multiplicative product 1100 of the two independent variables 418 and/or a Boolean product wherein true is analogous to value>=1 and false is otherwise analogous to 0, and where inputs to the product may be any one of true and false where a numerical quantity associated with the marketing data point is determined to be any one of greater than and/or less than 0. The third function of two of the M independent variables (e.g., third function of two independent variables 1004) in the second order cross terms of the modified second K-th order attribution model 606 may be a mean square 1102, a root mean square 1104, an arithmetic mean 1106, a geometric mean 1108 and/or a harmonic mean 1110 of the of the M (K (e.g., if it is second order model then it is "two") independent variables (e.g. independent variables 418), according to one embodiment.

The attribution score 148 of a publishing channel 106 may be based on selected first order linear terms (e.g. M first order linear terms 422) of the K-th order attribution model 410 associated with the publishing channel 106, selected first order linear terms (e.g., M first order linear terms 422) of the modified second K-th order attribution model 606 (corresponding to the publishing channel 106), selected second order cross terms of the K-th order attribution model 410 associated with the publishing channel 106, and selected second order cross terms of the modified second K-th order attribution model 606 associated with the publishing channel 106, according to one embodiment.

The method may include receiving another request (e.g. request 146) through the network for conditional attribution scores (e.g. attribution score 148) of the P publishing channels (e.g. publishing channel 106) under a specific condition (e.g. specific marketing condition 1402) from the marketer client 147. The method may further include extracting and deriving a first subset of the N1 first data points 120 of the set of first marketing data 122 and a second subset of the N2 second data points 124 of the set of second marketing data 126 (under the specific condition (e.g. specific marketing condition 1402)). The method may include determining a third observation matrix X3 1406 and a third conversion vector Y3 1305 based on the first subset of the N1 first data points 120 and the second subset of the N2 second data points 124, according to one embodiment.

The method may include performing a third regression analysis 914 based on the third observation matrix X3 1406 and the third conversion vector Y3 1305 to find a third set of optimal model parameters of the modified second K-th order attribution model 606 (that best estimate the dependent variable Y_1 (e.g. dependent variable 414) by the linear combination of the more than one term of the M independent variables (e.g. set of independent variables 416) with respect to a third goodness-of-fit measure 810). The method may further include computing the conditional attribution scores (e.g. attribution score 148) of the P publishing channels (e.g. publishing channel 106) based on the K-th order attribution model 410, the second K-th order attribution model 605, the modified second K-th order attribution model 606, the first set of optimal model parameters 504, the second set of optimal model parameters 608 and/or the third set of optimal model parameters. The method may communicate the conditional attribution scores (e.g. attribution score 148) of the P publishing channels (e.g. publishing channel 106) to the marketer client 147 through the network, according to one embodiment.

The method may further include constructing an expanded K-th order attribution model and/or an expanded modified second K-th order attribution model by expanding the K-th order attribution model 410 and/or the modified second K-th order attribution model 606 to include 'S' number of additional independent variables X_(M+1) . . . X_(M+S) and S additional first order linear terms for the S additional independent variables. The method may further include associating the S additional independent variables with a set of S additional functions of the T numerical quantities (e.g. set of 'T' numerical values 316) associated with the user 138 associated with the particular data point 136, according to one embodiment.

The method may further include expanding the first observation matrix X1 402 and/or the second observation matrix X2 602 (e.g., second observation matrix X2 1304) by adding S additional columns corresponding to the S additional functions. The method may further include performing the first regression analysis 500 based on an expanded first observation matrix X1 and the first conversion vector Y1 400 (to find a first set of optimal expanded model parameters of the expanded K-th order attribution model) and/or the second regression analysis 600 based on an expanded second observation matrix X2 and the second conversion vector Y2 604 (to find a second set of optimal expanded model parameters of the expanded modified second K-th order attribution model 606), according to one embodiment.

The first goodness-of-fit measure 800 and/or the second goodness-of-fit measure 801 may be the weighted sum of square error 812, the weighted sum of absolute error 814, the weighted sum of high order error 816 and/or the weighted robust error measure. Errors corresponding to the N1 first data points 120 may have larger weights than errors corresponding to the N2 second data points 124 in the weighted sum of square error 812, the weighted sum of absolute error 814, the weighted sum of high order error 816, and/or the weighted robust error measure, so that the N1 first data points 120 have larger influence than the N2 second data points 124 in the first regression analysis 500 and/or the second regression analysis 600, according to one embodiment.

In another embodiment, a method of a non-converting publisher attribution weighting and analytics server (e.g., attribution server 100) includes determining 'P' number of publishing channels (e.g. set of 'P' publishing channels 107) for advertisements 110 in a marketing campaign (e.g. first marketing campaign 108, auxiliary marketing campaign 128) for a set of purchasable items 112 using a processor 102 and a memory 104 communicatively coupled with the processor 102. Further, the method monitors a marketing effectiveness of the P publishing channels (e.g. publishing channel 106) in generating converted users (e.g. converted user 202) each with a desirable action 205 and/or a purchase 204 from the set of purchasable items 112 in the first marketing campaign 108. The marketing effectiveness of the P publishing channels (e.g. publishing channel 106) is analyzed using the processor 102 and the memory 104 based on a set of marketing data 116 from a data collection server 118 in a cloud.

The set of marketing data 116 includes 'N' number of data points (e.g., first data point 120, second data points 124) of marketing data (e.g., set of marketing data 116) collected in the marketing campaign (e.g., first marketing campaign 108). Further, the method includes determining a particular data point 136 among the N data points (e.g., first data point 120, second data points 124) associated with a user 138. The particular data point 136 being a set which includes a conversion value 140 based on the desirable action 205, a first related action related to the desirable action 205, a second related action related to the purchase 204, an amount of the purchase 204, an amount of gained units of the purchase 204 and/or a profit of the purchase 204. The conversion value 140 is non-negative. The conversion value 140 is zero (e.g. zero conversion value 206) if the user 138 is a non-converted user 200 without the desirable action 205 and/or the purchase 204 from the set of purchasable items 112, according to one embodiment.

The particular data point 136 is a set which includes 'R' number of types of marketing data (e.g., 'R' types of data 142) associated with the user 138 for each of the P publishing channels (e.g., publishing channel 106) such that 'T' number of numerical quantities (e.g., set of 'T' numerical values 316) associated with the user 138 are generated. In addition, the method includes constructing a 'K'-th order attribution model 410 where K is an integer greater than one. The K-th order attribution model 410 includes M number of independent variables (e.g., set of independent variables 416) including $X\_1, X\_2, \ldots$ and $X\_M$. Further, the K-th order attribution model 410 includes a dependent variable $Y\_1$ (e.g., dependent variable 414) to be estimated by a linear combination of more than one terms of the independent variables (e.g., set of independent variables 416). The linear combination includes a zero-th order constant term with a zero-th order model parameter 420, according to one embodiment.

The linear combination further includes M number of first order linear terms (e.g., M first order linear terms 422) each being one of the M independent variables (e.g. independent variables 418) weighted by one of M number of first order model parameters 424. The linear combination further includes (M)(M−1)/2 number of second order cross terms (e.g., (M)(M−1)/2 second order cross terms 426) each being a first function of two of the M independent variables (e.g., first function of two independent variables 430) weighted by one of (M)(M−1)/2 number of second order model parameters (e.g., second order model parameters 428).

The method associates the M independent variables 418 of the K-th order attribution model 410 with a set of M functions 432 of the T numerical quantities (e.g., set of 'T' numerical values 316) associated with the user 138 associated with the particular data point 136. Each of the set of M functions 432 (e.g., function returns a numerical quantity as an output) is a particular numerical quantity (e.g., numerical value 310) associated with a particular type of marketing data (e.g., set of marketing data 116) and/or an aggregation of the T numerical quantities (e.g. set of 'T' numerical values 316) associated with the particular type of marketing data (e.g. set of marketing data 116), according to one embodiment. A function may be a logical entity which takes a set of arguments, or data, as input, and returns a set of data as output. In our case here, a function typically is returning a real number as the output. In one embodiment, a function may be a logical entity which takes a set of arguments, and/or data, as input, and returns a set of data as output. A function may return a real number as the output.

The method further includes associating the dependent variable $Y\_1$ (e.g. dependent variable 414) of the K-th order attribution model 410 with a second function 434 of the conversion value 140 associated with the user 138. In addition, method further includes determining a first observation matrix X1 402 of size N×M based on the set of marketing data 116 and the K-th order attribution model 410. The N rows of the first observation matrix X1 402 correspond to the N data points (e.g. first data point 120, second data points 124) of the marketing data (e.g. set of marketing data 116) collected in the marketing campaign (e.g. first marketing campaign 108). The M columns of the first observation matrix X1 402 corresponds to the set of M functions 432 associated with the M independent variables of the K-th order attribution model 410 applied to numerical quantities associated with the N data points (e.g. first data point 120, second data points 124) of the set of marketing data 116, according to one embodiment.

In addition, the method includes determining a first conversion vector Y1 400 of size N×1, with N elements of the first conversion vector Y1 400 is the second function 434 of conversion values (e.g. conversion value 140) of the N data points (e.g. first data point 120, second data points 124) of the marketing data collected in the marketing campaign (e.g. first marketing campaign 108). All positive conversion values (e.g. positive conversion value 208) corresponding to a set of converted users (e.g. converted user 202) associated with the N data points (e.g. first data point 120, second data points 124) are not less than a positive threshold 'TH1'. The method performs a first regression analysis 500 based on the first observation matrix X1 402 and the first conversion vector Y1 400 to find a first set of optimal model parameters 504 of the K-th order attribution model 410 that best estimate the dependent variable Y_1 (e.g. dependent variable 414) by the linear combination of the more than one terms of the M independent variables (e.g. independent variables 418) with respect to a first goodness-of-fit measure 800, according to one embodiment.

The first regression analysis 500 includes an application of a gradient descent algorithm 904 (e.g., a stochastic gradient descent algorithm) which is a minimization algorithm and a factorization machine algorithm to obtain a factorized matrix V of size M×L, with L being an integer not greater than M. The method performs a first refining step (e.g. refining step 502) and a second refining step (e.g. refining step 502) to identify a set of insignificant second order cross terms 506 of the K-th order attribution model 410. The first refining step (e.g. refining step 502) includes, for a second order cross term with two independent variables (e.g. independent variables 418) X_i and X_j, computing a matrix Q=V*(V^T) of size M×M which is the matrix multiplication of the factorized matrix V and its matrix transpose, according to one embodiment.

The first refining step (e.g. refining step 502) further includes classifying the second order cross term with the two independent variables (e.g. independent variables 418) X_i and X_j as unimportant if the (ij)-th element of matrix Q is less than a 'TH3' percentile in the i-th row of the matrix Q in terms of absolute magnitude. The second refining step step (e.g. refining step 502) includes for the second order cross term with two independent variables (e.g. independent variables 418) X_i and X_j, classifying the second order cross term with the two independent variables (e.g. independent variables 418) X_i and X_j as unimportant if the percentage of converted users (e.g. converted user 202) among the data points in which both X_i and X_j are collected is smaller than a threshold 'TH4'. Any second order cross term classified as unimportant by the first refining step (e.g. refining step 502) and/or the second refining step (e.g. refining step 502) is identified as insignificant, according to one embodiment.

Further, the method includes constructing a second K-th order attribution model 605 which is the K-th order attribution model 410 minus the set of insignificant second order cross terms 506 identified in the first refining step (e.g. refining step 502) and the second refining step (e.g. refining step 502). In addition, method constructs a modified second K-th order attribution model 606 by replacing the first function of two of the M independent variables (e.g. first function of two independent variables 430) in the second K-th order attribution model 605 by a third function of two of the M independent variables (e.g. third function of two independent variables 1004). The method associates the M independent variables of the modified second K-th order attribution model 606 with a second set of M functions 1300 of the T numerical quantities (e.g. set of 'T' numerical values 316) associated with the user 138, according to one embodiment.

The method associates the dependent variable Y_1 (e.g. dependent variable 414) of the modified second K-th order attribution model 606 with a fourth function of the conversion value 140 associated with the user 138. The method determines a second observation matrix X2 602 (e.g. second observation matrix X2 1304) of size N×(M2) based on the set of marketing data 116, the modified second K-th order attribution model 606, and the second set of M functions 1300, where M2 is not less than M and not greater than M+(M)(M−1)/2 (e.g., K=2, this limit increases as K increases since the combinatorics increase). When K=2, this limit may increase as K increases since the combinatorics increase (e.g., limit for K=3 may be exponential). M columns of the M2 columns of the second observation matrix X2 602 (e.g. second observation matrix X2 1304) correspond to the M columns of the first observation matrix X1 402 with the set of M functions 432 replaced by the second set of M functions 1300, according to one embodiment.

Each of the remaining (M2−M) columns of the M2 columns of the second observation matrix X2 602 (e.g. second observation matrix X2 1304) to each corresponds to the third function of two through K quantities (e.g. third function of two independent variables 1004) in the second order cross terms of the modified second K-th order attribution model 606. Each of the two quantities is one of the second set of M functions 1300 applied to the T numerical quantities (e.g. set of 'T' numerical values 316) associated with data points (e.g. first data point 120, second data point 124) of the set of market data (e.g. set of marketing data 116). The method determines a second conversion vector Y2 604 of size N×1 based on the marketing data (e.g. set of marketing data 116). The second conversion vector Y2 604 is the first conversion vector Y1 400 with the second function 434 replaced by the fourth function, according to one embodiment.

Further, the method performs a second regression analysis 600 based on the second observation matrix X2 602 (e.g. second observation matrix X2 1304) and the second conversion vector Y2 604 to find a second set of optimal model parameters 608 of the modified second K-th order attribution model 606 that best estimate the dependent variable Y_1 (e.g. dependent variable 414) by the linear combination of the more than one terms of the independent variables (e.g. independent variables 418) with respect to a second goodness-of-fit measure 801. Further, the method computes attribution scores (e.g. attribution score 148) associated with the P publishing channels (e.g. publishing channel 106) based on the K-th order attribution model 410, the modified second K-th order attribution model 606, the first set of optimal model parameters 504 and/or the second set of optimal model parameters 608, according to one embodiment.

Further, the method receives a request 146 through a network for the attribution scores (e.g. attribution score 148) associated with the P publishing channels (e.g. publishing channel 106) from a marketer client 147 communicatively connected to the processor 102 and the memory 104 through the network. In addition, the attribution scores (e.g. attribution score 148) associated with the P publishing channels (e.g. publishing channel 106) is communicated to the marketer client 147 through the network, according to one embodiment.

The method may set each of the T numerical quantities (e.g. set of 'T' numerical values 316) associated with the user 138 to be zero if the corresponding type of marketing data (e.g. set of marketing data 116) of the user 138 is "not available" and/or "non-existent", according to one embodiment.

In yet another embodiment, a method of a non-converting publisher attribution weighting and analytics server (e.g. attribution server 100) includes determining 'P' number of publishing channels (e.g. set of 'P' publishing channels 107) for advertisements 110 in a marketing campaign (e.g. first marketing campaign 108) for a set of purchasable items 112 using a processor 102 and a memory 104 communicatively coupled with the processor 102. In addition, the method monitors a marketing effectiveness of the P publishing channels (e.g. publishing channel 106) in generating converted users (e.g. converted user 202) each with a desirable action 205 and/or a purchase 204 from the set of purchasable items 112 in the marketing campaign 108. The marketing effectiveness of the P publishing channels (e.g. publishing channel 106) are analyzed using the processor 102 and the memory 104 based on a set of marketing data 116 from a data collection server 118 in a cloud.

The set of marketing data 116 includes 'N' number of data points (e.g. first data point 120, second data points 124) of marketing data (e.g. set of marketing data 116) collected in the marketing campaign (e.g. first marketing campaign 108) from time T1 (e.g. set of timings 306) to time T2 (e.g. set of timings 306). The method determines that a particular data point 136 among the N data points (e.g. first data point 120, second data points 124) is associated with a user 138, the particular data point 136 being a set which includes a conversion value 140 associated with the user 138 based on the desirable action 205, a first related action related to the desirable action 205, a second related action related to the purchase 204, an amount of the purchase 204, and/or an amount of gained units of the purchase 204 and a profit of the purchase 204. In addition, the conversion value 140 is non-negative. The conversion value 140 is zero (e.g. zero conversion value 206) if the user 138 is a non-converted user 200 without the desirable action 205 and/or the purchase 204 from the set of purchasable items 112, according to one embodiment.

The particular data point 136 is a set including 'R' number of types of marketing data (e.g. 'R' types of data 142) associated with the user 138 for each of the P publishing channels (e.g. publishing channel 106) such that 'T' number of numerical quantities (e.g. set of 'T' numerical values 316) associated with the user 138 are generated. Further, the method constructs a 'K'-th order attribution model 410 where K is an integer greater than one. The K-th order attribution model 410 includes 'M' number of independent variables (e.g. set of independent variables 416) including $X\_1$, $X\_2$ . . . and $X\_M$. In addition, the K-th order attribution model 410 includes a dependent variable $Y\_1$ (e.g. dependent variable 414) to be estimated by a linear combination of more than one term of the M independent variables (e.g. independent variables 418), according to one embodiment.

The linear combination includes a zero-th order constant term with a zero-th order model parameter 420. Further, the linear combination includes M number of first order linear terms (e.g. M first order linear terms 422) each with one of the M independent variables (e.g. independent variables 418) weighted by one of M number of first order model parameters 424. Further, the linear combination includes (M)(M−1)/2 number of second order cross terms (e.g. (M)(M−1)/2 second order cross terms 426) each including a first function of two of the M independent variables (e.g. first function of two independent variables 430) weighted by one of (M)(M−1)/2 number of second order model parameters (e.g. second order model parameters 428). The first function of the two independent variables 430 is the multiplication of the two independent variables 418, according to one embodiment.

Further, the method associates the M independent variables (e.g. independent variables 418) of the K-th order attribution model 410 with a set of M functions 432 of the T numerical quantities (e.g. set of 'T' numerical values 316) associated with the user 138 associated with the particular data point 136. Each of the M functions is a particular numerical quantity (e.g. numerical value 310) associated with a particular type of marketing data (e.g. set of marketing data 116) and a collection of numerical quantities 312 associated with the particular type of marketing data (e.g. set of marketing data 116) to provide a flexibility to internally perform aggregations and/or other calculations. In addition, the method associates the dependent variable $Y\_1$ (e.g. dependent variable 414) of the K-th order attribution model 410 with a second function 434 of the conversion value 140 associated with the user 138. The second function 434 of the conversion value 140 is the conversion value 140, according to one embodiment.

In addition, the method further includes determining a first observation matrix X1 402 of size N×M based on the marketing data (e.g. set of marketing data 116) and the K-th order attribution model 410. The N rows of the first observation matrix X1 402 corresponds to the N data points (e.g. first data point 120, second data points 124) of the marketing data (e.g. set of marketing data 116) collected in the marketing campaign (e.g. first marketing campaign 108). The M columns of the first observation matrix X1 402 corresponds to the set of M functions 432 associated with the M independent variables (e.g. independent variables 418) of the K-th order attribution model 410 applied to the T numerical quantities (e.g. set of 'T' numerical values 316) associated with data points (e.g. first data point 120, second data points 124) of the set of marketing data 116, according to one embodiment.

In addition, the method includes determining a first conversion vector Y1 400 of size N×1, with N elements of the first conversion vector Y1 400 are conversion values (e.g. conversion value 140) of the N data points (e.g. first data point 120, second data points 124) of the marketing data (e.g. set of marketing data 116) collected in the marketing campaign (e.g. first marketing campaign 108). All positive conversion values (e.g. positive conversion value 208) corresponding to a set of converted users (e.g. converted user 202) associated with the N data points (e.g. first data point 120, second data points 124) are not less than a positive threshold 'TH1'. The method performs a first regression analysis 500 based on the first observation matrix X1 402 and the first conversion vector Y1 400 to find a first set of optimal model parameters 504 of the K-th order attribution model 410 that best estimates the dependent variable $Y\_1$ (e.g. dependent variable 414) by the linear combination of the more than one terms of the independent variables 418 with respect to a first goodness-of-fit measure 800, according to one embodiment.

The first regression analysis 500 includes the application of a gradient descent algorithm which is a minimization algorithm and/or a factorization machine algorithm to obtain a factorized matrix V of size M×L, where L is an integer not greater than M. The method performs at least one refining step 502 to identify a set of insignificant second order cross terms 506 of the K-th order attribution model 410. The at least one refining step 502 includes computing a matrix Q=V*(V^T) of size M×M which is the matrix multiplication of the factorized matrix V and its matrix transpose, according to one embodiment.

Further, the at least one refining step 502 computes a row mean rowMean_Q and a row standard deviation rowSD_Q for each row of matrix Q. Further, the at least one refining step 502 identifies all elements in the row of matrix Q that are less than a row-adaptive threshold 'TH3' as insignificant where TH3=rowMean_Q+C*rowSD_Q is the row mean plus C times row standard deviation, where C is greater than 0.0 and less than <3. The at least one refining step 502 to further include, for each of the second order cross term with two independent variables 418, identifying all of 'A' number of data points (e.g., first data point 120, second data points 124) in which the two independent variables 418 are collected, according to one embodiment.

The at least one refining step 502 to further include determining 'B' number of converted users (e.g. converted user 202) among the A data points (e.g. first data point 120, second data points 124) in which the two independent variables 418 are collected. The at least one refining step 502 further includes identifying the second order cross term with the two independent variables 418 as insignificant if the fraction B/A is less than a threshold 'TH4'. In addition the method constructs a second K-th order attribution model 605 which is the K-th order attribution model 410 minus the set of insignificant second order cross terms 506 identified in the first refining step (e.g. refining step 502) and/or the second refining step (e.g. refining step 502), according to one embodiment.

Further the method constructs a modified second K-th order attribution model 606 by replacing the first function of two of the M independent variables (e.g. first function of two independent variables 430) in the second K-th order attribution model 605 by a third function of two of the M independent variables (e.g. third function of two independent variables 1004). Further the method associates the M independent variables (e.g. independent variables 418) of the modified second K-th order attribution model 606 with a second set of M functions (e.g. second set of function) of the T numerical quantities (e.g. set of 'T' numerical values 316) associated with the user 138. In addition, the method associates the dependent variable Y_1 (e.g., dependent variable 414) of the modified second K-th order attribution model 606 with a fourth function 1308 of the conversion value 140 associated with the user 138, according to one embodiment.

Further, the method determines a second observation matrix X2 602 (e.g. second observation matrix X2 1304) of size N×(M2) based on the set of marketing data 116, the modified second K-th order attribution model 606, and the second set of M functions 1300, where M2 is not less than M. The M columns of the second observation matrix X2 602 (e.g. second observation matrix X2 1304) corresponds to the M columns of the first observation matrix X1 402 with the set of M functions 432 replaced by the second set of M functions 1300. Each of the remaining (M2−M) columns of the second observation matrix X2 602 (e.g. second observation matrix X2 1304) corresponds to one of the second order cross terms of the modified second K-th order attribution model 606. Each of the remaining (M2−M) column is the third function of two quantities (e.g., when K=2, Or "K" quantiles, when K>2, "K" quantiles, when K>2). Each of the two quantities is one of the second set of M functions 1300 is applied to the T numerical quantities (e.g. set of 'T' numerical values 316) associated with the data points (e.g. first data point 120, second data points 124) of the set of marketing data 116, according to one embodiment.

The method determines a second conversion vector Y2 604 of size N×1 based on the marketing data. The second conversion vector Y2 604 is the first conversion vector Y1 400 with the second function 434 replaced by the fourth function. Further the method performs a second regression analysis 600 based on the second observation matrix X2 602 (e.g. second observation matrix X2 1304) and the second conversion vector Y2 604 to find a second set of optimal model parameters 608 of the modified second K-th order attribution model 606 that best estimates the dependent variable Y_1 (e.g. dependent variable 414) by the linear combination of the more than one terms of the independent variables 418 with respect to a second goodness-of-fit measure 801, according to one embodiment.

Further, the method computes attribution scores (e.g. attribution score 148) associated with the P publishing channels (e.g. publishing channel 106) based on the K-th order attribution model 410, the modified second K-th order attribution model 606, the first set of optimal model parameters 504 and the second set of optimal model parameters 608. Further, the method receives a request 146 through a network for the attribution scores (e.g. attribution score 148) associated with the P publishing channels (e.g. publishing channel 106) from a marketer client 147 communicatively connected to the processor 102 and the memory 104 through the network. In addition, the attribution scores (e.g. attribution score 148) associated with the P publishing channels (e.g. publishing channel 106) is communicated to the marketer client 147 through the network, according to one embodiment.

FIG. 1 is a publisher attribution server view 150 illustrating an attribution server 100 (e.g., non-converting publisher attribution weighting and analytics server) computing an attribution score 148 associated with 'P' publishing channels (e.g., set of 'P' publishing channels 107) based on a conversion value 140 associated with a user 138 of P publishing channels and communicating it to a marketer client 147 on receiving a request 146 through a network, according to one embodiment. In particular, FIG. 1 includes attribution server 100, processor 102, network, memory 104, publishing channel, 106, 106A, 106B, set of 'P' publishing channels 107, first marketing campaign 108, other publishing channel 109, advertisements 110, 110A, 110B, set of advertisements 111, set of purchasable items 112, first marketing condition 114, set of marketing data 116, data collection server 118, first data point 120, set of first marketing data 122, second data point 124, set of second marketing data 126, auxiliary marketing campaign 128, other advertisements 130, 130A, 130B, 130C, 131, other purchasable item 132, second marketing condition 134, particular data point 136, user 138, conversion value 140, 'R' types of data 142, other types of data 144, request 146 and attribution score 148, according to one embodiment.

The attribution server 100 (e.g., a non-converting publisher attribution weighting and analytics server) may be a computer program and/or a device that provides functionality for other programs and/or devices (e.g., clients) in order to establish a quality and/or characteristic related to a particular user (e.g., user 138) when exposed to an advertisement by a publishing channel 106. The attribution server 100 may share data and/or resources among its multiple clients (e.g., publishers, email senders, affiliates). The attribution server 100 may track the publisher and/or a company (e.g., a publishing channel 106, an affiliate) that has direct and/or indirect interaction with consumers and provide score based on conversion (e.g., purchase 204, desirable action 205). The attribution server 100 may track every individual user 138 real time with its cookie tracking and/or device tracking through display pixels. The attribution server 100 may track the number of clicks 303 from each publisher (e.g., a publishing channel 106) for a given user click string, according to one embodiment.

The attribution server 100 may facilitate providing a score and/or a rating for all of the publishers that are involved in an advertising campaign (e.g., marketing campaign 108) and apply that score to each individual publisher (e.g., publishing channel 106) based on conversions of its users 138, according to one embodiment.

The processor 102 may be a logic circuitry that responds to and processes the basic instructions of the attribution server 100 (e.g., a non-converting publisher attribution weighting and analytics server). The memory 104 may be a physical device capable of storing information which the processor 102 of attribution server 100 may easily encode and/or retrieve. The marketing effectiveness (e.g., conversion value 140) of the P publishing channels 106 may be analyzed using the processor 102 and the memory 104 based on a set of marketing data 116 from a data collection server 118 in a cloud, according to one embodiment.

The publishing channel 106 (e.g., 106A, 106B) may be any media type (e.g., social media, website, email senders, applications, map/navigation systems, SMS, communicators, marketing affiliates, television, radio, outdoor advertising, billboards, newspapers, magazines, posters, flyers, direct mail, printed matter, sponsorship, sponsored events, sponsored clothing/items/gifts, opinion leaders, etc.) providing means to display/broadcast/convey ads and running advertising campaigns. A set of 'P' publishing channels 107 may be a collection of publishing channels (e.g., 106A, 106B) providing means for advertisements 110 in a marketing campaign 108 for a set of purchasable items 112, according to one embodiment.

The first marketing campaign 108 may be a specific, defined series of activities used in marketing a new and/or changed product and/or service using marketing channels (e.g., publishing channel 106) and methods. The marketing campaign 108 may contain the first set of different advertisement 110 by the publishers. The marketing campaign 108 may be an initial or introductory series of actions and/or business of promotions for selling products and/or services run by the publishers (e.g., publishing channel 106), according to one embodiment.

Other publishing channel 109 may be an alternative and/or distinct media type (e.g., social media, website, email senders) providing means to display/broadcast ads and running advertising campaigns (e.g., auxiliary marketing campaign 128). The advertisements 110, 110A, 110B may be a notice (e.g. text, email, message, signs, displayed logos, impressions, icons, graphics, images, animations, audio, video, movements, actions, patterns, visual ad, audio-visual ad, in-app ad, in-game ad, targeted ad, announcement, broadcasting, push and/or pull ad, etc) and/or announcement in public and/or private medium for a set of purchasable items 112 included in a marketing campaign 108, according to one embodiment.

The set of purchasable items 112 may be a collection of items displayed on any media type (e.g., a website) in the form of advertisement 110 in a marketing campaign 108 to be purchased by a particular user 138. The first marketing condition 114 may be the factors, timing and/or situations affecting the first marketing campaign 108. (e.g., 6 weeks before Christmas, 1 week before Memorial day, during NBA Final, big boxing game, Olympic Games, Superbowl, New Year, Valentine's Day, back-to-school, spring break, summer holiday for schools, imminent launching of a new game/device/gadget/car/appliance, election, drought, disaster, crisis, war, blockbuster movie, viral YouTube™/Tweeter™/Facebook™/social media, etc.) The N1 rows of the first observation matrix X1 402 and the conversion values of the N1 first data points 120 of the set of first marketing data 122 may be collected in the first marketing condition 114 in the first marketing campaign up to the time T1, according to one embodiment.

The set of marketing data 116 may be a collection of distinct pieces of information collected from the marketing campaign (e.g., first marketing campaign 108, auxiliary marketing campaign 128). The set of marketing data 116 may include 'N1' number of first data points of a set of first marketing data collected in a first marketing condition 114 in the first marketing campaign 108 up to a time T1 and 'N2' number of second data points 124 of a set of second marketing data 126 collected in at least one auxiliary marketing campaign 128 in a second marketing condition 134 related to the first marketing condition 114 (e.g., the data points N2 subject to the same time constraints T1 as data points N1). The start time may be T0. The data points N2 may be subject to the same time constraints T1 as data points N1. The start time may be T0. The N2 second data points 124 may be used as boot-strap data to supplement the N1 first data points 120, especially when N1 is not very large and/or insufficient. At the beginning of the marketing campaign 108, the amount of first data points (N1) 120 may be insufficient due to the short initial time period to collect the marketing data (e.g., set of marketing data 116).

The data collection server 118 may be a computer program designed to gather information from the publishing channels 106 about its marketing campaigns (e.g., 108, auxiliary marketing campaign 128) and track each user 138. The data collection server 118 may process requests and deliver the set of marketing data 116 to the attribution server 100 (e.g., a non-converting publisher attribution weighting and analytics server). Marketing effectiveness of the P publishing channels 106 may be analyzed using the processor 102 and the memory 104 based on a set of marketing data 116 from a data collection server 118 in a cloud, according to one embodiment.

The first data point 120 may be a discrete unit of information collected from the first marketing campaign 108 running the advertisement 110. The set of first marketing data 122 may be a subset of the set of marketing data 116. The set of first marketing data 122 may include the N1 number of data points (e.g., first data point 120) of first marketing data collected in a first marketing condition 114 in the first marketing campaign 108 up to a time T1, according to one embodiment.

The second data point 124 may be a discrete unit of information collected from the auxiliary marketing campaign 128 running other advertisement 130 for other purchasable items 132. The N2 number of second data point 124 may be collected in at least one auxiliary marketing campaign 128 in a second marketing condition 134 related to the first marketing condition 114. The set of second marketing data 126 may be a subset of the set of marketing data 116. The set of second marketing data 126 may include the N2 number of second data points 124 of a set of second marketing data 126 collected in at least one auxiliary marketing campaign 128 in a second marketing condition 134 related to the first marketing condition 114, according to one embodiment.

The auxiliary marketing campaign 128 may be an additional and/or supplemental, defined series of past and/or present (concurrent) activities used in marketing other purchasable items 132 (e.g., changed product and/or service) using marketing channels (e.g., publishing channel 106) and methods. The auxiliary marketing campaign 128 may run the other advertisement 130 for other purchasable item 132 by the set of P publishing channels 107. In the event of insufficient reliable data points available (e.g., N1 may be relatively small) in the first marketing campaign (especially when time T1 is early in the first marketing campaign 108), data points from auxiliary marketing campaign 128 may be added to the data points of the first marketing campaign to boot strap the regression analysis. The auxiliary marketing campaign 128 may be past and/or concurrent campaigns whose second marketing condition 134 may be similar to the first marketing condition 114 of the first marketing campaign 108, according to one embodiment.

The other advertisements 130, 130A, 130B, 130C, 131, may be an alternative and/or distinct notice and/or announcement in public medium for other purchasable items 132 included in an auxiliary marketing campaign 128. The other purchasable item 132 may be a different, variant, and/or additional item to be purchased by a particular user 138, displayed on the website in the form of other advertisement 130 in a an auxiliary marketing campaign 128, according to one embodiment.

The second marketing condition 134 may be factors and/or situations affecting the auxiliary marketing campaign 128. N2 rows of the first observation matrix X1 402 may correspond to the N2 second data points 124 of the set of second marketing data 126, collected in the auxiliary marketing campaigns 128 in the second marketing condition 134. While there may be lots and lots of past and concurrent marketing data available, the marketing condition (e.g., the second marketing condition 134) of the selected auxiliary marketing campaign 128 may be similar to the first marketing condition 114 of the first marketing campaign 108, according to one embodiment.

The particular data point 136 may be a set including a conversion value 140 associated with the user 138 based on the desirable action 205, a first related action related to the desirable action 205, a second related action related to the purchase 204, an amount of the purchase, and/or an amount of gained units of the purchase and a profit of the purchase. The user 138 may be an individual, viewer, and/or client surfing or viewing the advertisement 110 of a marketing campaign (e.g., first marketing campaign 108, auxiliary marketing campaign 128) broadcasted and/or displayed by a publisher on a set of P publishing channel 107, according to one embodiment.

The conversion value 140 may be an indicator denoting that a user 138 watching a campaign converted from a viewer to a consumer. The conversion value may be an indicator denoting that the user converted or did not convert. It explicitly may not be the effectiveness of the publisher (e.g., that may be precisely the outcome of the algorithm, also referred to as the attribution of the publisher). The data points N2 may be subject to the same time constraints T1 as data points N1. The start time may be T0. The conversion value 140 may be non-negative and/or a zero for a user 138 based on a desirable action 205 and/or a purchase 204 from the set of purchasable items 112. The conversion value 140 may be zero if the user 138 is a non-converted user 138 without a desirable action 205 and/or a purchase 204 from the set of purchasable items 112, according to one embodiment.

The 'R' types of data 142 may be different categories of marketing data collected from first marketing campaign 108 and auxiliary marketing campaign 128 associated with the user 138. The particular data point 136 may be a set including 'R' number of types of marketing data associated with the user 138 for each of the P publishing channels 106 such that 'T' number of numerical quantities associated with the user 138 are generated. The 'R' types of data 142 may include impression data type 300, click stream date type 302, and/or event data type 304 associated with the user 138, according to one embodiment.

The other types of data 144 may be distinct type of information collected from the marketing campaign (e.g., first marketing campaign 108, auxiliary marketing campaign 128). The other types of data 144 (e.g., may include offline referral data, if volunteered by the customer, say the user checks a box that says "referred by radio advertisement", or enters a coupon code that they heard on the radio or television) may include landing on webpages, bookmarking of webpages, repeated visit to webpages, browsing of merchandise webpages, selection of a purchasable item, viewing/processing of shopping baskets, watching of a video, clicking of "like" and/or other response buttons on a social media, download of an item, installation of an app, searching for related items/services, checking out, attempted purchase, etc., according to one embodiment.

The other types of data 144 may further include an offline referral data volunteered by the customer. For example, a user may check a box that says "referred by radio advertisement", and/or the user may enter a coupon code that he heard on the radio and/or television.

The request 146 may be a solicitation from a marketer client 147 to the attribution server 100 (e.g., a non-converting publisher attribution weighting and analytics server) for the attribution scores 148 associated with the P publishing channels 106 communicatively connected through the network. The attribution score 148 may be rating inferred and/or derived for a publishing channel 106 based on conversion and/or non-conversion (e.g., using conversion value 140) of its user 138 by the attribution server 100, according to one embodiment.

The data collection server 118 of the attribution server 100 (e.g., a non-converting publisher attribution weighting and analytics server) may track a click stream for each user 138 observing the ads from a campaign for all the events that went into a particular event (e.g., purchase 204) for each publisher. The attribution server 100 may form the click stream into a feature vector. Every entry in the feature vector may be a simple mapping where 1 denotes that a particular user 138 has used a particular publisher in the campaign and 0 (e.g., may be reversed) denoting that a particular user has not used a particular publisher in the campaign. The attribution server 100 may analyze the marketing effectiveness of the P publishing channels 107 in generating converted users (e.g., using conversion value 140) each with at least one of a desirable action 205 and/or a purchase 204 from the set of purchasable items 112 in the first marketing campaign 108 based on a set of marketing data 116 from a data collection server 118 in a cloud, according to one embodiment.

The method of attribution server 100 (e.g., a non-converting publisher attribution weighting and analytics server) may form a long matrix (e.g., first observation matrix X1 402), 1 for every single user observed and a set of columns representing number of publishers. The method of attribution server 100 may form a model (e.g., K-th order attribution model 410) to include impressions that is two times the number of publishers, with one column denoting the impression and other denoting the clicks (e.g., 'R' types of data 142). The attribution server 100 may run factorization machine algorithm to the matrix such formed. Running factorization machine algorithm may result into a matrix with number of rows depicting the number of publishers, according to one embodiment.

The attribution server 100 (e.g., a non-converting publisher attribution weighting and analytics server) may construct a one column matrix (e.g., first conversion vector Y_1 414) for a particular advertising campaign denoted by number of users (e.g., user 138) in that advertising campaign (e.g., first marketing campaign 108). A zero in the matrix may denote that particular user (e.g., user 138) did not convert and a one in that particular matrix may indicate that particular user (e.g., user 138) did convert, according to one embodiment.

The method of attribution server 100 may determine clickstreams for a user 138 that has a combination of two different publisher channel (e.g., publishing channel 106A, 106B) present in them. The conversions and clicks may be computed for each pair of cross terms separately for each publisher channel combinations to determine a conversion rate (e.g., conversion value 140). Once each publisher channel combinations are grouped, it is a simple tabulation of the number of instances and the number of conversions within that group, according to one embodiment.

The attribution server 100 may determine whether a particular data point 136 among the N1 first data points 120 is associated with a user 138. The attribution server 100 may construct a 'K'-th order attribution model 410 where K may be an integer greater than one. The K-th order attribution model 410 may include 'M' number of independent variables 418 and a dependent variable $Y\_1$ (e.g., dependent variable 414). The dependent variable $Y\_1$ (e.g., dependent variable 414) may be estimated by linear combination of more than one term of the M independent variables 416, according to one embodiment.

The attribution server 100 may associate the M independent variables 416 with a set of M functions 432 of the T numerical quantities of the user 138 associated with the particular data point 136. The attribution server 100 may associate the dependent variable $Y\_1$ (e.g., dependent variable 414) of the K-th order attribution model 410 with a second function 434 of the conversion value 140. The attribution server 100 may determine a first observation matrix X1 412 of size N×M based on the set of marketing data 116 and the K-th order attribution model 410. The attribution server 100 may determine a first conversion vector Y1 400 of size N×1 based on the set of marketing data 116, according to one embodiment.

The attribution server 100 (e.g., a non-converting publisher attribution weighting and analytics server) may perform a first regression analysis 500 based on the first observation matrix X1 402 and the first conversion vector Y1 400 to find a first set of optimal model parameters 504 of the K-th order attribution model 410. The attribution server 100 may perform at least one refining step 502 to identify a set of insignificant second order cross terms 506 of the K-th order attribution model 410. Further, the attribution server 100 may construct a second K-th order attribution model 605. the attribution server 100 may construct a modified second K-th order attribution model 606 by replacing the first function of two of the M independent variables 430 in the second K-th order attribution model by a third_function of two of the M independent variables 1004. The attribution server 100 may associate the M independent variables of the modified second K-th order attribution model 606 with a second set of M functions 1300 of the T numerical quantities associated with the user 138, according to one embodiment.

The attribution server 100 may associate the dependent variable $Y\_1$ of the modified second K-th order attribution model 606 with a fourth function 1308 of the conversion value 140 associated with the user 138. The attribution server 100 may determine a second observation matrix X2 602 of size N×(M2) based on the set of marketing data 116, the modified second K-th order attribution model 606, and the second set of M functions 1300. The attribution server 100 may determine a second conversion vector Y2 604 of size N×1 based on the set of marketing data 116. The attribution server 100 may perform a second regression analysis 600 based on the second observation matrix X2 602 and the second conversion vector Y2 604, according to one embodiment.

The attribution server 100 (e.g., a non-converting publisher attribution weighting and analytics server) may compute the attribution scores 148 associated with the P publishing channels 107 based on the K-th order attribution model 410, the modified second K-th order attribution model 606, the first set of optimal model parameters 504 and the second set of optimal model parameters 608. The attribution server 100 may receive a request 146 through a network for the attribution scores 148 associated with the P publishing channels 106 from a marketer client 147 communicatively connected to the processor 102 and the memory 104 through the network, according to one embodiment.

Figure 2:
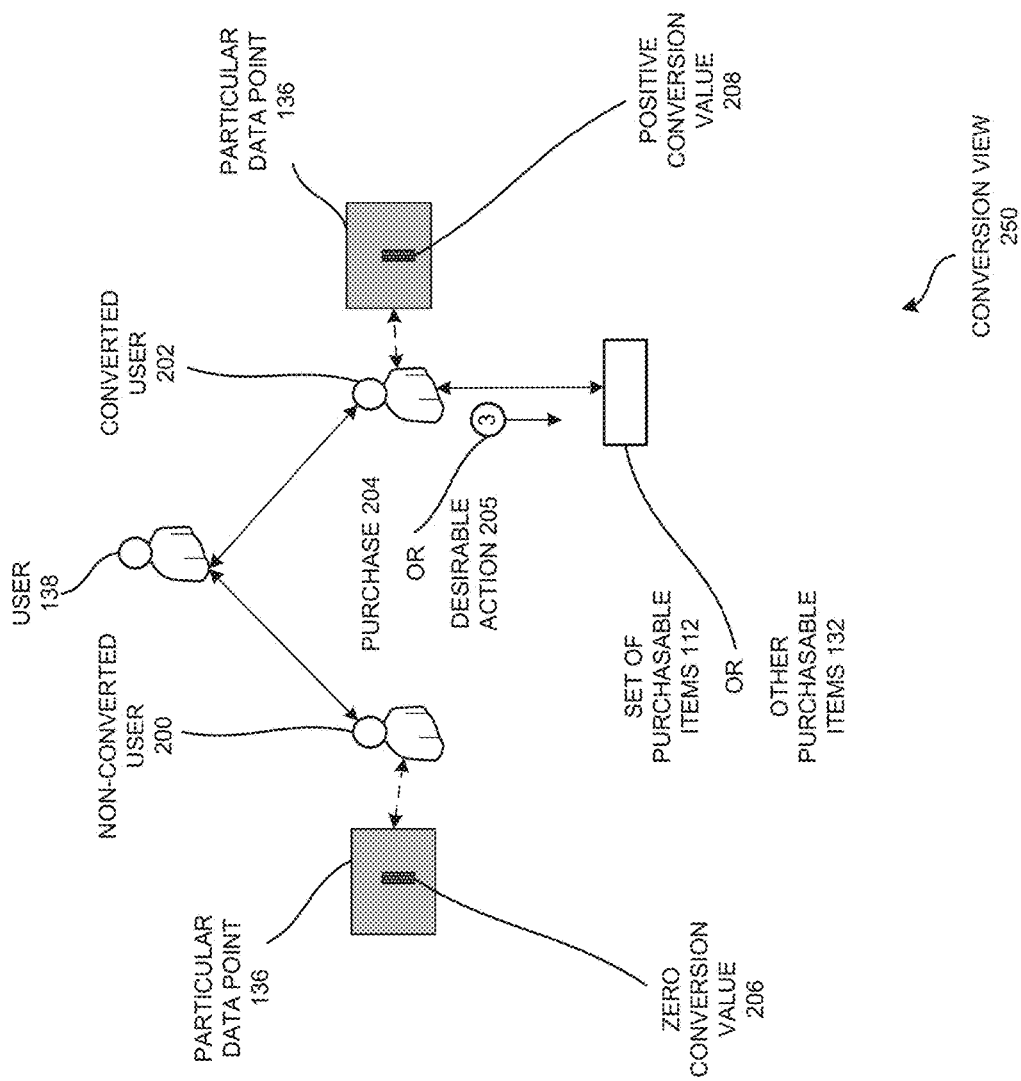
FIG. 2 is a conversion view illustrating the determination of conversion value by the non-converting publisher attribution weighting and analytics server (e.g., attribution server) of FIG. 1 based on a desirable action and/or purchase data of a user, according to one embodiment.

FIG. 2 is a conversion view 250 illustrating the determination of conversion value 140 by the attribution server 100 (e.g., non-converting publisher attribution weighting and analytics server) of FIG. 1 based a desirable action 205 and/or purchase data of a user 138, according to one embodiment. Particularly, FIG. 2 builds on FIG. 1 and further adds, a non-converted user 200, a converted user 202, purchase 204, a desirable action 205, a zero conversion value 206, and a positive conversion value 208, according to one embodiment.

The non-converted user 200 may be the user 138 surfing and/or viewing the advertisements 110 of a marketing campaign (e.g., first marketing campaign 108, auxiliary marketing campaign 128) broadcasted and/or displayed by a publisher on a set of P publishing channel 107 without any desirable action 205 and/or actual purchase 204 from the set of purchasable items 112. For the non-converted user 200, the conversion value 140 may be zero, according to one embodiment.

The converted user 202 may be the user 138 with desirable action 205. The converted user 202 may be the user 138 who actually makes a purchase 204 from the set of purchasable items 112 displayed in the marketing campaign (e.g., first marketing campaign 108, auxiliary marketing campaign 128). For the converted user 202, the conversion value 140 may be positive. The purchase 204 may be an acquisition by the payment of money or its equivalent; buying, or a single act of buying, by the user 138 after viewing the advertisement 110. The user 138 with the purchase 204 is converted user 202 while the user 138 without the purchase 204 is non-converted user 200, according to one embodiment. The desirable action 205 may be a preferred and/or recommended action of the user 138 making it to purchase from the set of purchasable items 112 in order to make it a converted user 202. The desirable action 205 may include landing of user 138 on webpages, bookmarking of webpages, repeated visit to webpages, browsing of merchandise webpages, selection of a purchasable item, viewing/processing of shopping baskets, watching of a video, clicking of "like" and/or other response buttons on a social media, download of an item, installation of an app, searching for related items/services, checking out, attempted purchase, etc. by the user 138, according to one embodiment. It may also include offline referral data, if volunteered by the customer, say the user checks a box that says "referred by radio advertisement", or enters a coupon code that they heard on the radio or television.

The desirable action 205 may further include filling out a lead generation form with the user's contact information by the user 138 The zero conversion value 206 may be the conversion value 140 associated with the non-converted user 200. The conversion value 140 may be zero when the user has no desirable action 205 and/or the purchase 204 from the set of purchasable items 112, according to one embodiment.

The positive conversion value 208 may be the conversion value 140 associated with the user 138 who is actually making a purchase from the set of purchasable items 112 displayed in the marketing campaign (e.g., first marketing campaign 108, auxiliary marketing campaign 128). The positive conversion values 208 corresponding to a first set of converted users 202 may be associated with the N1 first data points 120 of the set of first marketing data 122 and may not be less than a first positive threshold 'TH1'. The positive conversion values 208 corresponding to a second set of converted users 202 may be associated with the N2 second data points 124 of the set of second marketing data 126 and may not be less than a second positive threshold 'TH2', (where TH2 may not be greater than TH1), according to one embodiment.

Figure 3:
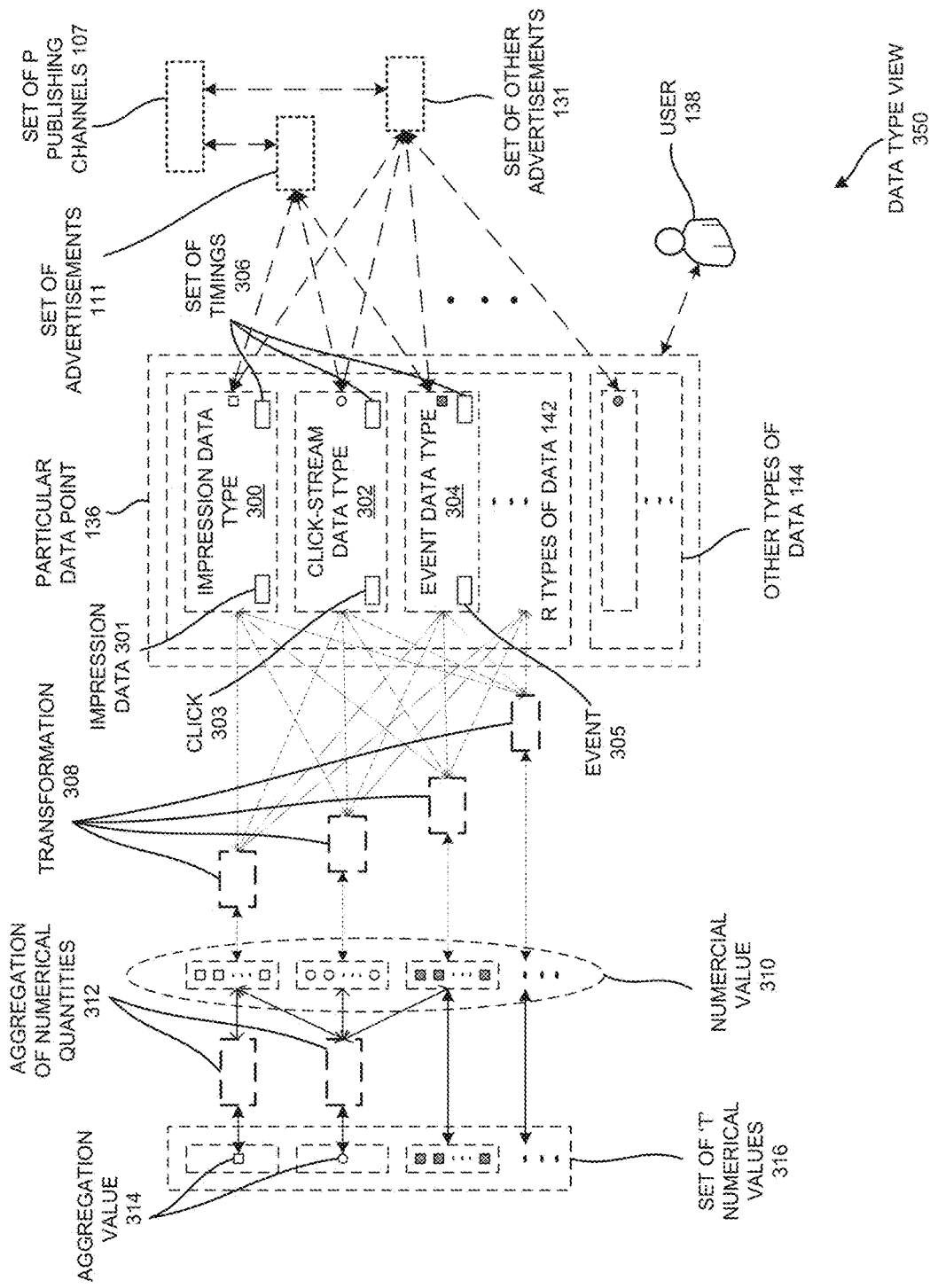
FIG. 3 is a data type view illustrating a set of marketing data with different data types being mapped to T numerical quantities associated with the user of the non-converting publisher attribution weighting and analytics server (e.g., attribution server) of FIG. 1, according to one embodiment.

FIG. 3 is a data type view 350 illustrating a set of marketing data with different data types being mapped to T numerical quantities associated with the user of attribution server 100 of FIG. 1, according to one embodiment. In particular, FIG. 3 builds on FIGS. 1 and 2, and further adds, an impression data type 300, an impression data 301, a click-stream data type 302, a click 303, an event data type 304, an event 305, a set of timings 306, a transformation 308, a numerical value 310, an aggregation of numerical quantities 312, an aggregation value 314 and a set of 'T' numerical values 316, according to one embodiment.

The impression data type 300 may be a category of information collected by the data collection server 118 where the data collection server 118 logs only the number of times an advertisement 110 is displayed within a webpage and/or a publishing channel 106 consulted by a visitor (e.g., user 138), according to one embodiment.

The impression data 301 may be the distinct pieces of information with regards to number of times an advertisement 110 is displayed within a webpage and/or a publishing channel 106 consulted by a visitor (e.g., user 138) to be collected by the data collection server 118. The click-stream data type 302 may be a category of information logged by the data collection server 118 recording where the users 138 are clicking or selecting with their mouse while browsing the Web (e.g., publishing channel 106 running a first marketing campaign 108, or auxiliary marketing campaign 128). The clicking action may be, while the user continues to explore and click 303 around the ad application and/or Web page displaying the advertisement 110. The click-stream may be a rendering of user 138 activity on a website (e.g., publishing channel 106), where the user 138 clicks on a computer display screen and how that movement translates to other Web activity (e.g., desirable action 205 or a purchase 204), according to one embodiment.

The click 303 may be the process of selecting a screen object while watching the advertisement 110 and/or browsing the Web (e.g., publishing channel 106) running a first marketing campaign 108 and/or auxiliary marketing campaign 128 by the user 138, according to one embodiment.

The event data type 304 may be a category of information, where the data collection server 118 logs an action of the user and/or occurrence of a desirable action 205 (e.g., watching a video, listening an audio clip, etc.) and/or a purchase 204 detected by the data collection server 118. Events can be user actions, such as clicking a mouse button or pressing a key, or system occurrences, according to one embodiment.

The event 305 may be an action or occurrence detected by the data collection server 118. The event 305 may include viewing an advertisement, clicking on an advertisement, landing on a webpage, bookmarking a webpage, re-visiting a webpage, browsing of merchandise webpages, selection of a purchasable item, viewing/processing a shopping basket, watching of a related video, playing of a related game and/or a song and/or an audio, clicking of a "like" and/or other response buttons, responding on a social media, downloading of an item, installation of an app, search for related items/services, checking out, purchase, attempted purchase, enquiring, and/or a user navigating through a site (e.g., publishing channel 106) during a registration involving multiple steps in the process, according to one embodiment.

Different types of data are collected from the users 138. The R types of marketing data associated with the user 138 may include a click-stream data type 302, an impression data type 300 and/or an event data type 304, each associated with P numerical quantities associated with the user 138. Each of the P numerical quantities associated with the click-stream data type 302 may be associated with a set of clicks 303 associated with the user 138 and one of the P publishing channels 106 and a set of timings 306 corresponding to the set of clicks. Each of the P numerical quantities associated with the impression data type 300 may be associated with a set of impressions associated with the user 138 and one of the P publishing channels 106, and a set of timings 306 corresponding to the set of impressions, according to one embodiment.

The set of timings 306 may be a collection of timing (including timing of start, pauses, transitions, end, replay, and/or play-point movement, co-occurrence timing, triggering event timing, total duration, relative timings, absolute timings, corrected timings, compensated timings, enhanced timings, mapped timing, coded timings, encrypted timings, re-sampled timings, re-purposed timings, transformed timings, processed timings, enumerated timings, and/or statistics of the timings) occurrence of a particular current and/or past event 305, a current and/or past click 303, and/or a current and/or past impression. The data collection server 118 may log the R types of data 142 at different set of timings 306 for a particular data point 136. For example, the data collection server 118 may only collect data for a particular range of time (e.g., while a particular program is running), and/or only for a limited period of time (e.g., last 30 days), according to one embodiment. The set of timings 306 may allow weighting of the observations. For example, a more recent transaction may be weighted as a higher value, and/or as a lower value, depending on the embodiment.

The transformation 308 may be a change, an alteration, a consolidation, a summary, a counting, a grouping, an association, a classification, an identification, a recognition, an importance assessment, a re-sampling, a re-ordering, a sorting, a representation, an interpolation, an extrapolation, a re-purposing, a domain transformation, a frequency transformation, a correction, a denoising, a refining, an enhancement, a pre-processing, a conditioning, a time averaging, an weighted averaging, an estimation, an approximation, a mapping, an enumeration, a coding, an encryption, a function, a storing, a caching, a sharing, a posting, a sending, and/or a receiving of different data types (e.g., R types of data 142, other types of data 144) for a particular data point 136. The data collection server 118 may transform the impression data 301, click stream data, and/or event data by counting and/or aggregating the number of impressions, clicks 303, and/or events 305 for a particular user 138. In another example embodiment, the data collection server 118 may only count the number of clicks 303 for a particular range of time (e.g., while a particular program is running), or count only from a limited period of time (e.g., last 30 days), or count clicks but when any two clicks are very close to each other, count the two as one or 1.8, or, to count and weight the clicks, according to one embodiment.

The numerical value 310 may be the individual numbers received after transformation 308 of different types of data (e.g., R types of data 142, other types of data 144) from a particular data point 136. The raw data (e.g., clicks 303, impression data 301, events 305) from the P number of publishing channels may be transformed (e.g. enumerated) by taking an aggregate and/or summation of individual numbers, according to one embodiment.

The aggregation of numerical quantities 312 may be the receiving, collecting, decoding, decrypting, and/or selecting of numerical values 310 received from a particular data point 136 and the computation of the aggregation values 314. The aggregation value 314 may be a sum, a weighted sum, a mean, an average, a median, a quartile, a percentile, a mode, a robust mean, an ordered statistics, a robust statistics, a range, a parameter, a statistical representation, a typical value, a summary, an enumeration, an approximated value, an estimated value, a representative value, and/or a function of selected numerical values 310 received after aggregation of numerical quantities 312 of different types of data (e.g., R types of data 142, other types of data 144) from a particular data point 136, according to one embodiment.

The set of 'T' numerical values 316 may be a collection of aggregation values 314 and/or non-aggregated values (e.g., numerical values 310) generated for the particular data point 136 associated with the user 138. A numerical score may rate and compare individual publishers. Each of the M functions may be a particular numerical quantity associated with a particular type of marketing data and an aggregation of numerical quantities 312 associated with the particular type of marketing data, according to one embodiment.

Figure 4:
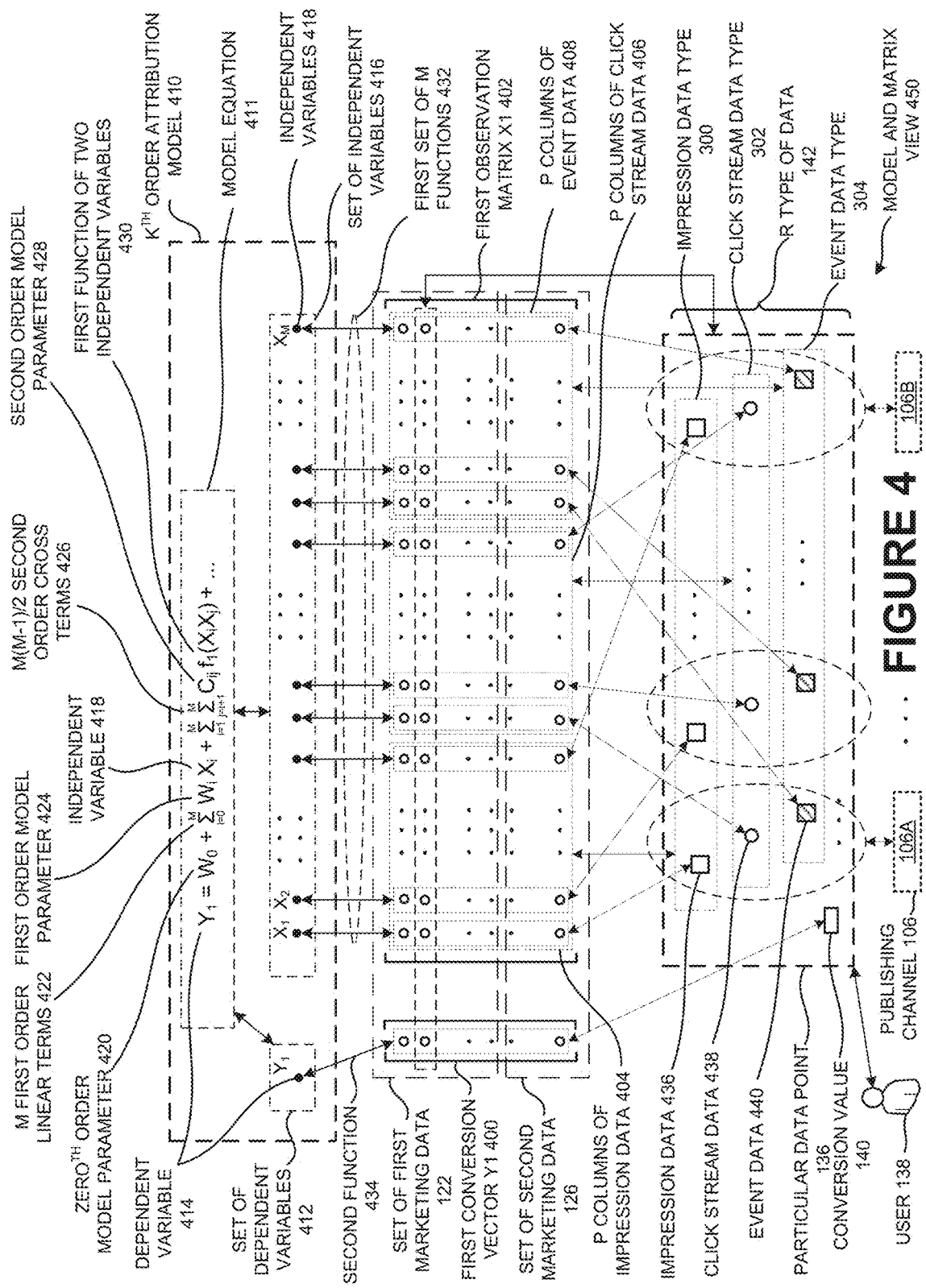
FIG. 4 is a model and matrix view illustrating the mapping of a particular data point to the first observation matrix X1 and first conversion vector Y1 of the K-th order attribution model of the non-converting publisher attribution weighting and analytics server (e.g., attribution server) of FIG. 1, according to one embodiment.

FIG. 4 is a model and matrix view 450 illustrating the mapping of a particular data point to the first observation matrix X1 and first conversion vector Y1 of the K-th order attribution model of the non-converting publisher attribution weighting and analytics server 100 of FIG. 1, according to one embodiment.

In particular, FIG. 4 builds on FIGS. 1, 2 and 3, and further adds, a first conversion vector Y1 400, a first observation matrix X1 402, P column of impression data 404, P column of click stream data 406, P column of event data 408, a K-th order attribution model 410, a model equation 411, a set of dependent variables 412, a dependent variable 414, a set of independent variables 416, independent variables 418, a zero-th order model parameter 420, M first order linear terms 422, a first order model parameter 424, M(M−1)/2 second order cross terms 426, a second order model parameter 428, a first function of two independent variables 430, a set of M functions 432, a second function 434, an event data 440, an impression data 436, a click stream data 438, according to one embodiment.

The first conversion vector Y1 400 may be a vector in matrix to find optimal model parameters of the respective model (e.g., first observation matrix X1 402). The first conversion vector Y1 400 of size N×1 may be determined using attribution server 100 based on set of marketing data 116. The N1 elements of the first conversion vector Y1 400 may include the second function 434 of the conversion values 140 of the first data points 120 of the set of first marketing data 122 collected in the first marketing condition 114 in the first marketing campaign 108 up to time T1, according to one embodiment.

The N2 elements of the first conversion vector Y1 400 may include the second function 434 of the conversion values 140 of the N2 second data points 124 of the set of second marketing data 126 collected in the auxiliary marketing campaign 128 in the second marketing condition 134 related to the first marketing condition 114. The first conversion vector Y1 400 may be used for training all the models (e.g., K-th order attribution model 410, second K-th order attribution model 605, modified second K-th order attribution model 606) for deriving the attribution score 148 using factorization machine algorithm, tabulation of cross term statistics, and regression analysis, according to one embodiment.

The first observation matrix X1 402 may be a rectangular array of numbers, arranged in rows and columns N×M whose values are based on observation (e.g., set of marketing data 116). The N1 rows of the first observation matrix X1 402 may correspond to the first data points 120 of the set of marketing data 116 collected in the first marketing condition 114 in the first marketing campaign 108 up to the time T1. The N2 rows of the first observation matrix X1 402 may correspond to the N2 second data points 124 of the set of second marketing data 126 collected in the auxiliary marketing campaign 128 in the second marketing condition 134 related to the first marketing condition 114. The M columns of the first observation matrix X1 402 may correspond to the set of M functions 432 associated with the M independent variables (e.g., independent variable 418) of the K-th order attribution model 410. Based on the first observation matrix X1 402 and the first conversion vector Y1 400, the attribution server 100 may perform the first regression analysis 500 to find a first set of optimal model parameters 504 of the K-th order attribution model 410, according to one embodiment.

P column of impression data 404 may be the column of impression data 301 in the first observation matrix X1 402. Each of the P numerical quantities of P column of impression data 404 may be derived from the independent variables 418 of the K-th order attribution model 410. Each of the P numerical quantities associated with the impression data type 300 may be associated with a set of impressions associated with the user 138 and one of the P publishing channels 107, and a set of timings 306 corresponding to the set of impressions (e.g., impression data 301) of the R type of data 142, according to one embodiment.

P column of click stream data 406 may be the column of click stream data (e.g., using click-stream data type 302) in the first observation matrix X1 402. Each of the P numerical quantities of P column of click stream data 406 may be derived from the independent variables 418 of the K-th order attribution model 410. Each of the P numerical quantities associated with the click-stream data type 302 may be associated with a set of clicks (e.g., click 303) associated with the user 138 and one of the P publishing channels 106 and a set of timings 306 corresponding to the set of clicks (e.g., click 303) of the R type of data 142, according to one embodiment.

P column of event data 408 may be the column of event data (e.g., using event data type 304) in the first observation matrix X1 402. Each of the P numerical quantities of P column of event data 408 may be derived from the independent variables 418 of the K-th order attribution model 410. Each of the P numerical quantities associated with the event data type 304 may be associated with a set of enumerated relevant events (e.g., event 305) associated with the user 138 and one of the P publishing channels 106 and/or a set of timings 306 corresponding to the set of enumerated relevant events (e.g., event 305) of the R type of data 142, according to one embodiment.

The K-th order attribution model 410 may be constructed by the attribution server 100 to include M number of independent variables (e.g., independent variable 418) (including X_1, X_2 . . . and X_M) and Y_1 dependent variable (e.g., dependent variable 412) to be estimated by a linear combination of more than one terms of the M independent variables. The K may be K=2 such that it is a second order attribution model. The K may be larger than 2 such that it may be a third order model with third order terms (e.g., products of 3 independent variables 418), or a higher order model with higher order terms (e.g. products of more than 3 independent variables 418), according to one embodiment.

The model equation 411 may be $Y_1 = W_0 + \Sigma W_i X_i + \Sigma \Sigma C_{ij} f_1(X_i X_j) + \ldots$ where K-th order attribution model 410 may be used to describe, define, estimate, and/or approximate the dependent variable 412 based on the M number of independent variables (e.g., independent variable 418).

The set of dependent variables 412 may be a collection of variables, which depends on any other variable (e.g., independent variable 418). The dependent variable 414 may be a variable which is dependent on some other function and/or variable. The K-th order attribution model 410 may include Y_1 dependent variable (i.e. dependent variable 414). Y_1 may be estimated by a linear combination of more than one term of the M independent variables. The dependent variable Y_1 (i.e. dependent variable 414) may include a zero-th order constant term (with a zero-th order model parameter), M number of first order linear terms (each including one of the M independent variables weighted by one of M number of first order model parameters) and (M)(M−1)/2 number of second order cross terms (each including a first function of two of the M independent variables weighted by one of (M)(M−1)/2 number of second order model parameters), according to one embodiment.

The set of independent variables 416 may be a collection of variables that is manipulated to determine the value of a set of dependent variables 412. The set of independent variables 416 may be a set of M independent variables 416 ranging X_1, X_2 . . . X_M.

Independent variables 418 may be the variables that are manipulated to determine the value of a dependent variable 414. The K-th order attribution model 410 may include 'M' number of independent variables (i.e. independent variable 418) including X_1, X_2 . . . and X_M, according to one embodiment.

The zero-th order model parameter 420 may be a scalar. It may be positive, negative or zero. It may be a biasing term. M first order linear terms 422 may include one of the M independent variables (e.g., independent variables 418) weighted by one of the M first order model parameters 424. The M first order linear terms 422 may be included in estimation of the dependent variable Y_1 (e.g., dependent variable 414), according to one embodiment.

The first order model parameter 424 may be a scalar which may be different for different first order cross terms. It may be positive, negative or a zero. The first order model parameter 424 may be set to zero for the insignificant first order cross terms. (M)(M−1)/2 number of second order cross terms 426 may be included in the dependent variable Y_1 (e.g., dependent variable 414). M(M−1)/2 second order cross terms 426 may include a first function of two of the M independent variables weighted by one of (M)(M−1)/2 number of second order model parameters, according to one embodiment.

The second order model parameter 428 may be a scalar which may be different for different second order cross terms. It may be positive, negative or zero. The second order model parameter 428 may be set to zero for the insignificant second order cross terms. The first function of two independent variables 430 may be an initial function of two independent variables 418 used in the first regression analysis 500. The first function for different pairs of two independent variables 418 may be the same or different. (e.g., 418 may be a single independent variable. Its value may be the output of a deterministic function that takes in any elements/data of the user's clickstream. It could be a single variate function, bi-variate, or multi-variate function). The first function of two independent variables 418 may be the multiplicative product of them. The first function of two independent variables 418 may be any bivariate function (e.g., other bivariate function 1112) with two variables, according to one embodiment. In another example embodiment, the independent variables 418 may be an output of a deterministic function that takes in any elements/data of the user's clickstream (e.g., click stream data 438). It could effectively be a single variate function, bi-variate function, and/or multi-variate function.

The set of M functions 432 may be associated with the M independent variables of the K-th order attribution model 410 applied to the T numerical quantities associated with data points (e.g., first data point 120, second data point 124) of the set of marketing data 116. The M columns of the first observation matrix X1 402 may correspond to the set of M functions 432. The set of M functions 432 (e.g., input and/or output) may be a particular numerical quantity associated with a particular type of marketing data (e.g., R type of data 142) and/or an aggregation of the T numerical quantities (e.g., aggregation of numerical quantities 312) associated with the particular type of marketing data. Each of the set of M functions 432 may simply be one of the independent variables 418. Some of the set of M functions 432 may be functions of many independent variables, according to one embodiment.

The elements of the conversion vector Y1 may include the second function 434 applied to the conversion values 140 of the data points of the set of marketing data which may be collected in the marketing condition in the marketing campaign. The event data 440 may be the data (e.g. obtained by enumeration, combination, averaging, counting, etc.) associated with a set of relevant events (e.g., event 305) associated with the user 138 and one of the P publishing channels 106, and/or a set of timings 306 corresponding to the set of enumerated relevant events (e.g., event 305), according to one embodiment.

The impression data 436 may be the data associated with a set of impressions (e.g., impression data 301) associated with the user 138 and one of the P publishing channels 106, and a set of timings 306 corresponding to the set of impressions (e.g., impression data 301). The click stream data 438 may be the data associated with a set of clicks (e.g., click 303) associated with the user 138 and one of the P publishing channels 106 and a set of timings 306 corresponding to the set of clicks (e.g., click 303), according to one embodiment.

Figure 5:
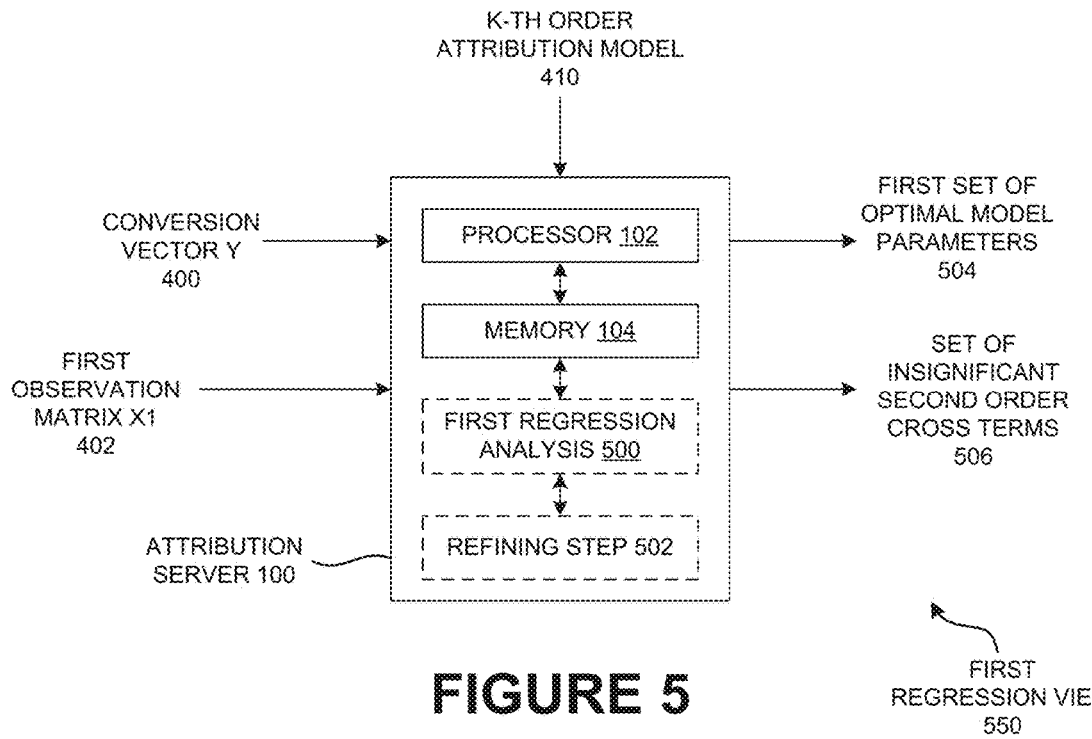
FIG. 5 is a first regression view showing a first regression analysis being performed based on the first observation matrix X1 and the conversion vector Y to find a first set of optimal model parameters of the K-th order attribution model by the non-converting publisher attribution weighting and analytics server (e.g., attribution server) of FIG. 1, according to one embodiment.

FIG. 5 is a first regression view 550 illustrating a first regression analysis being performed based on the first observation matrix X1 and the conversion vector Y to find a first set of optimal model parameters of the K-th order attribution model by the non-converting publisher attribution weighting and analytics server 100 of FIG. 1, according to one embodiment. In particular, FIG. 5 builds on FIGS. 1 through 4, and further adds, a first regression analysis 500, refining step 502, first set of optimal model parameters 504 and set of insignificant second order cross terms 506, according to one embodiment.

FIG. 5 illustrates the first regression analysis 500 which may be a statistical process for estimating the relationships among variables (e.g., dependent variables 414, independent variables 418). The first regression analysis 500 may include techniques for modeling and analyzing variables based on the relationship between a dependent variable 414 (e.g., $Y\_1$) and one or more independent variables 418 (e.g., $Xi$). The first regression analysis 500 may be performed based on the first observation matrix X1 402 and the first conversion vector Y1 400 to find a first set of optimal model parameters 504 of the K-th order attribution model 410 that best estimates the dependent variable $Y\_1$ (e.g., dependent variable 414) by the linear combination of the more than one terms of the M independent variables with respect to a first goodness-of-fit measure 800. The first regression analysis 500 may include an application of a numerical minimization algorithm, a linear regression algorithm, and/or a factorization machine algorithm 910, according to one embodiment.

The refining step 502 may be performed to identify a set of insignificant second order cross terms 506 of the K-th order attribution model 410. An insignificant term (first order, second order and/or higher order) in the K-th order attribution model 410 may be a term that may not give significant contribution to estimating the dependent variable $Y\_1$ (e.g., dependent variable 414) from the independent variables 418 ($X\_1, X\_2, \ldots$). While all the independent variables 418 may be noisy and all terms containing one or more independent variables 418 in the linear combination of the K-th order attribution model 410 may contribute noise (or noisy behavior of the estimate of the dependent variable $Y\_1$), the noise (or noisy behavior of the estimate of $Y\_1$) may be reduced by removing the set of insignificant second order cross terms which may not be essential (as they may not give significant contribution to estimating $Y\_1$) and thus may not really be needed in the estimation of $Y\_1$. The refining step 502 may include a first step and a second step to identify the set of insignificant second order cross terms 506 of the K-th order attribution model 410. Further, the method may construct second K-th order attribution model 605 which is the K-th order attribution model 410 minus the set of insignificant K-th order cross terms 506 identified in the first refining step 502 and the second refining step 502, according to one embodiment.

The first set of optimal model parameters 504 may be a particular combination of the zero-th order model parameter 420, the first order model parameters 424, the second order model parameters 428, and any higher order model parameters that allows the linear combination of the terms of the independent variables 418 in the K-th order attribution model 410 to estimate the dependent variable $Y\_1$ (e.g., dependent variable 414) in an optimal way in terms of some goodness-of-fit measure, based on the marketing data used as training data in the regression analysis. In the first set of optimal model parameters 504, the model parameters may be positive, negative or zero. The model parameters with larger magnitude may be more significant. The model parameters with near zero magnitude may not be significant, according to one embodiment.

The set of insignificant second order cross terms 506 may include some terms whose corresponding model parameters may be close to zero. The set of insignificant second order cross terms may include those second order cross terms whose corresponding terms in the square matrix $Q=V*(V^T)$ may not be significant, where V is the factorized matrix V. The set of insignificant second order cross terms may include those second order cross terms whose corresponding terms in the square matrix Q may be less than the threshold TH3=rowMean_Q+C*rowSD_Q, according to one embodiment.

Figure 6:
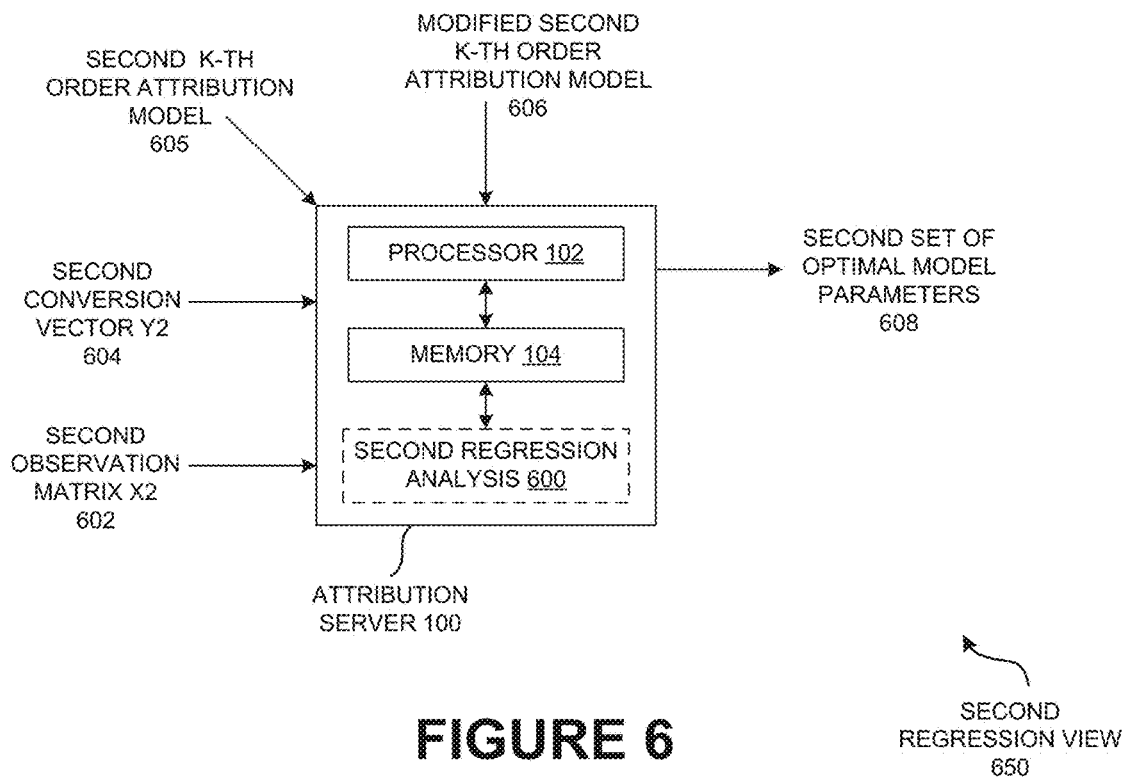
FIG. 6 is a second regression view showing a second regression analysis being performed based on the second observation matrix X2 and the second conversion vector Y2 to find a second set of optimal model parameters of the modified second K-th order attribution model by the non-converting publisher attribution weighting and analytics server (e.g., attribution server) of FIG. 1, according to one embodiment.

FIG. 6 is a second regression view 650 showing a second regression analysis 600 being performed based on the second observation matrix X2 and the second conversion vector Y2 to find a second set of optimal model parameters of the modified second K-th order attribution model 606 by the non-converting publisher attribution weighting and analytics server 100 of FIG. 1, according to one embodiment. In particular, FIG. 6 builds on FIGS. 1 through 5, and further adds, a second regression analysis 600, a second observation matrix X2 602, a second conversion vector Y2 604, a second k-th order attribution model 605, a modified second k-th order attribution model 606, and a second set of optimal model parameters 608, according to one embodiment.

The second regression analysis 600 may be a statistical process for estimating the relationships among variables (e.g., dependent variables 414, independent variables 418). The second regression analysis 600 may be different from the first regression analysis 500. The second observation matrix X2 602 and the second conversion vector Y2 604 used in the second regression analysis 600 may be different from the first observation matrix X1 402 and the first conversion vector Y1 400 used in the first regression analysis 500. The modified second K-th order attribution model 606 of the second regression analysis 600 is different from the K-th order attribution model 410 of the first regression analysis 500. The regression method used in the second regression analysis 600 may be different from the regression method used in the first regression analysis 500. The second regression analysis 600 may be performed based on the second observation matrix X2 602 and the second conversion vector Y2 604 to find a second set of optimal model parameters 608 of the modified second K-th order attribution model 606 that best estimates the dependent variable $Y\_1$ (e.g., dependent variable 414) by the linear combination of the more than one terms of the independent variables (e.g., set of independent variables 416) with respect to a second goodness-of-fit measure 801, according to one embodiment.

The second observation matrix X2 602 of size N×(M2) may be determined based on the set of marketing data 116, the modified second K-th order attribution model 606, and the second set of M functions 432. The second conversion vector Y2 604 of size N×1 may be based on the set of marketing data 116. The second conversion vector Y2 604 may be the first conversion vector Y1 400 with the second function replaced by the fourth function, according to one embodiment.

The second K-th order attribution model 605 may be a K-th order attribution model 410 with the M independent variables 418 including $X\_1, X\_2, \ldots$, and $X\_M$, and the dependent variable $Y\_1$ (e.g., dependent variable 414) estimated by the linear combination of more than one terms of the M independent variables 418. The second K-th order attribution model 605 may be the K-th order attribution model 410 minus the set of insignificant second order cross terms 506 identified in the first refining step and the second refining step (refining step 502).

The modified second K-th order attribution model 606 may be constructed by the attribution server 100 by replacing the first function of two of the M independent variables 430 in the second K-th order attribution model 605 by a third function of two of the M independent variables (e.g., set of independent variables 416), according to one embodiment.

The second set of optimal model parameters 608 of the modified second K-th order attribution model 606 may be determined by performing the second regression analysis 600 based on the second observation matrix X2 602 and the second conversion vector Y2 604, according to one embodiment.

Figure 7:
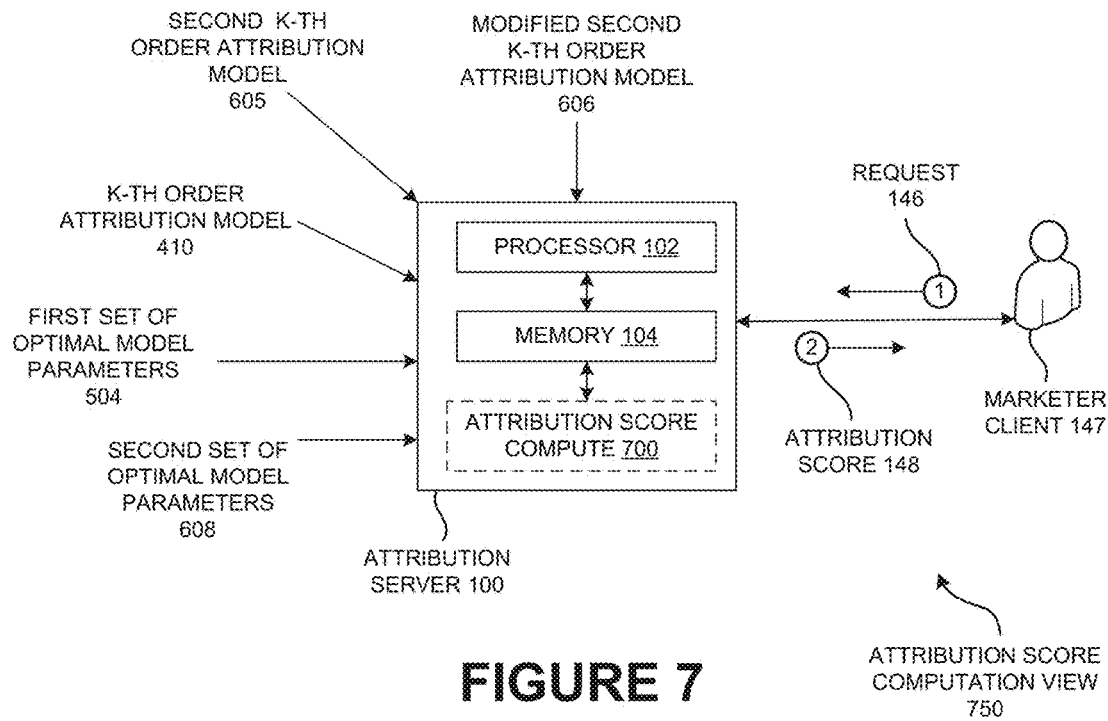
FIG. 7 is an attribution score computation view showing the computation of attribution scores of the P publishing channels based on the attribution models and/or the optimal parameters and the communication of the attribution scores to the marketer client through the network by the non-converting publisher attribution weighting and analytics server (e.g., attribution server) of FIG. 1, according to one embodiment.

FIG. 7 is an attribution score computation view 750 showing the computation of attribution scores 148 of the P publishing channels 106 based on the attribution models and/or the optimal parameters the communication of the attribution scores to the marketer client through the network by the non-converting publisher attribution weighting and analytics server 100 of FIG. 1, according to one embodiment. In particular, FIG. 7 builds on FIGS. 1 through 6, and further adds, an attribution score compute 700.

The attribution score compute 700 may be the process of computing an attribution score 148 associated with the P publishing channels based on the K-th order attribution model 410, the modified second K-th order attribution model 606, the first set of optimal model parameters 504 and the second set of optimal model parameters 608. The attribution score 148 of one publisher may be based, at least partially, on the first order model parameter associated with the publisher in the second set of optimal model parameters 608. The attribution score 148 of one publisher may also be based, at least partially, on the first order model parameter and/or some second order cross terms associated with the publisher in the second set of optimal model parameters 608, according to one embodiment.

Figure 8:
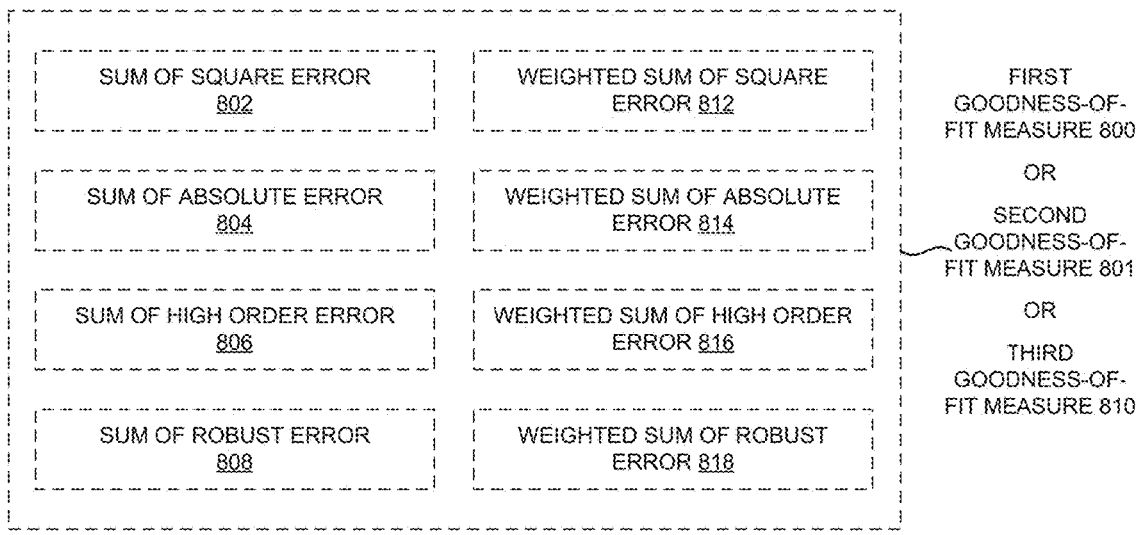
FIG. 8 is a goodness-of-fit measure view illustrating different errors and weighted errors being used as the first, second and/or third goodness-of-fit measures, according to one embodiment.

FIG. 8 is a goodness-of-fit measure view 850 illustrating different errors and weighted errors being used as the first, second and/or third goodness-of-fit measures, according to one embodiment. In particular, FIG. 8 builds on FIGS. 1 through 7, and further adds, first goodness-of-fit measure 800, second goodness-of-fit measure 801, sum of square error 802, sum of absolute error 804, sum of high order error 806, sum of robust error 808, third goodness-of-fit measure 810, weighted sum of square error 812, weighted sum of absolute error 814, weighted sum of high order error 816 and weighted sum of robust error 818, according to one embodiment.

The first goodness-of-fit measure 800 may be used to measure and/or analyze how well the K-th order attribution model 410 fits the collected data (e.g., set of first marketing data 122) to best estimate the dependent variable Y_1 (e.g., dependent variable 414) by the linear combination of the more than one terms of the M independent variables (e.g., set of independent variables 416). The first goodness-of-fit measure 800 may be a sum of square error 802, a sum of absolute error 804, a sum of high order error 806, a sum of robust error 808, a weighted sum of square error 812, a weighted sum of absolute error 814, a weighted sum of high order error 816, and/or a weighted sum of robust error 818, according to one embodiment.

The second goodness-of-fit measure 801 may be used to measure and/or analyze how well the modified second K-th order attribution model 606 fits the collected data (e.g., set of first marketing data 122) to best estimate the dependent variable Y_1 (e.g., dependent variable 414) by the linear combination of the more than one terms of the M independent variables (e.g., set of independent variables 416). The second goodness-of-fit measure 801 may be a sum of square error 802, a sum of absolute error 804, a sum of high order error 806, a sum of robust error 808, a weighted sum of square error 812, a weighted sum of absolute error 814, a weighted sum of high order error 816, and/or a weighted sum of robust error 818. Each robust error may include square error for error magnitude less than a threshold 'TH5', and absolute error for error magnitude greater than the threshold TH5, according to one embodiment.

The sum of square error 802 may be the sum of the squares of the residual errors, and/or the sum of the squares of the deviations of the predicted value (estimate) of the dependent variable Y_1 (e.g., dependent variable 414) based on the linear combination of the M independent variables 418 from the actual empirical values of the dependent variable Y_1 (e.g., dependent variable 414). The sum of absolute error 804 may be the sum of the magnitude of the difference between the exact value and the approximation. The sum of high order error 806 may be the sum of the $k^{th}$-order (where k is not 1 or 2) of the magnitude of the residual errors and/or the magnitude of deviations of the predicted values of Y_1 from the empirical values of Y_1, according to one embodiment.

The sum of robust error 808 may be the sum of robust error of individual residual error and/or the deviation of predicted values of Y_1 from empirical values of Y_1. The robust error is an error measure robust to outliers (with large magnitude). Any outlier with large magnitude may dominate and shape the result of the regression analysis. If the outliers themselves are not reliable, the resulting estimate of Y_1 may become unreliable. Thus a robust error may seek to limit the impact of the large-magnitude outliers on the resulting estimate. A robust error may simply remove the residual error with magnitude larger than a threshold. Another possible robust error may sort all the residual error by magnitude and remove a percentage (e.g. 10%) of the largest (by magnitude) residual error. An example of this may be the trimmed mean used in Olympic games in which, out of 7 scores from 7 judges, the largest and the smallest scores (considered outliers) are removed and the rest are averaged. Another robust error may be one that use square error when the error magnitude is smaller than a threshold and absolute error when the error magnitude is larger than the threshold, according to one embodiment.

Third goodness-of fit measure 810 may be used to measure and/or analyze how well the modified second K-th order attribution model 606 fits the collected data (e.g., set of first marketing data 122) to best estimate the dependent variable Y_1 (e.g., dependent variable 414) by the linear combination of the more than one terms of the M independent variables (e.g., set of independent variables 416). The third goodness-of fit measure 810 may be a sum of square error 802, a sum of absolute error 804, a sum of high order error 806, a sum of robust error 808, a weighted sum of square error 812, a weighted sum of absolute error 814, a weighted sum of high order error 816, and/or a weighted sum of robust error 818. The third goodness-of-fit measure 810 may be different from the first and/or second goodness-of-fit measure 800/801, according to one embodiment.

The weighted sum of square error 812 may be weighted sum of the squares of residuals, deviations predicted from actual empirical values of data. The weighted sum of absolute error 814 may be the magnitude of the difference between the exact value and the approximation. Some residual errors associated with some data points may be more important and/or more dominant than others. The more important and/or more dominant residual errors (associated with the more important and/or more dominant data points of the marketing data) may be weighted by a larger weight so that their importance and/or dominance may be reflected/considered in the regression analysis, according to one embodiment.

The weighted sum of high order error 816 may be the sum of high order error with each error term weighted by a weight. The weight of an error term may reflect the importance and/or dominance of the error term. The weight of an error term may reflect the importance and/or dominance of the particular data point associated with the error term, according to one embodiment.

The weighted sum of robust error 818 may be the sum of robust error with each error term weighted by a weight. The weight of an error term may reflect the importance and/or dominance of the error term. The weight of an error term may reflect the importance and/or dominance of the particular data point associated with the error term, according to one embodiment.

Figure 9:
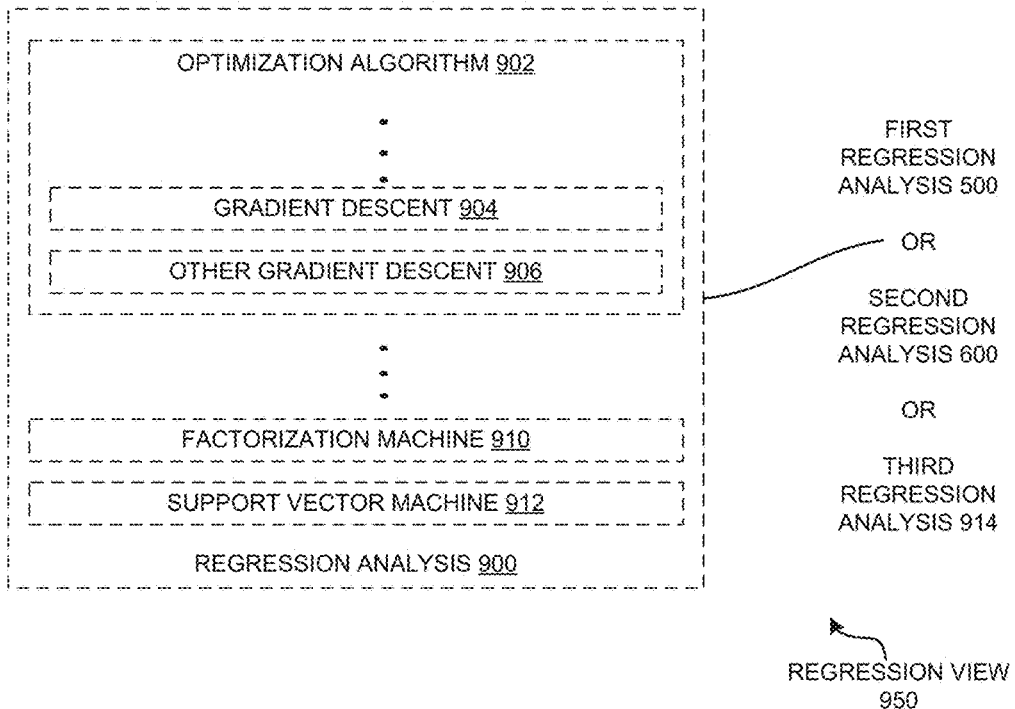
FIG. 9 is a regression view illustrating different algorithms and/or modules being used in the first, second and/or third regression analysis, according to one embodiment.

FIG. 9 is a regression view 950 illustrating different algorithms and/or modules being used in the first, second and/or third regression analysis, according to one embodiment. In particular, FIG. 9 builds on FIGS. 1 through 8, and further adds, a regression analysis 900, optimization algorithm 902, gradient descent 904, other gradient descent 906, factorization machine 910, support vector machine 912 and third regression analysis 914.

The regression analysis 900 may be a statistical process for estimating the relationships among variables. The first regression analysis 500 may include techniques for modeling and analyzing several variables (e.g., relationship between a dependent variable 414 and one or more independent variables 418). The first regression analysis 500 and/or the second regression analysis 600 may include an application of a numerical minimization algorithm, a linear regression algorithm, and/or a factorization machine algorithm 910, according to one embodiment.

Optimization algorithm 902 may be the step by step procedure designed to find the minimum (or maximum) values of mathematical functions (e.g., set of M functions 432). The optimization problem may consist of maximizing and/or minimizing a real function by systematically choosing input values from within an allowed set and computing the value of the function. Optimization may include finding "best available" values of some objective function given a defined domain (or a set of constraints), including a variety of different types of objective functions and different types of domains, according to one embodiment.

The gradient descent 904 may be a stochastic approximation of the gradient descent optimization method for minimizing an objective function that is written as a sum of differentiable functions. Stochastic gradient descent algorithm may be a minimization algorithm. The stochastic approximation of the gradient descent optimization method for minimizing an objective function may be written as a sum of differentiable functions, according to one embodiment.

Other gradient descent 906 may be a Newton's method, a conjugate gradient method, Rprop, Delta rule, a BFGS method, a simulated annealing, a genetic algorithm, a neural network, a swarming technique, a convex optimization method, a method of steepest descent, a greedy algorithm and/or an algorithm that seeks to find a local minimum (or maximum), according to one embodiment.

The factorization machines 910 may be a generic approach that allows mimicking most factorization models by feature engineering. The factorization machines may combine the generality of feature engineering with the superiority of factorization models in estimating interactions between categorical variables of large domain. The support vector machine 912 may be a minimization algorithm and a factorization machine algorithm 910 to obtain a factorized matrix V of size M×L, where L is an integer not greater than M, according to one embodiment.

Figure 10:
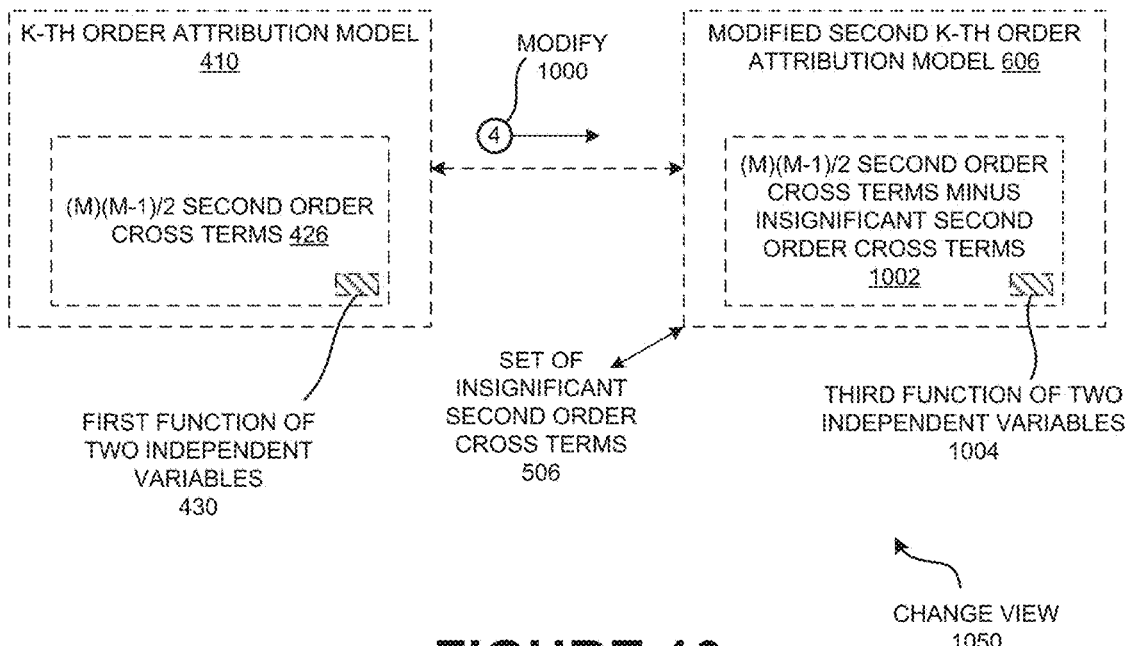
FIG. 10 is a change view illustrating construction of a modified second K-th order attribution model by replacing the first function of two independent variables in the K-th order attribution model by a third function of two independent variables and by removing the set of insignificant second order cross terms identified by the non-converting publisher attribution weighting and analytics server (e.g., attribution server) of FIG. 1, according to one embodiment.

FIG. 10 is a change view 1050 illustrating construction of a modified second K-th order attribution model 606 by replacing the first function of two independent variables 430 in the K-th order attribution model 410 by a third function of two independent variables and by removing the set of insignificant second order cross terms identified by the non-converting publisher attribution weighting and analytics server 100 of FIG. 1, according to one embodiment. In particular, FIG. 10 builds on FIGS. 1 through 9, and further adds, modify 1000, (M)(M−1)/2 second order cross terms minus insignificant second order cross terms 1002 and third function of two independent variables 1004, according to one embodiment.

The estimation of the dependent variable Y_1 may include the (M)(M−1)/2 second order cross terms 426 which further includes the first function of two of the M independent variables 430 weighted by one of the (M)(M−1)/2 second order model parameters 428 minus the set of insignificant second order cross terms 1002 of the K-th order attribution model 410 identified in the at least one refining step 502 (e.g., using modify 1000). The attribution server 100 may construct a modified second K-th order attribution model 606 by replacing the first function of two of the M independent variables 430 in the second K-th order attribution model 605 by a third function of two independent variables 1004, according to one embodiment.

Figure 11:
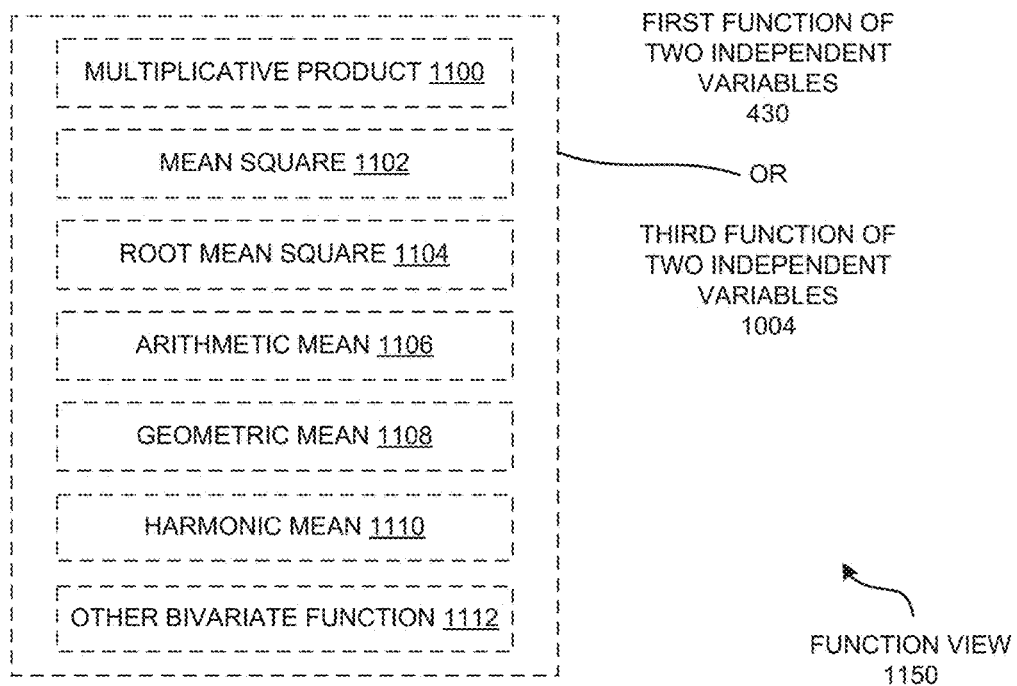
FIG. 11 is a function view illustrating different functional forms of the first and/or third functions of two independent variables in the second order cross terms of the K-th order attribution model and/or the modified second K-th order attribution model, according to one or more embodiments.

FIG. 11 is a function view 1150 illustrating different functional forms of the first and/or third functions of two independent variables in the second order cross terms of the K-th order attribution model and/or the modified second K-th order attribution model, according to one or more embodiments. In particular, FIG. 11 builds on FIGS. 1 through 10, and further adds, a third function of two independent variable 1004, a multiplicative product 1100, a mean square 1102, a root mean square 1104, a arithmetic mean 1106, a geometric mean 1108, a harmonic mean 1110, other bivariate function 1112, according to one embodiment.

The multiplicative product 1100 may be the multiplication of the two independent variables. The mean square 1102 may be the average of the square of the two independent variables. The root mean square 1104 may be the square root of the mean square 1102. The arithmetic mean 1106 may be the average of the two independent variables 418. The geometric mean 1108 may be the square root of the product of the two independent variables 418, according to one embodiment.

The harmonic mean 1110 may be the reciprocal of the average of the reciprocal of the two independent variables 418. Small values tend to dominate in the harmonic mean 1110. Other bivariate function 1112 may be a distinct function alternative to the mean square 1102, the root mean square 1104, the arithmetic mean 1106, the geometric mean 1108 or the harmonic mean 1110, which involves and/or depends on two variables, according to one embodiment.

The first and/or third function of two of the M independent variables 1004 in the second order cross terms of the modified second K-th order attribution model 606 may be the multiplicative product 1100, the mean square 1102, the root mean square 1104, the arithmetic mean 1106, the geometric mean 1108, the harmonic mean 1110 and/or other bivariate function 1112 of the two of the M independent variables, according to one embodiment.

Figure 12:
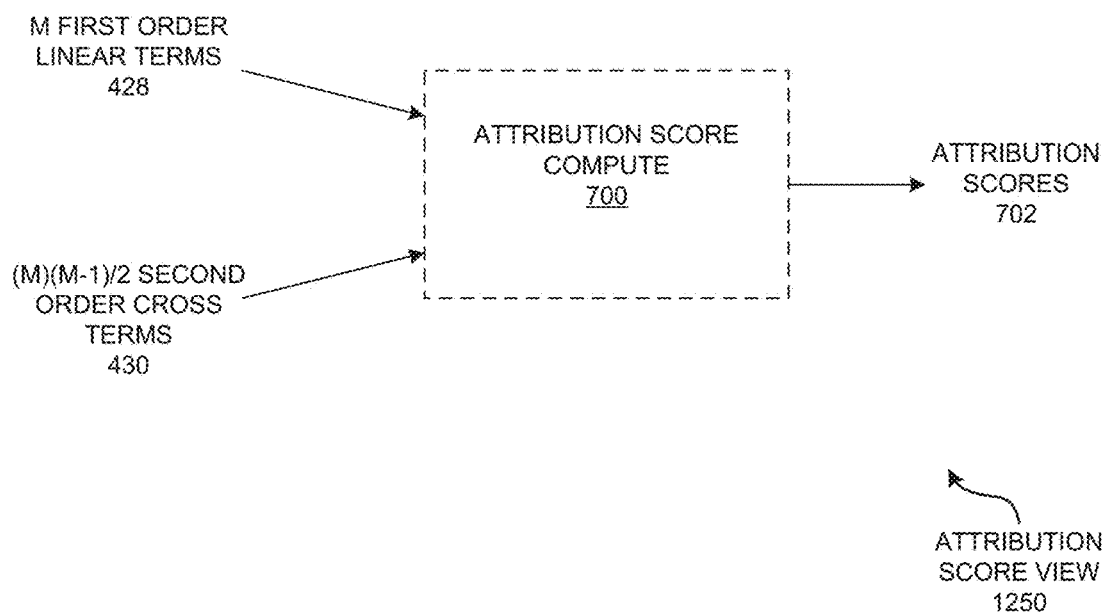
FIG. 12 is an attribution score view illustrating the attribution scores of the publishing channels being computed based on the first order linear terms and/or the second order cross terms of the attribution models, according to one or more embodiments.

FIG. 12 is an attribution score view 1250 illustrating the attribution scores 148 of the publishing channel 106 being computed based on first order linear terms (e.g., M first order linear terms 422) and/or second order cross terms (e.g., M)(M−1)/2 second order cross terms 426) of the attribution models, according to one or more embodiments.

In particular, FIG. 12 builds on FIGS. 1 through 11, and further adds an attribution score compute 700, an attribution scores 702.

FIG. 12 illustrates the process for computation of the attribution score 702. Once the request a marketer client 147 is received through the network for the attribution scores 702 associated with the P publishing channels 107, the attribution score 148 is computed. The attribution score 148 based on the M first order linear terms 422 and (M)(M−1)/2 second order cross terms 426 may be computed by the attribution server 100. After the computation, the attribution score 702 may communicated to the marketer client 147 through the network, according to one embodiment.

Figure 13:
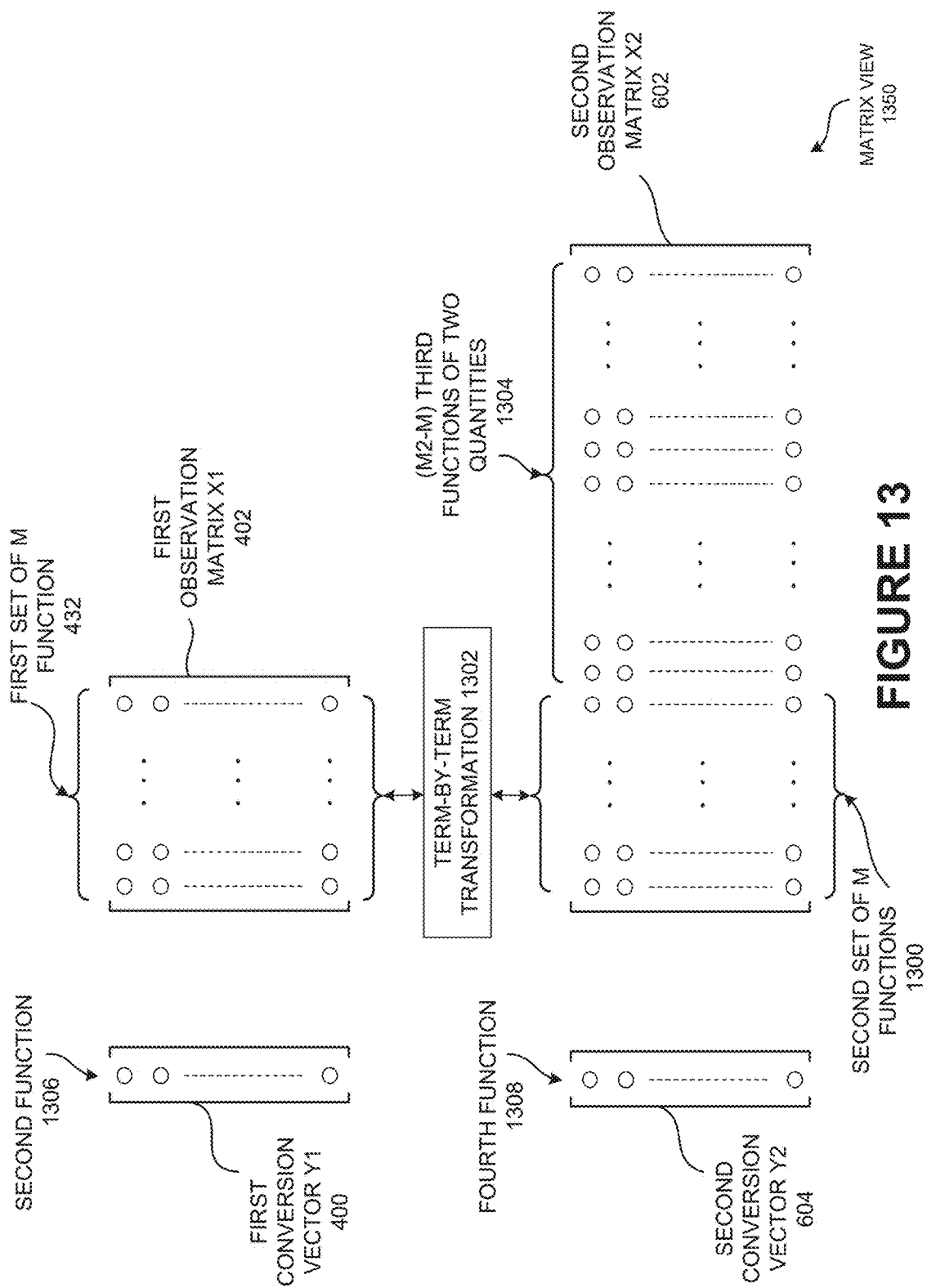
FIG. 13 is a matrix view illustrating the functions applied to the first and/or second conversion vectors (Y1 and/or Y2) and the first and second observation matrix (X1 and/or X2) associated with the K-th order attribution model and/or the modified second K-th order attribution model, according to one embodiment.

FIG. 13 is a matrix view 1350 illustrating the functions applied to the first and/or second conversion vectors (Y1 400 and/or Y2 604) and the first and second observation matrix (X1 402 and/or X2 602) associated with the K-th order attribution model 410 and/or the modified second K-th order attribution model 606, according to one embodiment. In particular, FIG. 13 builds on FIGS. 1 through 12, and further adds, second set of M functions 1300, a term by term transformation 1302, (M2−M) third functions of two quantities 1304, a second function 1306, and a fourth function 1308, according to one embodiment.

The term-by-term transformation 1302 may mean that each term in M columns of the second observation matrix X2 602 may be obtained by a transformation applied to the corresponding term in the corresponding M columns of the first observation matrix X1 402, and vice versa. The term-by-term transformation 1302 may be in the form of $x_2 = f_2(f_1^{-1}(x_1))$ where, $x_1$ may be an element of the first observation matrix X1 402, $f_1$ may be one of the first set of M functions 432, $f_2$ may be one of the second set of M functions and $x_2$ may be an element of the second observation matrix X2 602. The term-by-term transformation 1302 may take M columns and transform them to N columns, where M !=N. In some embodiments, principle component analysis may be used in the term-by-term transformation 1302. In other embodiments, the columns may be aggregated by some marketing mandate. The term-by-term transformation 1302 may split columns up fractionally as well, based on a marketing requirement and domain or other factual knowledge and/or statistics regarding the publishers.

Each of the second set of M function 1300 may be a linear function, a piecewise linear function, a polynomial, an exponential function, a log function, a monotonic non-decreasing function, another function, and/or a combination of them. The second function 1306 may be an symmetric and/or asymmetric function. Each of the second set of M function 1300 may also contain custom logic, and thus not strictly be a continuous mathematical function.

The second observation matrix X2 602 may be a rectangular array of numbers, symbols, or expressions, arranged in rows and columns whose values are based on second set of observation. The attribution server 100 (e.g., a non-converting publisher attribution weighting and analytics server) may determine the second observation matrix X2 602 based on the set of marketing data 116, the modified second K-th order attribution model 606, and the second set of M functions 1300, according to one embodiment. The second observation matrix X2 602 may have M columns corresponding to the first order linear terms of the modified second K-th order attribution model, and (M2−M) columns corresponding to the significant (i.e. not insignificant) second order cross terms of the modified second K-th order attribution model. If there are no insignificant second order cross terms. M2 may be equal to M(M−1)/2. If there are insignificant second order cross terms. M2 may be less than M(M−1)/2.

The (M2−M) third functions of two quantities 1304 may be any bivariate functions of two independent variables. The third functions of two quantities 1304 may be mean, mean square, root mean square, arithmetic mean, geometric mean and/or harmonic mean.

The second function 1306 may be a linear function, a piecewise linear function, a polynomial, an exponential function, a log function, a monotonic non-decreasing function and/or a combination of them. The second function 1306 may be an asymmetric function.

The fourth function 1308 may also be a linear function, a piecewise linear function, a polynomial, an exponential function, a log function, a monotonic non-decreasing function and/or a combination of them. The fourth function 1308 may be an asymmetric function.

Figure 14:
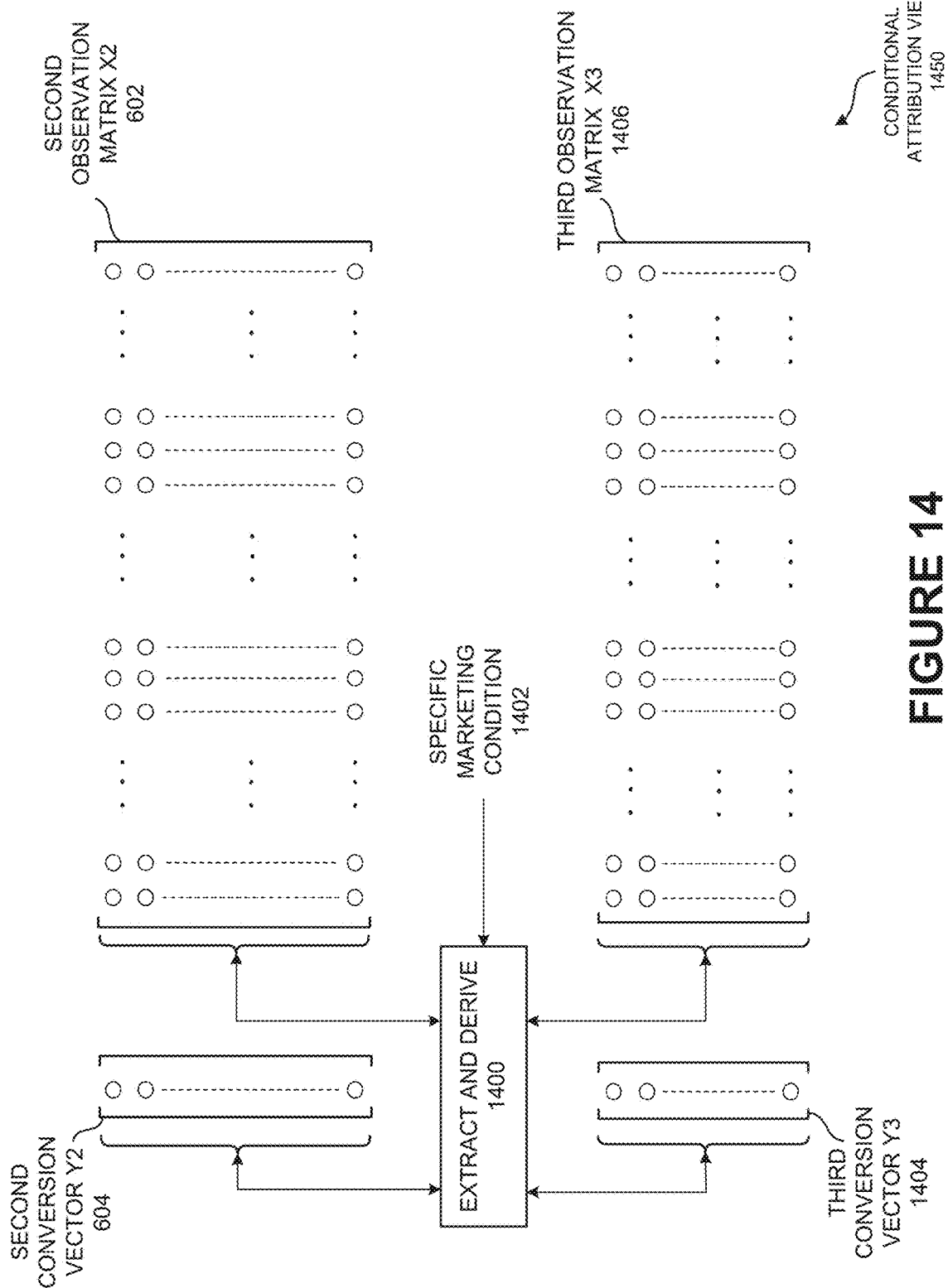
FIG. 14 is a conditional attribution view showing a third observation matrix and a third conversion vector constructed based on extraction and derivation on the set of marketing data for a conditional regression analysis and a conditional attribution under a specific marketing condition, according to one embodiment.

FIG. 14 is a conditional attribution view 1450 showing a third observation matrix X3 1406 and a third conversion vector Y3 1404 constructed based on extraction and derivation (e.g., using extract and derive 1400) on the set of marketing data 116 for a conditional regression analysis and a conditional attribution under a specific marketing condition (e.g., first marketing condition 114, second marketing condition 134 and/or other marketing condition), according to one embodiment.

In particular, FIG. 14 builds on FIGS. 1 through 13, and further adds, a extract and derive 1400, a specific marketing condition 1402, a third conversion vector Y3 1404, and a third observation matrix 1406. The extract and derive 1400 may be used to construct third observation matrix X3 1406 and a third conversion vector Y3 1404 based on the set of marketing data 116 conditional regression analysis and conditional attribution under a specific marketing conditions, according to one embodiment.

The specific marketing condition 1402 may be a distinct and/or particular marketing condition. The specific marketing condition 1402 may be a stronger limitation than the first marketing condition 114. The specific marketing condition 1402 may be the first marketing condition 114 plus one or more additional marketing conditions. Some examples of the specific marketing condition 1402 may be "male customers only", "female customers only", "those aged between 14 and 20", "customers in California who are fans of the NBA team Golden State Warriors", and/or "those who play games from 12 midnight to 7 am", according to one embodiment. It could also include those active users who do not use search advertising (or some other 'type' of advertising medium) to find out about the product, thus providing a narrower focus with respect to advertising. This is an important use case because it alters the number of columns in the training matrix. The specific marketing condition 1402 may further include active users who do not use search advertising and/or other types of advertising medium to find out about the products (e.g., thus providing a narrower focus with respect to advertising. This may be an important use case because it may alter the number of columns in the training matrix).

The third conversion vector Y3 1404 may be of size (N2)×1, where N2 is less than or equal to N. The third observation matrix X3 1406 may be a rectangular array of size (N2×M2). It may be an array of numbers, symbols, or expressions, arranged in rows and columns whose values are based on third set of observations. The attribution server 100 (e.g., a non-converting publisher attribution weighting and analytics server) determines second observation matrix X2 602. The third observation matrix X3 1406 may be based on the N1 first data points 120 and the N2 second data points 124, according to one embodiment.

Figure 15A:
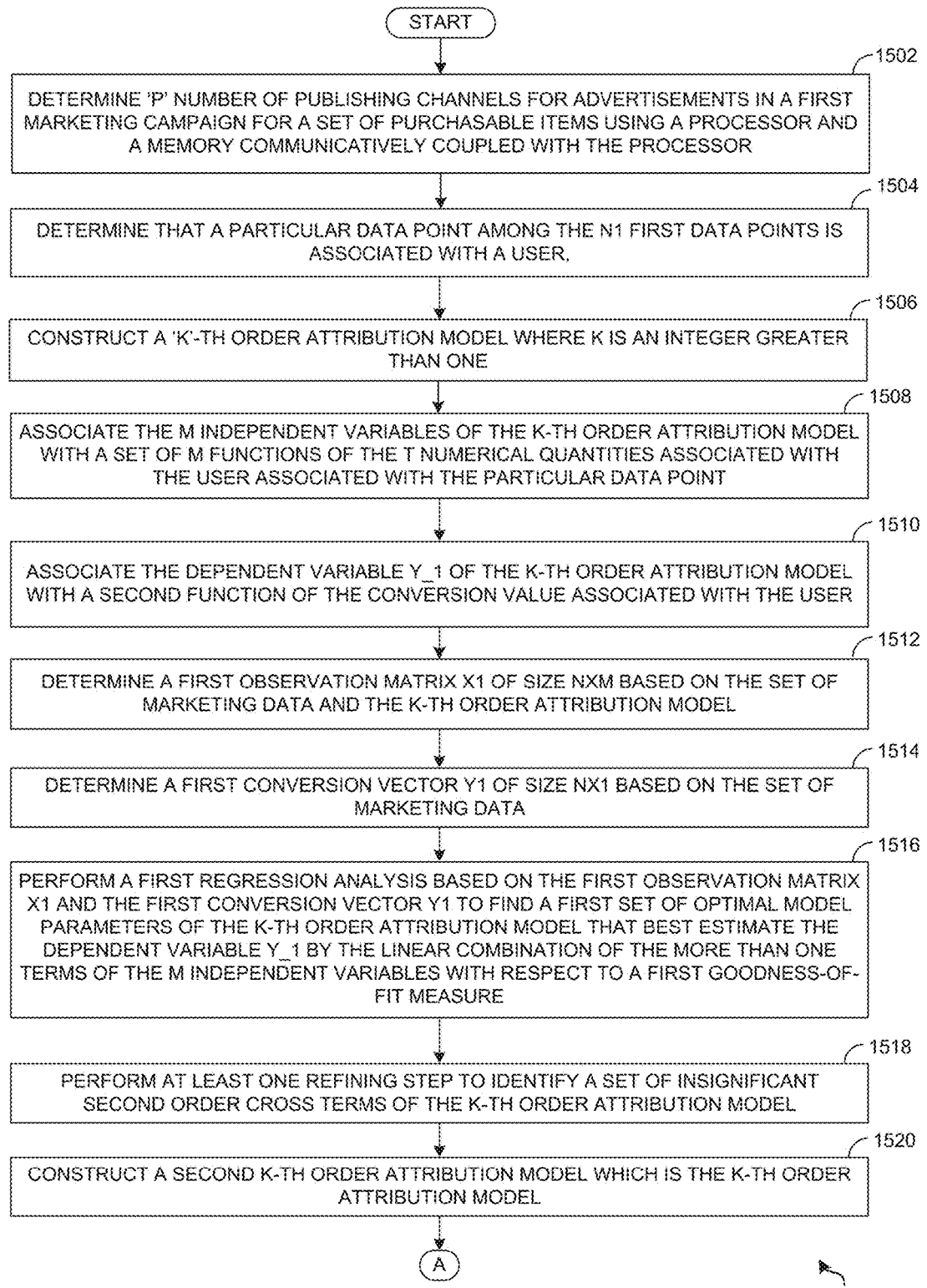
FIG. 15A illustrates a process flow for computing an attribution score associated with P publishing channels based on a conversion value associated with a user of P publishing channels by the non-converting publisher attribution weighting and analytics server (e.g., attribution server) of FIG. 1, according to one embodiment.

FIG. 15A illustrates a process flow 1550A for computing an attribution score 148 associated with a P publishing channels 107 based on a conversion value 140 associated with a user 138 of P publishing channels by the attribution server 100 (e.g., non-converted publishing attribution weighting and analytics server) of FIG. 1, according to one embodiment.

In operation 1502, the non-converting publisher attribution weighting and analytics server determines 'P' number of publishing channel (e.g. set of 'P' publishing channels 107) available for advertisement 110 in the first marketing campaign 108 for the particular set of purchasable items 112 using a processor 102 and memory 104, according to one embodiment.

In operation 1504, the non-converting publisher attribution weighting and analytics server determines whether the particular data point 136 among the N1 first data point 120 is associated with the user 138 or not, according to one embodiment. In operation 1506, the non-converting publisher attribution weighting and analytics server constructs a K'-th order attribution model 410 where k is an integer greater than one, according to one embodiment.

In operation 1508, the non-converting publisher attribution weighting and analytics server further associates the M independent variables (e. g. set of independent variables 416) of the 'K'-th order attribution model 410 with a set of M functions 432 of the T numerical quantities (e.g. set of 'T' numerical values 316) associated with the user 138 with the particular data point 136, according to one embodiment.

In operation 1510, the non-converting publisher attribution weighting and analytics server associates the dependent variable Y_1 (e. g. dependent variable 414) of the 'k'-th order attribution model 410 with a second function 434 of the conversion value 140 associated with the user 138, according to one embodiment.

In operation 1512, the non-converting publisher attribution weighting and analytics server determines a first observation matrix X1 402 of size N×M based on the set of marketing data 116 and the 'K'-th order attribution model 410, according to one embodiment.

In operation 1514, the non-converting publisher attribution weighting and analytics server determines a first conversion vector Y1 400 of size N×1 based on the set of marketing data 116, according to one embodiment. In operation 1516, the non-converting publisher attribution weighting and analytics server performs a first regression analysis 500 based on the first observation matrix X1 402 and the first conversion vector Y1 400 to find a first set of optimal model parameters 504 of the K-th order attribution model 410 that best estimates the dependent variable Y_1 (e.g. dependent variable 414) by the linear combination of the more than one terms of the M independent variables (e.g. set of independent variables 416) with respect to a first goodness-of-fit measure 800, according to one embodiment.

In operation 1518, the non-converting publisher attribution weighting and analytics server performs at least one refining step 502 to identify a set of insignificant second order cross terms 506 of the 'K'-th order attribution model 410, according to one embodiment. In operation 1520, the non-converting publisher attribution weighting and analytics server constructs the second 'K'-th order attribution model 605 which is the 'K'-th order attribution model 410, according to one embodiment.

Figure 15B:
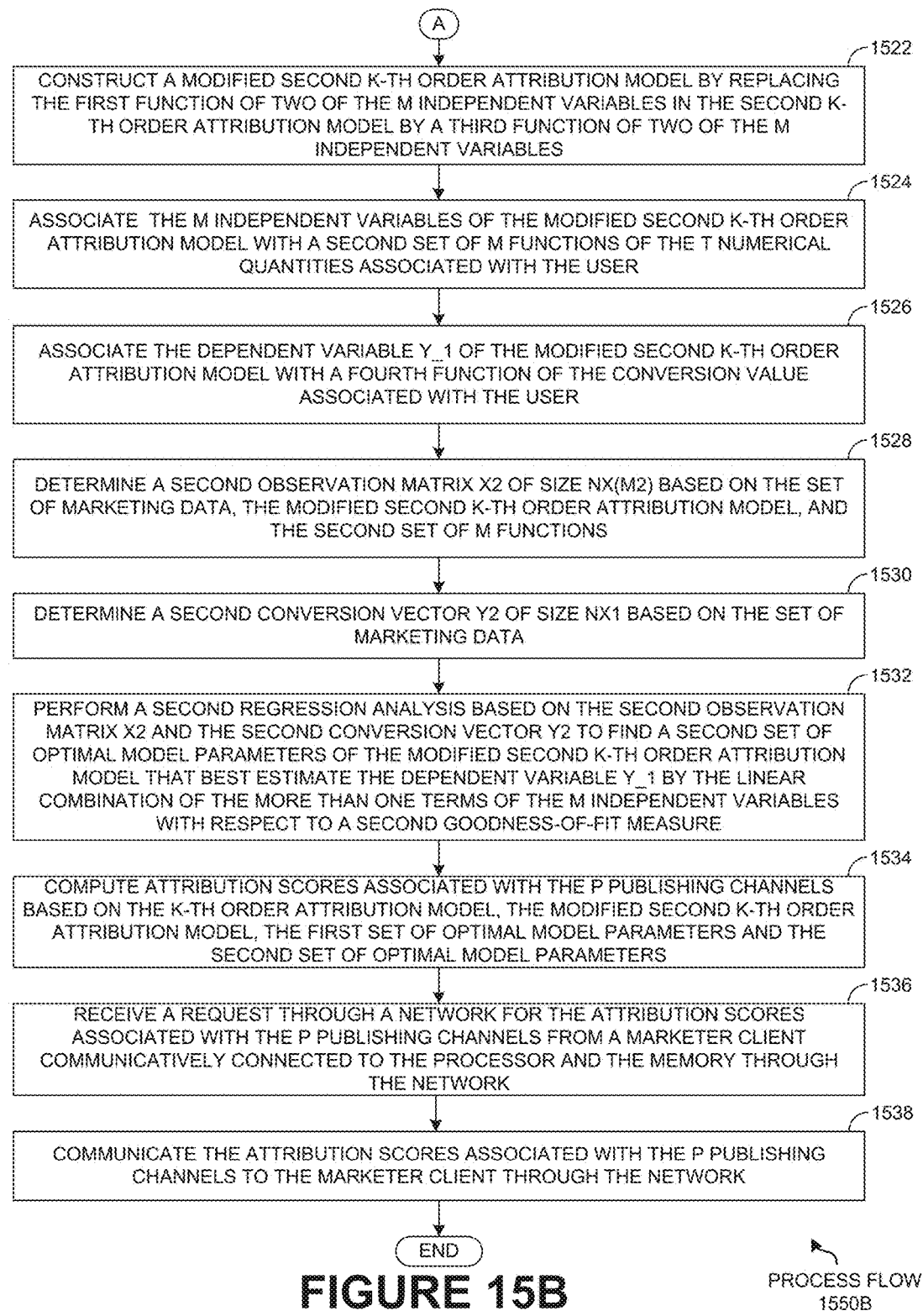
FIG. 15B is a continuation of process flow of FIG. 15A, according to one embodiment.

FIG. 15B is a continuation of process flow of FIG. 15A, according to one embodiment.

In operation 1522, the non-converting publisher attribution weighting and analytics server constructs a modified second 'K'-th order attribution model 606 by replacing the first function of two of the M independent variables (e.g. first function of two independent variables 430) in the second 'K'-th order attribution model '605' by a third function of two of the M independent variables (third function of two independent variables 1004), according to one embodiment.

In operation 1524, the non-converting publisher attribution weighting and analytics server associates the M independent variables (e.g. set of independent variables 416) of the modified second 'K'-th order attribution model 606 with a second set of M functions 1300 of the T numerical quantities (e.g. set of 'T' numerical values 316) associated with the user 138, according to one embodiment.

In operation 1526, the non-converting publisher attribution weighting and analytics server associates the dependent variable Y_1 (e.g. dependent variable 414) of the modified second 'K'-th order attribution model 606 with a fourth function of the conversion value 140 associated with the user 138, according to one embodiment. In operation 1528, the non-converting publisher attribution weighting and analytics server determines a second observation matrix X2 602 of size N×(M2) based on the set of marketing data 116, the modified second 'K'-th order attribution model 606, and the second set of M functions 1300, according to one embodiment.

In operation 1530, the non-converting publisher attribution weighting and analytics server determines a second conversion vector Y2 604 of size N×1 based on the set of marketing data 116, according to one embodiment. In operation 1532, the non-converting publisher attribution weighting and analytics server performs a second regression analysis 600 based on the second observation matrix X2 602 and the second conversion vector Y2 604 to find a second set of optimal model parameters 608 of the modified second K-th order attribution model 606 that best estimate the dependent variable Y_1 (e.g., dependent variable 414) by the linear combination of the more than one terms of the M independent variables (e.g., set of independent variables 416) with respect to a second goodness-of-fit measure 801, according to one embodiment.

In operation 1534, the non-converting publisher attribution weighting and analytics server computes attribution scores 148 associated with the 'P' publishing channels (e.g. publishing channel 106) based on the 'k'-th order attribution model 410, the modified second 'k'-th order attribution model 606, the first set of optimal model parameters 504 and the second set of optimal model parameters 608, according to one embodiment.

In operation 1536, the non-converting publisher attribution weighting and analytics server receives a request 146 through a network for the attribution scores 148 associated with the 'P' publishing channels (e.g. publishing channel 106) from a marketer client 147 communicatively connected to the processor 102 and the memory 104 through the network, according to one embodiment. In operation 1538, the non-converting publisher attribution weighting and analytics server communicates the attribution scores 148 associated with the 'P' publishing channels (e.g. publishing channel 106) to the marketer client 147 through the network, according to one embodiment.

Figure 16A:
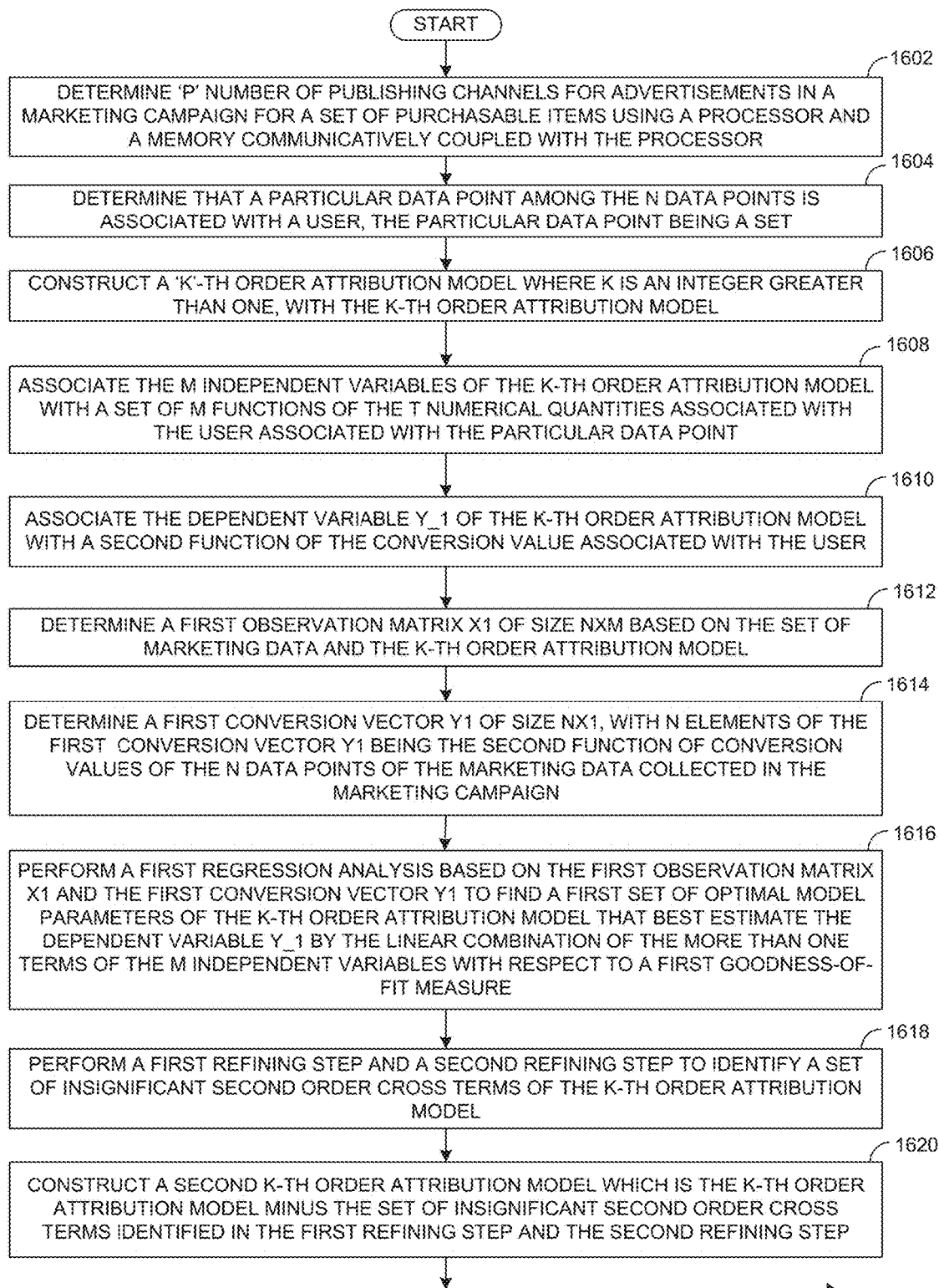
FIG. 16A is a process flow for computing an attribution score associated with P publishing channels based on the K-th order attribution model, the modified second K-th order attribution model, the first set of optimal model parameters and the second set of optimal model parameters by the non-converting publisher attribution weighting and analytics server (e.g., attribution server) of FIG. 1, according to one embodiment.

FIG. 16A is a process flow for computing an attribution score associated with a P publishing channels based on the K-th order attribution model, the modified second K-th order attribution model, the first set of optimal model parameters and the second set of optimal model parameters by the non-converted publishing attribution weighting and analytics server of FIG. 1, according to one embodiment.

In operation 1602, the non-converting publisher attribution weighting and analytics server determines 'P' number of publishing channels (e.g. set of 'P' publishing channels 107) for advertisements 110 in a marketing campaign 108 for a set of purchasable items 112 using a processor 102 and a memory 104 communicatively coupled with the processor 102, according to one embodiment. In operation 1604, the non-converting publisher attribution weighting and analytics server further determines that a particular data point 136 among the N data points associated with a user 138, and the particular data point 136 being a set, according to one embodiment.

In operation 1606, the non-converting publisher attribution weighting and analytics server constructs a 'K'-th order attribution model 410 where K is an integer than one, with the K-th order attribution model 410, according to one embodiment. In operation 1608, the non-converting publisher attribution weighting and analytics server associates the M independent variables (e.g. set of independent variables 416) of the K-th order attribution model 410 with a set of M functions 432 of the T numerical quantities (e.g. set of 'T' numerical values 316) associated with the user 138 associated with the particular data point 136, according to one embodiment.

In operation 1610, the non-converting publisher attribution weighting and analytics server associates the dependent variable Y_1 (e.g. dependent variable 414) of the 'K'-th order attribution model 410 with a second function 434 of the conversion value 140 associated with the user 138, according to one embodiment.

In operation 1612, the non-converting publisher attribution weighting and analytics server determines a first observation matrix X1 402 of size N×M based on the set of marketing data 116 and the 'K'-th order attribution model 410, according to one embodiment. In operation 1614, the non-converting publisher attribution weighting and analytics server determines a first conversion vector Y1 400 of size N×1, with N elements of the first conversion vector Y1 400 being the second function 434 of conversion values 140 of the N data points of the marketing data (e.g. set of first marketing data 122, set of second marketing data 126) collected in the marketing campaign 108, according to one embodiment.

In operation 1616, the non-converting publisher attribution weighting and analytics server performs a first regression analysis 500 based on the first observation matrix X1 402 and the first conversion vector Y1 400 to find a first set of optimal model parameters 504 of the K-th order attribution model 410 which best estimates the dependent variable Y_1 (e.g. dependent variable 414) by the linear combination of the more than one terms of the M independent variables (e.g. set of independent variables 416) with respect to a first goodness-of-fit measure 800, according to one embodiment.

In operation 1618, the non-converting publisher attribution weighting and analytics server performs a first refining step (e.g. refining step 502) and a second refining step (e.g. refining step 502) to identify a set of insignificant second order cross terms 506 of the 'K'-th order attribution model 410, according to one embodiment. In operation 1620, the non-converting publisher attribution weighting and analytics server constructs a second K-th order attribution model 605 which is the K-th order attribution model 410 minus the set of insignificant second order cross terms 506 identified in the first refining s step (e.g. refining step 502) and the second refining step (e.g. refining step 502), according to one embodiment.

Figure 16B:
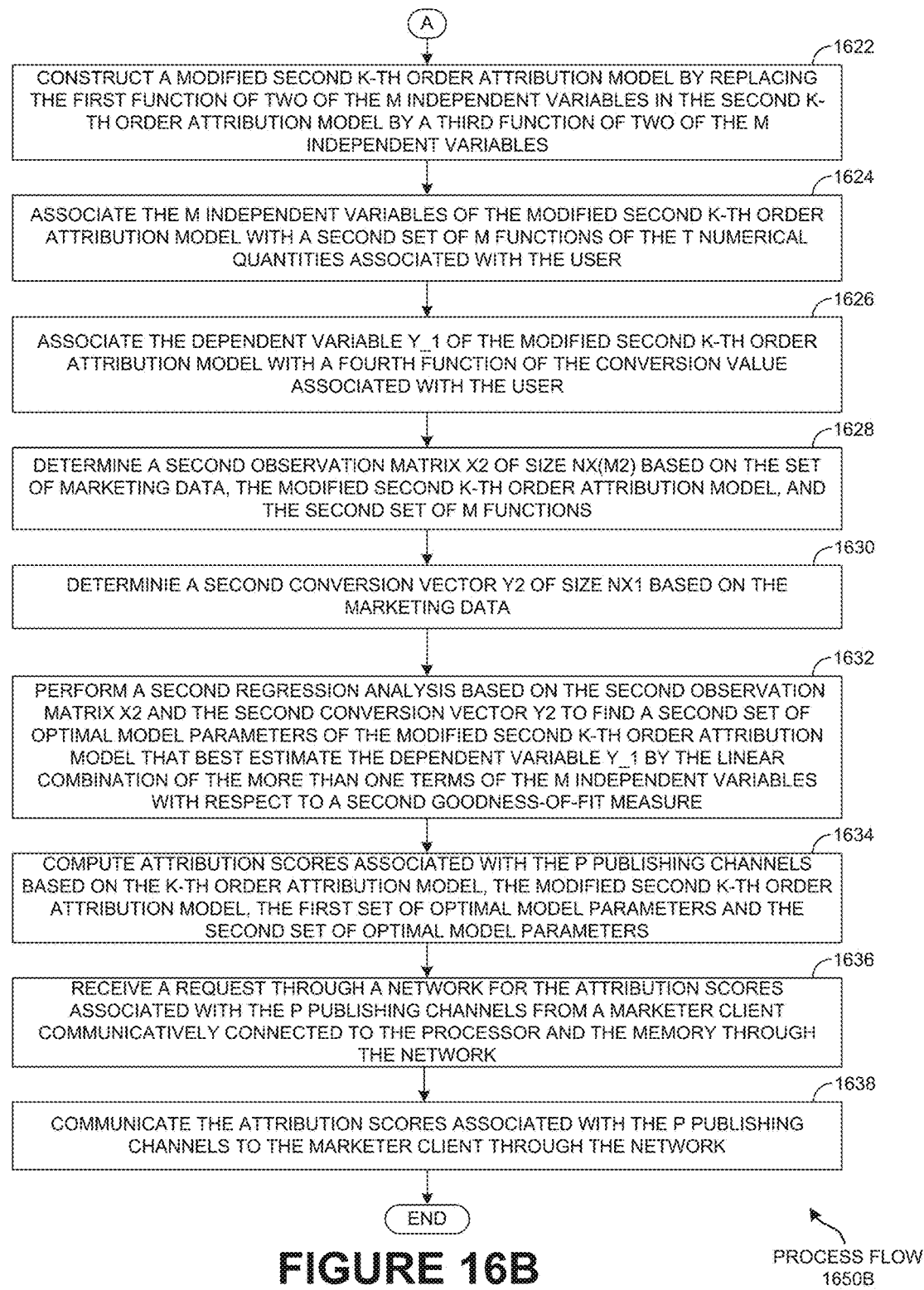
FIG. 16B is a continuation of process flow of FIG. 16A, according to one embodiment.

FIG. 16B is a continuation of process flow of FIG. 16A, according to one embodiment. In operation 1622, the non-converting publisher attribution weighting and analytics server constructs a modified second 'K'-th order attribution model 606 by replacing the first function of two of the M independent variables (e.g. first function of two independent variables 430) in the second 'K'-th order attribution model 605 by a third function of two of the M independent variables (third function of two independent variables 1004) according to one embodiment.

In operation 1624, the non-converting publisher attribution weighting and analytics server associates the M independent variables (e.g. set of independent variables 416) of the modified second 'K'-th order attribution model 606 with a second set of M 1300 of the T numerical quantities (e.g. set of 'T' numerical values 316) associated with the user 138, according to one embodiment.

In operation 1626, the non-converting publisher attribution weighting and analytics server associates the dependent variable Y_1 (e.g. dependent variable 414) of the modified second 'K'-th order attribution model 606 with a fourth function of the conversion value 140 associated with the user 138, according to one embodiment.

In operation 1628, the non-converting publisher attribution weighting and analytics server determines a second observation matrix X2 602 of size N×(M2) based on the set of marketing data 116, the modified second 'K'-th order attribution model 606, and the second set of M functions 1300, according to one embodiment. In operation 1630, the non-converting publisher attribution weighting and analytics server determines a second conversion vector Y2 604 of size N×1 based on the marketing data (e.g. set of second marketing data 126), according to one embodiment.

In operation 1632, the non-converting publisher attribution weighting and analytics server performs a second regression analysis 600 based on the second observation matrix X2 602 and the second conversion vector Y2 604 to find a second set of optimal model parameters 608 of the modified second 'K'-th order attribution model 606 that best estimates the dependent variable Y_1 (e.g. dependent variable 414) by the linear combination of the more than one terms of the M independent variables (e.g. set of independent variables 416) with respect to a second goodness-of-fit measure 801, according to one embodiment.

In operation 1634, the non-converting publisher attribution weighting and analytics server computes attribution scores 148 associated with the 'P' publishing channels (e.g. publishing channel 106) based on the 'K'-th order attribution model 410, the modified second K-th order attribution model 606, the first set of optimal model parameters 504 and the second set of optimal model parameters 608, according to one embodiment.

In operation 1636, the non-converting publisher attribution weighting and analytics server receives a request 146 through a network for the attribution scores 148 associated with the 'P' publishing channels (e.g. publishing channel 106) from a marketer client 147 communicatively connected to the processor 102 and the memory 104 through the network, according to one embodiment. In operation 1638, the non-converting publisher attribution weighting and analytics server then communicates the attribution scores 148 associated with the 'P' publishing channels (e.g. publishing channel 106) to the marketer client 147 through the network, according to one embodiment.

Figure 17A:
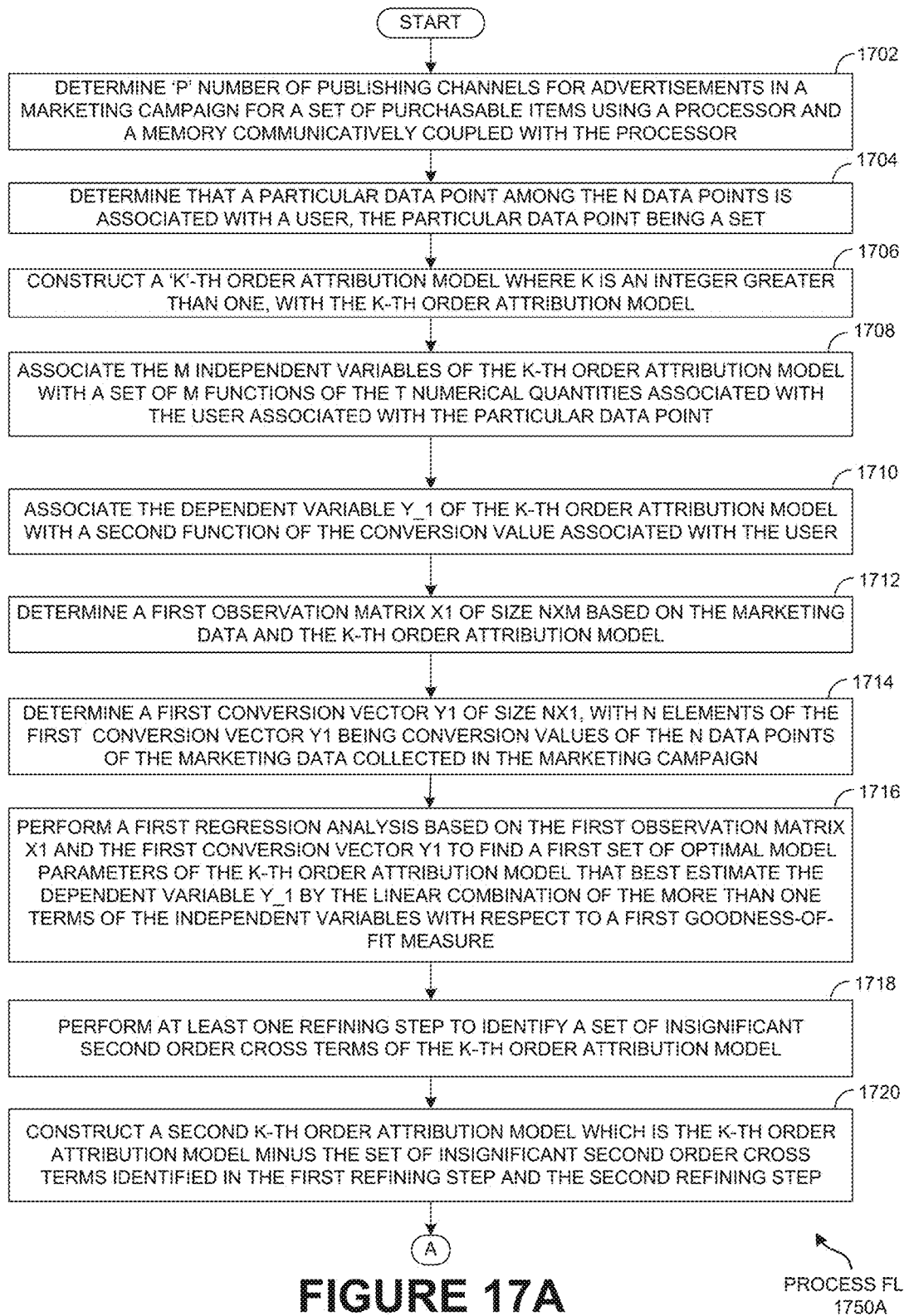
FIG. 17A illustrates another process flow for computing an attribution score associated with P publishing channels based on a conversion value associated with a user of P publishing channels by the non-converting publisher attribution weighting and analytics server (e.g., attribution server) of FIG. 1, according to one embodiment.

FIG. 17A illustrates another process flow for computing an attribution score associated with a P publishing channels based on a conversion value associated with a user of P publishing channels by the non-converted publishing attribution weighting and analytics server of FIG. 1, according to one embodiment.

In operation 1702, the non-converting publisher attribution weighting and analytics server determines 'P' number of publishing channels (e.g. set of 'P' publishing channels 107) for advertisements 110 in a marketing campaign 108 for a set of purchasable items 112 using a processor 102 and a memory 104 communicatively coupled with the processor 102, according to one embodiment. In operation 1704, the non-converting publisher attribution weighting and analytics server determines that a particular data point 136 among the N data points is associated with a user 138, the particular data point 136 being a set, according to one embodiment.

In operation 1706, the non-converting publisher attribution weighting and analytics server constructs a 'K'-th order attribution model 410 where k is an integer greater than one, with the K-th order attribution model 410, according to one embodiment. In operation 1708, the non-converting publisher attribution weighting and analytics server associate the M independent variables (e.g. set of independent variables 416) of the K-th order attribution model 410 with a set of M functions 432 of the T numerical quantities (e.g. set of 'T' numerical values 316) associated with the user 138 associated with the particular data point 136, according to one embodiment.

In operation 1710, the non-converting publisher attribution weighting and analytics server associates the dependent variable Y_1 (e.g. dependent variable 414) of the 'K'-th order attribution model 410 with a second function 434 of the conversion value 140 associated with the user 138, according to one embodiment. In operation 1712, the non-converting publisher attribution weighting and analytics server determines a first observation matrix X1 402 of size N×M based on the marketing data and the 'K'-th order attribution model 410, according to one embodiment.

In operation 1714, the non-converting publisher attribution weighting and analytics server determines a first conversion vector Y1 400 of size N×1, with N elements of the first conversion vector Y1 400 being conversion values 140 of the N data points of the marketing data collected in the marketing campaign 108, according to one embodiment. In operation 1716, the non-converting publisher attribution weighting and analytics server performs a first regression analysis 500 based on the first observation matrix X1 402 and the first conversion vector Y1 400 to find a first set of optimal model parameters of the 'K' th order attribution model 410 that best estimate the dependent variable Y_1 (e.g. dependent variable 414) by the linear combination of the more than one terms of the independent variables 418 with respect to a first goodness-of-fit measure 800, according to one embodiment.

In operation 1718, the non-converting publisher attribution weighting and analytics server performs at least one refining step 502 to identify a set of insignificant second order cross terms 506 of the 'K'-th order attribution model 410, according to one embodiment. In operation 1720, the non-converting publisher attribution weighting and analytics server constructs a second 'K'-th order attribution model 605 which is the 'K'-th order attribution model 410 minus the set of insignificant second order cross terms 506 identified in the first refining step (e.g. refining step 502) and the second refining step (e.g. refining step 502), according to one embodiment.

Figure 17B:
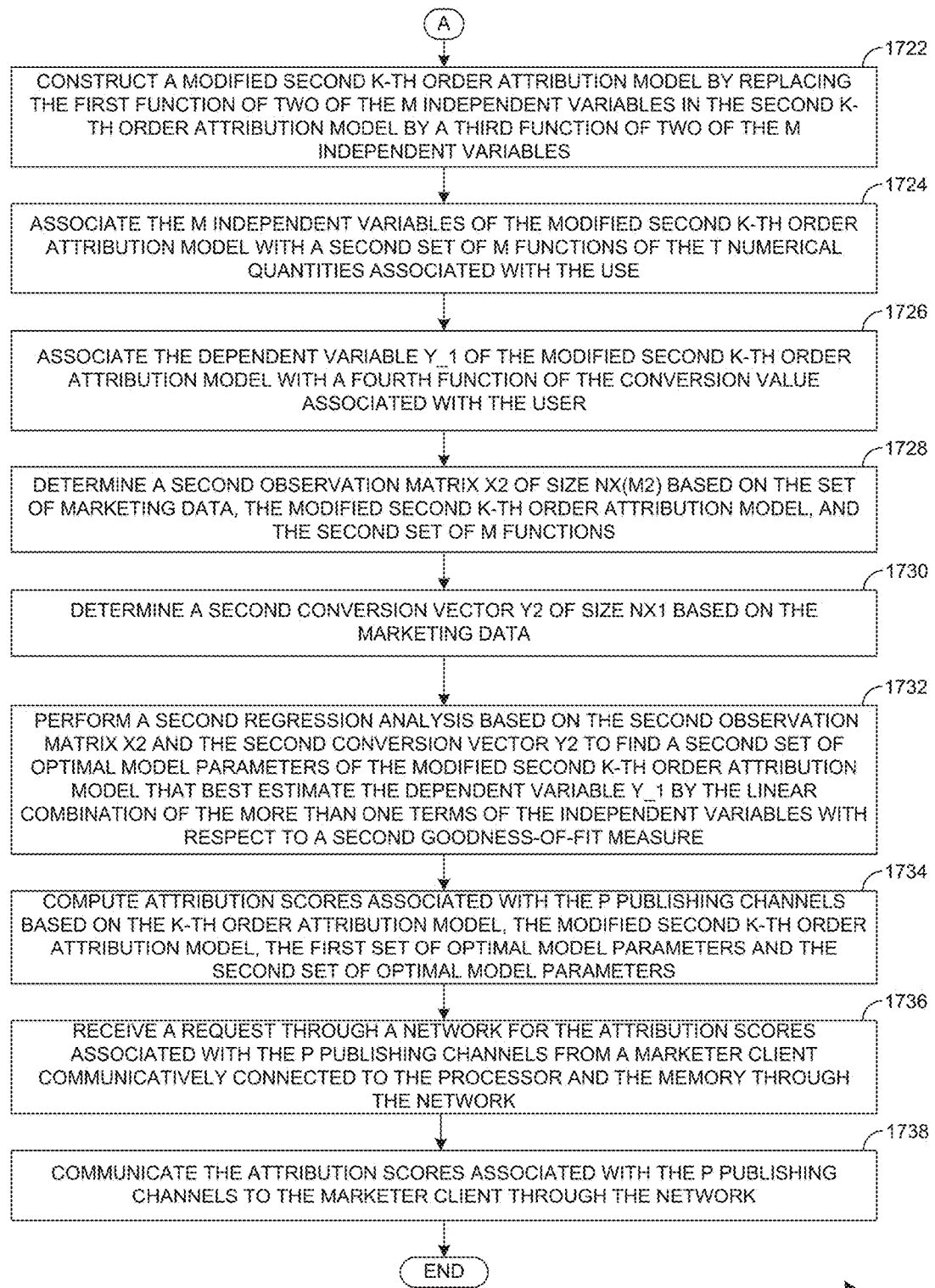
FIG. 17B is a continuation of process flow of FIG. 17A, according to one embodiment.

FIG. 17B is a continuation of process flow of FIG. 17A, according to one embodiment.

In operation 1722, the non-converting publisher attribution weighting and analytics server constructs a modified second k-th order attribution model 606 by replacing the first function of two of the M independent variables (e.g. first function of two independent variables 430) in the second K-th order attribution model 605 by a third function of two of the M independent variables (third function of two independent variables 1004), according to one embodiment.

In operation 1724, the non-converting publisher attribution weighting and analytics server associates the M independent variables (e.g., set of independent variables 416) of the modified second 'K'-th order attribution model 606 with a second set of M functions (e.g. set of m functions 432) of the T numerical quantities (e.g., set of 'T' numerical values 316) associated with the user 138, according to one embodiment.

In operation 1726, the non-converting publisher attribution weighting and analytics server associates the dependent variable Y_1 (e.g. dependent variable 414) of the modified second 'K'-th order attribution model 606 with a fourth function of the conversion value 140 associated with the user 138, according to one embodiment.

In operation 1728, the non-converting publisher attribution weighting and analytics server determines a second observation matrix X2 602 of size N×(M2) based on the set of marketing data 116, the modified second 'K'-th order attribution model 606, and the second set of M functions 1300, according to one embodiment. In operation 1730, the non-converting publisher attribution weighting and analytics server determines a second conversion vector Y2 604 of size N×1 based on the marketing data, according to one embodiment.

In operation 1732, the non-converting publisher attribution weighting and analytics server performs a second regression analysis 600 based on the second observation matrix X2 602 and the second conversion vector Y2 604 to find a second set of optimal model parameters 608 of the modified second 'K'-th order attribution model 606 that best estimate the dependent variable Y_1 (e.g. dependent variable 414) by the linear combination of the more than one terms of the independent variables 418 with respect to a second goodness-of-fit measure 801, according to one embodiment.

In operation 1734, the non-converting publisher attribution weighting and analytics server computes attribution scores 148 associated with the 'P' publishing channels (e.g. publishing channel 106) based on the 'K'-th order attribution model 410, the modified second 'K'-th order attribution model 606, the first set of optimal model parameters 504 and the second set of optimal model parameters 608, according to one embodiment.

In operation 1736, the non-converting publisher attribution weighting and analytics server receive a request 146 through a network for the attribution scores 148 associated with the 'P' publishing channels (e.g. publishing channel 106) from a marketer client 147 communicatively connected to the processor 102 and the memory 104 through the network, according to one embodiment.

In operation 1738, the non-converting publisher attribution weighting and analytics server communicates the attribution scores 148 associated with the 'P' publishing channels (e.g. publishing channel 106) to the marketer client 147 through the network, according to one embodiment.

Figure 18:
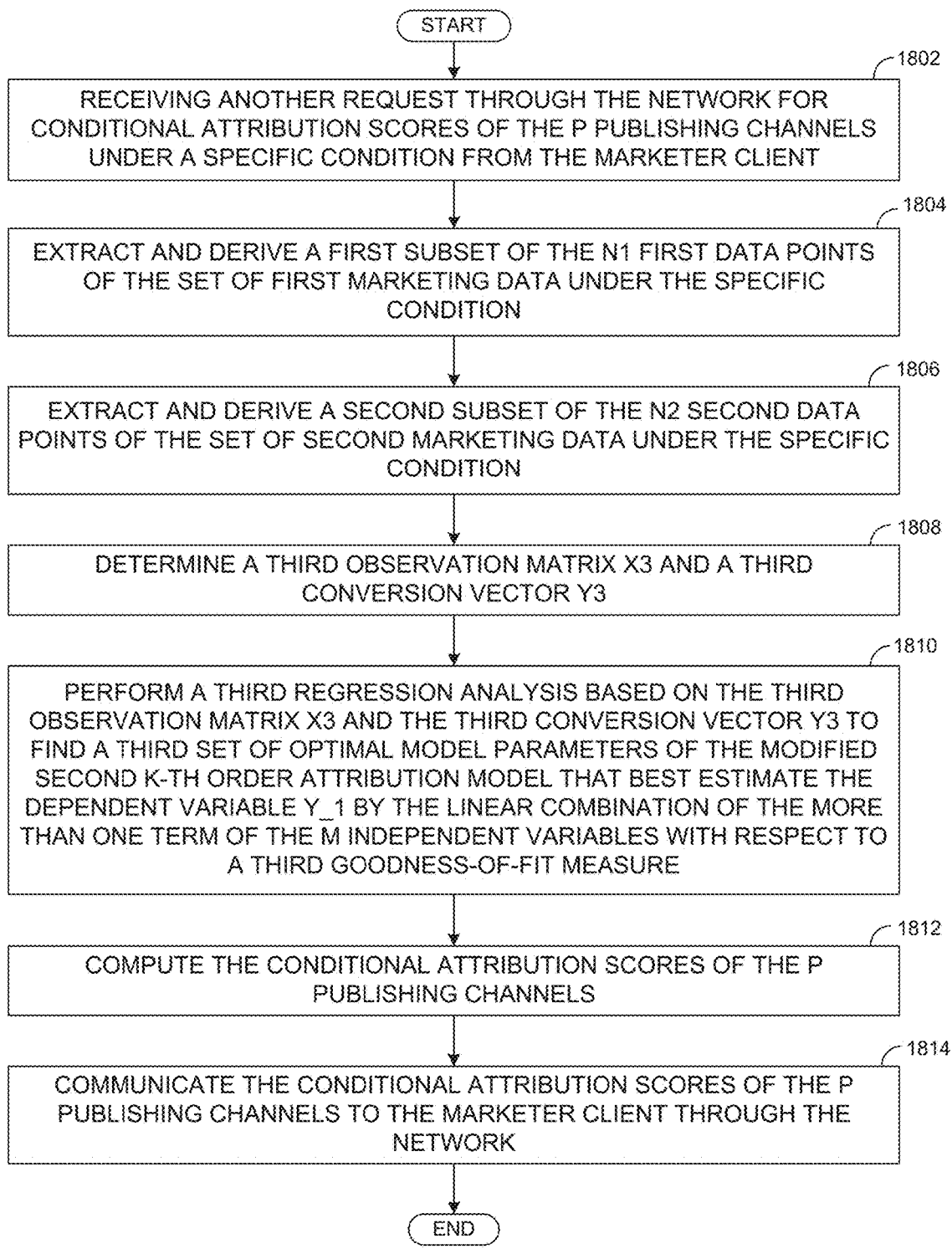
FIG. 18 illustrates a process flow for computing the conditional attribution scores of the P publishing channels by the non-converting publisher attribution weighting and analytics server of FIG. 1, according to one embodiment.

FIG. 18 illustrates a process flow for computing the conditional attribution scores of the P publishing channels by the non-converted publishing attribution weighting and analytics server of FIG. 1, according to one embodiment.

In operation 1802, the non-converting publisher attribution weighting and analytics server receives another request 146 through the network for conditional attribution scores 148 of the 'P' publishing channels (e.g. publishing channel 106) under a specific condition from the marketer client 147, according to one embodiment.

In operation 1804, the non-converting publisher attribution weighting and analytics server extracts and derive a first subset of the N1 first data points (e.g. first data points 120) of the set of first marketing data 122 under the specific condition, according to one embodiment.

In operation 1806, the non-converting publisher attribution weighting and analytics server extracts and derives a second subset of the N2 second data points (e.g. second data points 124) of the set of second marketing data 126 under the specific condition, according to one embodiment.

In operation 1808, the non-converting publisher attribution weighting and analytics server determines a third observation matrix X3 1406 and a third conversion vector Y3 1305, according to one embodiment. In operation 1810, the non-converting publisher attribution weighting and analytics server perform a third regression analysis based on the third observation matrix X3 1406 and the third conversion vector Y3 1305 to find a third set of optimal model parameters of the modified second K-th order attribution model 606 that best estimate the dependent variable Y_1 (e.g. dependent variable 414) by the linear combination of the more than one term of the M independent variables (e.g. set of independent variables 416) with respect to a third goodness-of-fit measure 810, according to one embodiment.

In operation 1812, the non-converting publisher attribution weighting and analytics server compute the conditional attribution scores 148 of the 'P' publishing channels (e.g. publishing channel 106), according to one embodiment. In operation 1814, the non-converting publisher attribution weighting and analytics server communicate the conditional attribution scores 148 of the 'P' publishing channels (e.g. publishing channel 106) to the marketer client 147 through the network, according to one embodiment.

Figure 19:
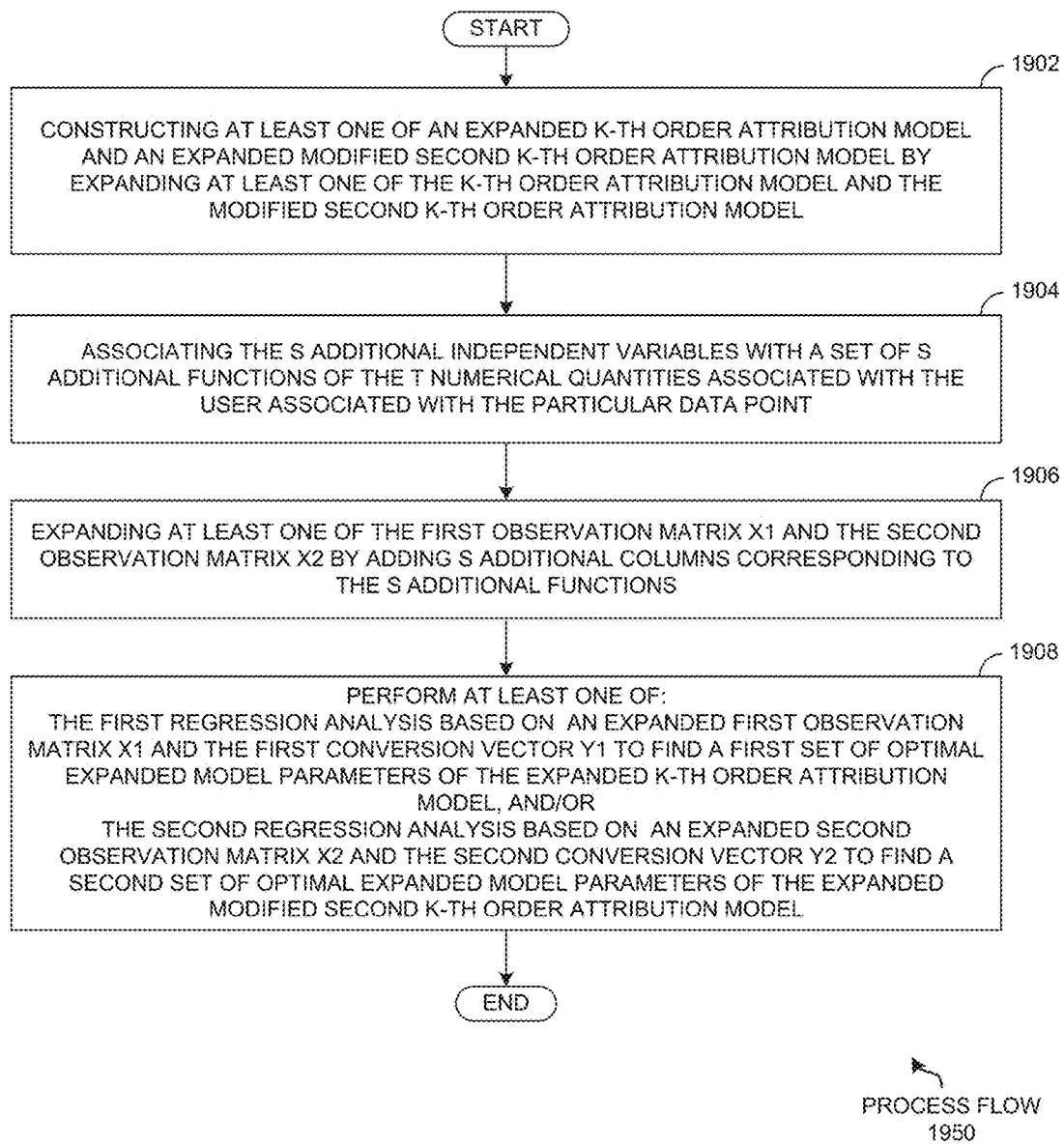
FIG. 19 is a process flow illustrating construction of an expanded K-th order attribution model and an expanded modified second K-th order attribution model by the non-converted publishing attribution weighting and analytics server of (e.g., attribution server) FIG. 1, according to one embodiment.

FIG. 19 is a process flow illustrating construction of an expanded K-th order attribution model and an expanded modified second K-th order attribution model by the non-converted publishing attribution weighting and analytics server of FIG. 1, according to one embodiment.

In operation 1902, the non-converting publisher attribution weighting and analytics server constructs at least one of an expanded 'K'-th order attribution model and an expanded modified second 'K'-th order attribution model 606 by expanding at least one of the K-th order attribution model 410 and the modified second K-th order attribution model 606, according to one embodiment.

In operation 1904, the non-converting publisher attribution weighting and analytics server associates the S additional independent variables with a set of S additional functions of the T numerical quantities associated with the user 138 associated with the particular data point 136, according to one embodiment.

In operation 1906, the non-converting publisher attribution weighting and analytics server expands at least one of the first observation matrix X1 402 and the second observation matrix X2 602 by adding S additional columns corresponding to the S additional functions, according to one embodiment.

In operation 1908, the non-converting publisher attribution weighting and analytics server performs at least one of: the first regression analysis 500 based on an expanded first observation matrix X1 and the first conversion vector Y1 to find a first set of optimal expanded model parameters of the expanded K-th order attribution model and/or the second regression analysis based on an expanded second observation matrix X2 and the second conversion vector Y2 to find a second set of optimal expanded model parameters of the expanded modified second K-th order attribution model, according to one embodiment.

Figure 20:
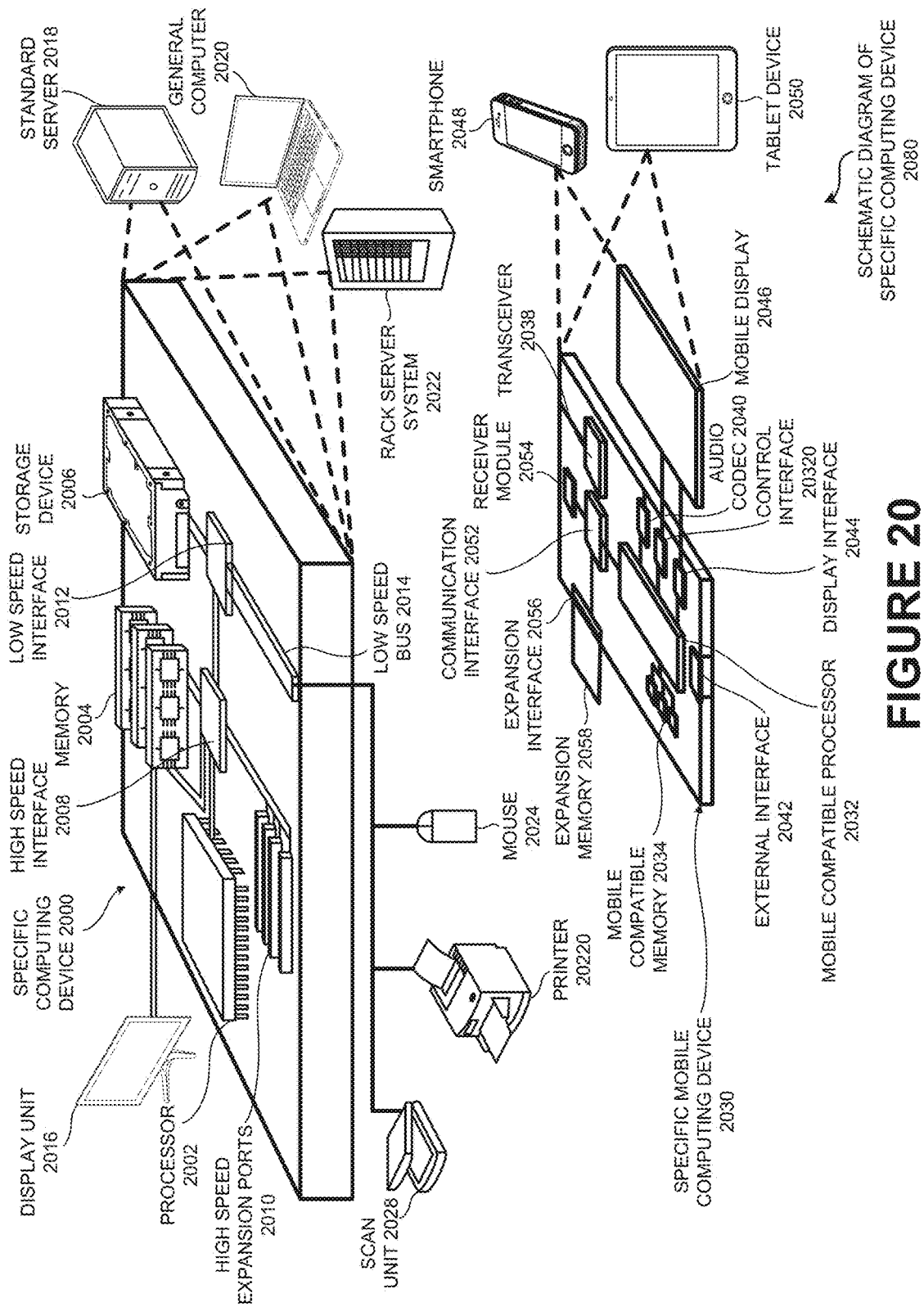
FIG. 20 is a schematic diagram of exemplary data processing devices that can be used to implement the methods and systems disclosed herein, according to one embodiment.

FIG. 20 is a schematic diagram of specific computing device 2080 and a specific mobile computing device 2030 that can be used to perform and/or implement any of the embodiments disclosed herein. In one or more embodiments, the attribution server 100 and/or the data collection server 118 illustrated in FIG. 1 may be the specific computing device 2000.

The specific computing device 2000 may represent various forms of digital computers, such as laptops, desktops, workstations, personal digital assistants, servers, blade servers, mainframes, and/or other appropriate computers. The specific mobile computing device 2030 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 2000 may include a processor 2002 (e.g. processor 102), a memory 2004 (e.g. memory 104), a storage device 2006, a high speed interface 2008 coupled to the memory 2004 (e.g. memory 104) and a plurality of high speed expansion ports 2010, and a low speed interface 2012 coupled to a low speed bus 2014 and a storage device 2006. In one embodiment, each of the components heretofore may be inter-coupled using various buses, and may be mounted on a common motherboard and/or in other manners as appropriate. The processor 2002 (e.g. processor 102) may process instructions for execution in the specific computing device 2000, including instructions stored in the memory 2004 (e.g. memory 104) and/or on the storage device 2006 to display a graphical information for a GUI on an external input/output device, such as a display unit 2016 coupled to the high speed interface 2008, according to one embodiment.

In other embodiments, multiple processors and/or multiple buses may be used, as appropriate, along with multiple memories and/or types of memory. Also, a plurality of computing device 2000 may be coupled with, with each device providing portions of the necessary operations (e.g., as a server bank, a group of blade servers, and/or a multi-processor system).

The memory 2004 (e.g. memory 104) may be coupled to the specific computing device 2000. In one embodiment, the memory 2004 (e.g. memory 104) may be a volatile memory. In another embodiment, the memory 2004 (e.g. memory 104) may be a non-volatile memory. The memory 2004 (e.g. memory 104) may also be another form of computer-readable medium, such as a magnetic and/or an optical disk.

The storage device 2006 may be capable of providing mass storage for the specific computing device 2000. In one embodiment, the storage device 2006 may be includes a floppy disk device, a hard disk device, an optical disk device, a tape device, a flash memory and/or other similar solid state memory device. In another embodiment, the storage device 2006 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 2004, the storage device 2006, a memory coupled to the processor 2002 (e.g. processor 102), and/or a propagated signal.

The high speed interface 2008 may manage bandwidth-intensive operations for the specific computing device 2000, while the low speed interface 2012 may manage lower bandwidth-intensive operations. Such allocation of functions is exemplary only. In one embodiment, the high speed interface 2008 may be coupled to the memory 2004 (e.g. memory 204), the display unit 2016 (e.g., through a graphics processor and/or an accelerator), and to the plurality of high speed expansion ports 2010, which may accept various expansion cards.

In the embodiment, the low speed interface 2012 may be coupled to the storage device 2006 and the low speed bus 2014. The low speed bus 2014 may be comprised of a wired and/or wireless communication port (e.g., a Universal Serial Bus ("USB"), a Bluetooth® port, an Ethernet port, and/or a wireless Ethernet port). The low speed bus 2014 may also be coupled to the scan unit 2028, a printer 2026, a keyboard, a mouse 2024, and a networking device (e.g., a switch and/or a router) through a network adapter.

The specific computing device 2000 may be implemented in a number of different forms, as shown in the figure. In one embodiment, the computing device 2000 may be implemented as a standard server 2018 and/or a group of such servers. In another embodiment, the specific computing device 2000 may be implemented as part of a rack server system 2022. In yet another embodiment, the specific computing device 2000 may be implemented as a general computer 2020 such as a laptop or desktop computer. Alternatively, a component from the specific computing device 2000 may be combined with another component in a specific mobile computing device 2030. In one or more embodiments, an entire system may be made up of a plurality of specific computing device 2000 and/or a plurality of specific computing device 2000 coupled to a plurality of specific mobile computing device 2030.

In one embodiment, the specific mobile computing device 2030 may include a mobile compatible processor 2032, a mobile compatible memory 2034, and an input/output device such as a mobile display 2046, a communication interface 2052, and a transceiver 2038, among other components. The specific mobile computing device 2030 may also be provided with a storage device 2006, such as a microdrive or other device, to provide additional storage. In one embodiment, the components indicated heretofore are inter-coupled using various buses, and several of the components may be mounted on a common motherboard.

The mobile compatible processor 2032 may execute instructions in the specific mobile computing device 2030, including instructions stored in the mobile compatible memory 2034. The mobile compatible processor 2032 may be implemented as a chipset of chips that include separate and multiple analog and digital processors. The mobile compatible processor 2032 may provide, for example, for coordination of the other components of the specific mobile computing device 2030, such as control of user interfaces, applications run by the specific mobile computing device 2030, and wireless communication by the specific mobile computing device 2030.

The mobile compatible processor 2032 may communicate with a user through the control interface 2036 and the display interface 2044 coupled to a mobile display 2046. In one embodiment, the mobile display 2046 may be a Thin-Film-Transistor Liquid Crystal Display ("TFT LCD"), an Organic Light Emitting Diode ("OLED") display, and another appropriate display technology. The display interface 2044 may comprise appropriate circuitry for driving the mobile display 2046 to present graphical and other information to a user. The control interface 2036 may receive commands from a user and convert them for submission to the mobile compatible processor 2032.

In addition, an external interface 2042 may be provide in communication with the mobile compatible processor 2032, so as to enable near area communication of the specific mobile computing device 2030 with other devices. External interface 2042 may provide, for example, for wired communication in some embodiments, or for wireless communication in other embodiments, and multiple interfaces may also be used.

The mobile compatible memory 2034 may be coupled to the specific mobile computing device 2030. The mobile compatible memory 2034 may be implemented as a volatile memory and a non-volatile memory. The expansion memory 2058 may also be coupled to the specific mobile computing device 2030 through the expansion interface 2056, which may comprise, for example, a Single In Line Memory Module ("SIMM") card interface. The expansion memory 2058 may provide extra storage space for the specific mobile computing device 2030, or may also store an application or other information for the specific mobile computing device 2030.

Specifically, the expansion memory 2058 may comprise instructions to carry out the processes described above. The expansion memory 2058 may also comprise secure information. For example, the expansion memory 2058 may be provided as a security module for the specific mobile computing device 2030, and may be programmed with instructions that permit secure use of the specific mobile computing device 2030. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 2034, the expansion memory 2058, a memory coupled to the mobile compatible processor 2032, and a propagated signal that may be received, for example, over the transceiver 2038 and/or the external interface 2042.

The specific mobile computing device 2030 may communicate wirelessly through the communication interface 2052, which may be comprised of a digital signal processing circuitry. The communication interface 2052 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 2038 (e.g., radio-frequency transceiver). In addition, short-range communication may occur, such as using a Bluetooth®, Wi-Fi, and/or other such transceiver. In addition, a GPS ("Global Positioning System") receiver module 2054 may provide additional navigation-related and location-related wireless data to the specific mobile computing device 2030, which may be used as appropriate by a software application running on the specific mobile computing device 2030.

The specific mobile computing device 2030 may also communicate audibly using an audio codec 2040, which may receive spoken information from a user and convert it to usable digital information. The audio codec 2040 may likewise generate audible sound for a user, such as through a speaker (e.g., in a handset smartphone of the specific mobile computing device 2030). Such a sound may comprise a sound from a voice telephone call, a recorded sound (e.g., a voice message, a music files, etc.) and may also include a sound generated by an application operating on the specific mobile computing device 2030.

The specific mobile computing device 2030 may be implemented in a number of different forms, as shown in the figure. In one embodiment, the specific mobile computing device 2030 may be implemented as a smartphone 2048. In another embodiment, the specific mobile computing device 2030 may be implemented as a personal digital assistant ("PDA"). In yet another embodiment, the specific mobile computing device, 2030 may be implemented as a tablet device 2050.

An example will now be described. STELLA AUTOS will be launching the 2017 model of its second generation electric car (set of purchasable items 112) in the end of 2016 and has allocated a budget for an extensive marketing campaign. A professional marketing campaign team (e.g. marketer client 147) is engaged to design and implement the most effective marketing campaign possible given the limited budget. The marketing campaign team knows that there are many publishers (e.g., publishing channels 106) available capable of reaching different segments of the consumers. While all publishers claim to be the best, the team knows that different publishers may be needed to reach the diverse segments of consumers. The team knows that some publishers may be synergetic to each other and thus are especially valuable. Thus the team hires a marketing analytic company Attribution iAnalytics (hereinafter "AiA") which has implemented the current invention in an attribution server 100 (e.g., a non-converting publisher attribution weighting and analytics server) with process 102 and memory 104. The team passes a list of publishers (set of P publishing channels 107) under consideration to AiA.

AiA decides the 2017 market campaign will be designed by analyzing marketing data 116 (a set of first marketing data 122 with N1 first data point 120 each with R types of data 142 and conversion value 140) of the 2016 marketing campaign (first marketing campaign 108) in which they publish advertisements (set of advertisements 111) of the 2016 model of its second generation electric car (set of purchasable items 112). As the marketing data of the 2016 marketing campaign (set of first marketing data 122) is limited and not comprehensive enough, AiA augments the marketing data 116 with marketing data (set of second marketing data 126 with N2 second data point 124 each with conversion value 134 and R types of data 142 such as impression data type 300, click-stream data type 302, event data type 304) of a few other 2015 and 2016 marketing campaigns (auxiliary marketing campaign 128) in which they launches several 2015 and 2016 non-electric vehicles including motorcycles, sedans, boats, and trucks (other purchasable items 132) under similar marketing situations (second marketing condition 134). Data points (e.g. a particular data point 136) are associated with users (e.g. user 138). Converted users 202 with associated purchase 204 and/or desirable action 205 are identified and positive conversion values 208 are assigned. Non-converted users 200 without any associated purchase 204 and/or desirable action 205 are identified and zero conversion values 206 are assigned.

The attribution server 100 (e.g., a non-converting publisher attribution weighting and analytics server) of AiA constructs a K-th order attribution model 410 with zero-th order terms (e.g. with zero-th order model parameter 420), first order linear terms (e.g. M first order linear terms 422) and second order cross terms (e.g. M(M−1)/2 second order cross terms 426). The attribution server 100 of AiA associates the dependent variable 414 with some function (e.g. second function 1306) of the conversion values 140 and associates independent variables 418 with some function (e.g. first set of M functions 432) of the R types of data 142. The attribution server 100 of AiA constructs the first conversion vector Y1 400 (using conversion values 140) and the first observation matrix X1 402 (e.g. using R types of data 142 such as impression data 301, click 303 and event 305) and performs the first regression analysis 500 and the refining steps 502 to obtain the first set of optimal model parameters 504 and the set of insignificant second order cross terms 506.

The attribution server 100 (e.g., a non-converting publisher attribution weighting and analytics server) of AiA constructs the modified second K-th order attribution model 606 (using modify 1000), the second conversion vector Y2 604. It also constructs the second observation matrix X2 602, and performs the second regression analysis 600 to get the second set of optimal model parameters 608. The attribution server 100 of AiA computes attribution score 148 (using attribution score compute 700) based on the K-th order attribution model 410, the modified second K-th order attribution model 606, the first set of optimal model parameters 504 and/or the second set of optimal model parameters 608.

The professional marketing campaign team (e.g. marketer client 147) sends a request 146 to the attribution server 100 of AiA. Upon receiving the request 146, the attribution server 100 of AiA communicates the attribution score 148 to the professional marketing campaign team (e.g. marketer client 147). Based on the attribution score 148, the professional marketing campaign team (e.g. marketer client 147) chooses some publishing channels 106 for the 2017 marketing campaign.

To gain insight into the detailed marketing behavior, the professional marketing campaign team (e.g. marketer client 147) makes additional requests for attribution scores 148 under special marketing conditions 1402 (e.g. male aged between 20 and 30 with at least a bachelor degree who like sports). Based on the special marketing condition 1402, the attribution server 100 of AiA constructs a third conversion vector Y3 1404 and a third observation matrix X3 1406 (using extract and derive 1400) and performs a third regression analysis 914 (e.g. using regression analysis 900). The attribution server 100 (e.g., a non-converting publisher attribution weighting and analytics server) of AiA re-computes a set of additional attribution score 702 (using attribution score compute 700) and sends the information to the professional marketing campaign team (e.g. marketer client 147). With the additional attribution scores, the professional marketing campaign team (e.g. marketer client 147) adds a new marketing element in the 2017 campaign to target a special segment of the consumer (special marketing condition 1402).

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a non-converting publisher attribution weighting and analytics server, comprising:
    determining 'P' number of publishing channels for advertisements in a first marketing campaign for a set of purchasable items using a processor and a memory communicatively coupled with the processor,
        wherein a marketing effectiveness of the P publishing channels in generating converted users each with at least one of a desirable action and a purchase from the set of purchasable items in the first marketing campaign are to be analyzed using the processor and the memory based on a set of marketing data from a data collection server in a cloud,
        wherein the set of marketing data comprises 'N1' number of first data points of a set of first marketing data collected in a first marketing condition in the first marketing campaign up to a time T1 and 'N2' number of second data points of a set of second marketing data collected in at least one auxiliary marketing campaign in a second marketing condition related to the first marketing condition, and
        wherein both the set of first marketing data and the set of second marketing data are subsets of the set of marketing data;
    determining that a particular data point among the N1 first data points is associated with a user, the particular data point being a set comprising:
        a conversion value associated with the user based on at least one of the desirable action, a first related action related to the desirable action, a second related action related to the purchase, an amount of the purchase, an amount of gained units of the purchase and a profit of the purchase,
            wherein the conversion value is non-negative, and
            wherein the conversion value is zero if the user is a non-converted user without the at least one of the desirable action and the purchase from the set of purchasable items, and
        at least one of 'R' number of types of marketing data associated with the user for each of the P publishing channels such that 'T' number of numerical quantities associated with the user are generated:
            wherein T is not greater than a multiplicative product of P and R;
    constructing a 'K'-th order attribution model where K is an integer greater than one, with the K-th order attribution model comprising:
        'M' number of independent variables comprising X_1, X_2, . . . , and X_M, and
        a dependent variable Y_1 to be estimated by a linear combination of more than one terms of the M independent variables, comprising:
            a zero-th order constant term with a zero-th order model parameter,
            M number of first order linear terms each comprising one of the M independent variables weighted by one of M number of first order model parameters, and
            (M)(M−1)/2 number of second order cross terms each comprising a first function of two of the M independent variables weighted by one of (M)(M−1)/2 number of second order model parameters;
    associating the M independent variables of the K-th order attribution model with a set of M functions of the T numerical quantities associated with the user associated with the particular data point;
    associating the dependent variable Y_1 of the K-th order attribution model with a second function of the conversion value associated with the user;
    determining a first observation matrix X1 of size N×M based on the set of the marketing data and the K-th order attribution model:
        wherein N=N1+N2,
        wherein N1 rows of the first observation matrix X1 to correspond to the N1 first data points of the set of first marketing data collected in the first marketing condition in the first marketing campaign up to the time T1,
        wherein N2 rows of the first observation matrix X1 to correspond to the N2 second data points of the set of second marketing data collected in the at least one auxiliary marketing campaign in the second marketing condition related to the first marketing condition, and
        wherein M columns of the first observation matrix X1 to correspond to the set of M functions associated with the M independent variables of the K-th order attribution model applied to the T numerical quantities associated with data points of the set of marketing data;
    determining a first conversion vector Y1 of size N×1 based on set of the marketing data:
        wherein N1 elements of the first conversion vector Y1 to comprise the second function of the conversion values of the N1 first data points of the set of first marketing data collected in the first marketing condition in the first marketing campaign up to the time T1, wherein N2 elements of the first conversion vector Y1 to comprise the second function of the conversion values of the N2 second data points of the set of second marketing data collected in the at least one auxiliary marketing campaign in the second marketing condition related to the first marketing condition, wherein all positive conversion values corresponding to a first set of converted users associated with the N1 first data points of the set of first marketing data are not less than a first positive threshold 'TH1', wherein all positive conversion values corresponding to a second set of converted users associated with the N2 second data points of the set of second marketing data are not less than a second positive threshold 'TH2', and wherein TH2 is not greater than TH 1;

performing a first regression analysis based on the first observation matrix X1 and the first conversion vector Y1 to find a first set of optimal model parameters of the K-th order attribution model that best estimate the dependent variable Y_1 by the linear combination of the more than one terms of the M independent variables with respect to a first goodness-of-fit measure;

performing at least one refining step to identify a set of insignificant second order cross terms of the K-th order attribution model;

constructing a second K-th order attribution model which is the K-th order attribution model with:
the M independent variables comprising X_1, X_2, . . . , and X_M, and
the dependent variable Y_1 to be estimated by the linear combination of more than one terms of the M independent variables, comprising:
the zero-th order constant term with the zero-th order model parameter,
the M first order linear terms each comprising one of the M independent variables weighted by one of the M first order model parameters, and
the (M)(M−1)/2 second order cross terms each comprising the first function of two of the M independent variables weighted by one of the (M)(M−1)/2 second order model parameters minus the set of insignificant second order cross terms of the K-th order attribution model identified in the at least one refining step;

construct a modified second K-th order attribution model by replacing the first function of two of the M independent variables in the second K-th order attribution model by a third function of two of the M independent variables;

associating the M independent variables of the modified second K-th order attribution model with a second set of M functions of the T numerical quantities associated with the user;

associating the dependent variable Y_1 of the modified second K-th order attribution model with a fourth function of the conversion value associated with the user;

determining a second observation matrix X2 of size N×(M2) based on the set of marketing data, the modified second K-th order attribution model, and the second set of M functions:
wherein M2 is not less than M,
wherein M2 is not greater than M+(M)(M−1)/2 when K=2,
wherein M columns of the second observation matrix X2 to correspond to the second set of M functions associated with the M independent variables of the modified second K-th order attribution model applied to the T numerical quantities associated with data points of the set of marketing data; and
wherein (M2−M) columns of the second observation matrix X2 to each correspond to the third function of two quantities in the second order cross terms of the modified second K-th order attribution model, each of the two quantities being one of the second set of M functions applied to the T numerical quantities associated with the data points of the set of marketing data;

determining a second conversion vector Y2 of size N×1 based on the set of marketing data:
where the N elements of the second conversion vector Y2 is the fourth function of the conversion values of the N data points of the set of marketing data;

performing a second regression analysis based on the second observation matrix X2 and the second conversion vector Y2 to find a second set of optimal model parameters of the modified second K-th order attribution model that best estimate the dependent variable Y_1 by the linear combination of the more than one terms of the M independent variables with respect to a second goodness-of-fit measure;

computing attribution scores associated with the P publishing channels based on the K-th order attribution model, the modified second K-th order attribution model, the first set of optimal model parameters and the second set of optimal model parameters;

receiving a request through a network for the attribution scores associated with the P publishing channels from a marketer client communicatively connected to the processor and the memory through the network; and communicating the attribution scores associated with the P publishing channels to the marketer client through the network.

2. The method of the non-converting publisher attribution weighting and analytics server of claim 1:
wherein N2=0 such that the set of second marketing data collected in the at least one auxiliary marketing campaign in the second marketing condition related to the first marketing condition is not used.

3. The method of the non-converting publisher attribution weighting and analytics server of claim 1:
wherein the N2 second data points of the set of second marketing data collected in the at least one auxiliary marketing campaign in the second marketing condition related to the first marketing condition are chosen according to criteria associated with at least one of the first marketing condition of the first marketing campaign, a history of past marketing conditions and a relevancy factor of marketing conditions;

wherein the R types of marketing data associated with the user to comprise at least one of a click-stream data type, an impression data type and an event data type, each associated with P numerical quantities associated with the user;

wherein each of the P numerical quantities associated with the click-stream data type is associated with:
a set of clicks associated with the user and one of the P publishing channels, and
a set of timings corresponding to the set of clicks;

wherein each of the P numerical quantities associated with the impression data type is associated with:
a set of impressions associated with the user and one of the P publishing channels, and
a set of timings corresponding to the set of impressions; and
wherein each of the P numerical quantities associated with the event data type is associated with:
a set of enumerated relevant events associated with the user and one of the P publishing channels, and
a set of timings corresponding to the set of enumerated relevant events.

4. The method of the non-converting publisher attribution weighting and analytics server of claim 1:
wherein one of the set of M functions of the T numerical quantities associated with the user associated with the M independent variables of the K-th order attribution model is at least one of a particular numerical quantity associated with a particular type of marketing data and an aggregation of numerical quantities associated with the particular type of marketing data; and
wherein the second function of the conversion value associated with the user associated with the dependent variable $Y\_1$ of the K-th order attribution model is the conversion value associated with the user.

5. The method of the non-converting publisher attribution weighting and analytics server of claim 1:
wherein a numerical quantity associated with the user is set to be zero if corresponding type of marketing data of corresponding publishing channel associated with the user is not available.

6. The method of the non-converting publisher attribution weighting and analytics server of claim 1:
wherein elements of the first observation matrix X1 associated with the user and elements of the first conversion vector Y1 associated with the user are scaled by a scaling factor smaller than one when the particular data point associated with the user is determined to be less reliable so as to reduce the impact of less reliable data, and
wherein the scaling factor is adaptively determined based on a measure of reliability of the particular data point.

7. The method of the non-converting publisher attribution weighting and analytics server of claim 1:
wherein at least one of the first regression analysis and the second regression analysis comprise an application of at least one of a numerical minimization algorithm, a linear regression algorithm, and a factorization machine algorithm.

8. The method of the non-converting publisher attribution weighting and analytics server of claim 1:
wherein at least one of the first goodness-of-fit measure and the second goodness-of-fit measure is at least one of a sum of square error, a sum of absolute error, a sum of high order error, a sum of robust error, a weighted sum of square error, a weighted sum of absolute error, a weighted sum of high order error, and a weighted sum of robust error;
wherein each robust error to comprise:
square error for error magnitude less than a threshold 'TH5', and
absolute error for error magnitude greater than the threshold TH5.

9. The method of the non-converting publisher attribution weighting and analytics server of claim 1:
wherein the first regression analysis to comprise the application of a numerical minimization algorithm and a factorization machine algorithm to obtain a factorized matrix V of size M×L, where L is an integer not greater than M;
wherein the at least one refining step comprises a first step and a second step to identify the set of insignificant second order cross terms of the K-th order attribution model;
wherein the first step to comprise:
computing a matrix $Q=V*(V\textasciicircum T)$ of size M×M which is the matrix multiplication of the factorized matrix V and its matrix transpose,
computing a row mean rowMean_Q and a row standard deviation rowSD_Q for each row of the matrix Q, and
identifying all elements in the row of the matrix Q that are less than a row-adaptive threshold 'TH3' and classifying them as unimportant, wherein TH3=rowMean_Q+C*rowSD_Q is the row mean plus A times row standard deviation, wherein C is greater than 1;
wherein the second step to comprise, for a second order cross term with two independent variables $X\_i$ and $X\_j$:
identifying all of 'A' number of data points in which both $X\_i$ and $X\_j$ are collected,
determining 'B' number of converted users among the A data points in which both $X\_i$ and $X\_j$ are collected, and
classifying the second order cross term with the two independent variables $X\_i$ and $X\_j$ as unimportant if a monotonic non-decreasing function of the fraction B/A is less than a threshold 'TH4'; and
wherein a second order cross term being classified as unimportant by at least one of the first step and the second step is identified as insignificant.

10. The method of the non-converting publisher attribution weighting and analytics server of claim 1:
wherein the first function of two of the M independent variables in the second order cross terms of the K-th order attribution model is at least one of the multiplicative product of the two independent variables or a Boolean product wherein true is analogous to 1 and false is analogous to 0, and where inputs to the product are any one of true and false where a numerical quantity associated with the marketing data point is determined the be any one of greater than and less than 0 and where numerical quantities are translated to Boolean values via a policy function that takes a numerical quantity as input and produces a Boolean value as output; and
wherein the third function of two of the M independent variables in the second order cross terms of the modified second K-th order attribution model is at least one of a mean square, a root mean square, an arithmetic mean, a geometric mean and a harmonic mean of the two of the M independent variables.

11. The method of the non-converting publisher attribution weighting and analytics server of claim 1:
wherein the attribution score of a publishing channel is based on:
selected first order linear terms of the K-th order attribution model associated with the publishing channel,
selected first order linear terms of the modified second K-th order attribution model associated with the publishing channel,
selected second order cross terms of the K-th order attribution model associated with the publishing channel, and selected second order cross terms of the modified second K-th order attribution model associated with the publishing channel.

12. The method of the non-converting publisher attribution weighting and analytics server of claim 1, further comprising:
receiving another request through the network for conditional attribution scores of the P publishing channels under a specific condition from the marketer client;
extracting and deriving:
a first subset of the N1 first data points of the set of first marketing data under the specific condition, and
a second subset of the N2 second data points of the set of second marketing data under the specific condition;
determining a third observation matrix X3 and a third conversion vector Y3 based on:
the first subset of the N1 first data points, and
the second subset of the N2 second data points;
performing a third regression analysis based on the third observation matrix X3 and the third conversion vector Y3 to find a third set of optimal model parameters of the modified second K-th order attribution model that best estimate the dependent variable Y_1 by the linear combination of the more than one term of the M independent variables with respect to a third goodness-of-fit measure;
computing the conditional attribution scores of the P publishing channels based on at least one of:
the K-th order attribution model,
the second K-th order attribution model,
the modified second K-th order attribution model,
the first set of optimal model parameters,
the second set of optimal model parameters, and
the third set of optimal model parameters; and
communicating the conditional attribution scores of the P publishing channels to the marketer client through the network.

13. The method of the non-converting publisher attribution weighting and analytics server of claim 1, further comprising:
constructing at least one of an expanded K-th order attribution model and an expanded modified second K-th order attribution model by expanding at least one of the K-th order attribution model and the modified second K-th order attribution model to include:
'S' number of additional independent variables X_(M+1), ..., X_(M+S), and
S additional first order linear terms for the S additional independent variables;
associating the S additional independent variables with a set of S additional functions of the T numerical quantities associated with the user associated with the particular data point;
expanding at least one of the first observation matrix X1 and the second observation matrix X2 by adding S additional columns corresponding to the S additional functions; and
performing at least one of:
the first regression analysis based on an expanded first observation matrix X1 and the first conversion vector Y1 to find a first set of optimal expanded model parameters of the expanded K-th order attribution model, and
the second regression analysis based on an expanded second observation matrix X2 and the second conversion vector Y2 to find a second set of optimal expanded model parameters of the expanded modified second K-th order attribution model.

14. The method of the non-converting publisher attribution weighting and analytics server of claim 1:
wherein at least one of the first goodness-of-fit measure and the second goodness-of-fit measure is at least one of a weighted sum of square error, a weighted sum of absolute error, a weighted sum of high order error, and a weighted robust error measure;
wherein errors corresponding to the N1 first data points have larger weights than errors corresponding to the N2 second data points in the at least one of the weighted sum of square error, the weighted sum of absolute error, the weighted sum of high order error, and the weighted robust error measure, so that the N1 first data points have larger influence than the N2 second data points in at least one of the first regression analysis and the second regression analysis.

15. A method of a non-converting publisher attribution weighting and analytics server, comprising:
determining 'P' number of publishing channels for advertisements in a marketing campaign for a set of purchasable items using a processor and a memory communicatively coupled with the processor,
wherein a marketing effectiveness of the P publishing channels in generating converted users each with at least one of a desirable action and a purchase from the set of purchasable items in the marketing campaign are to be analyzed using the processor and the memory based on a set of marketing data from a data collection server in a cloud, and
wherein the set of marketing data comprises 'N' number of data points of marketing data collected in the marketing campaign;
determining that a particular data point among the N data points is associated with a user, the particular data point being a set comprising:
a conversion value based on at least one of the desirable action, a first related action related to the desirable action, a second related action related to the purchase, an amount of the purchase, an amount of gained units of the purchase and a profit of the purchase,
wherein the conversion value is non-negative, and
wherein the conversion value is zero if the user is a non-converted user without the at least one of the desirable action and the purchase from the set of purchasable items, and
at least one of 'R' number of types of marketing data associated with the user for each of the P publishing channels such that 'T' number of numerical quantities associated with the user are generated;
constructing a 'K'-th order attribution model where K is an integer greater than one, with the K-th order attribution model comprising:
M number of independent variables comprising X_1, X_2, ..., and X_M, and
a dependent variable Y_1 to be estimated by a linear combination of more than one terms of the independent variables, comprising:
a zero-th order constant term with a zero-th order model parameter,
M number of first order linear terms each comprising one of the M independent variables weighted by one of M number of first order model parameters, and (M)(M−1)/2 number of second order cross terms each comprising a first function of two of the M independent variables weighted by one of (M)(M−1)/2 number of second order model parameters;

associating the M independent variables of the K-th order attribution model with a set of M functions of the T numerical quantities associated with the user associated with the particular data point,
  wherein each of the set of M functions is at least one of a particular numerical quantity associated with a particular type of marketing data and an aggregation of the T numerical quantities associated with the particular type of marketing data;

associating the dependent variable Y_1 of the K-th order attribution model with a second function of the conversion value associated with the user;

determining a first observation matrix X1 of size N×M based on the set of marketing data and the K-th order attribution model:
  wherein N rows of the first observation matrix X1 to correspond to the N data points of the marketing data collected in the marketing campaign, and
  wherein M columns of the first observation matrix X1 to correspond to the set of M functions associated with the M independent variables of the K-th order attribution model applied to the T numerical quantities associated with data points of the set of marketing data;

determining a first conversion vector Y1 of size N×1, with N elements of the first conversion vector Y1 being the second function of conversion values of the N data points of the marketing data collected in the marketing campaign,
  wherein all positive conversion values corresponding to a set of converted users associated with the N data points are not less than a positive threshold 'TH1';

performing a first regression analysis based on the first observation matrix X1 and the first conversion vector Y1 to find a first set of optimal model parameters of the K-th order attribution model that best estimate the dependent variable Y_1 by the linear combination of the more than one terms of the M independent variables with respect to a first goodness-of-fit measure,
  wherein the first regression analysis comprises an application of a gradient descent algorithm which is a minimization algorithm and a factorization machine algorithm to obtain a factorized matrix V of size M×L, where L is an integer not greater than M;

performing a first refining step and a second refining step to identify a set of insignificant second order cross terms of the K-th order attribution model,
  wherein the first refining step to comprise, for a second order cross term with two independent variables X_i and X_j:
    computing a matrix Q=V*(V^T) of size M×M which is the matrix multiplication of the factorized matrix V and its matrix transpose, and
    classifying the second order cross term with the two independent variables X_i and X_j as unimportant if (ij)-th element of matrix Q is less than a 'TH3' percentile in i-th row of the matrix Q in terms of absolute magnitude,
  wherein the second refining step to comprise, for the second order cross term with two independent variables X_i and X_j:
    classifying the second order cross term with the two independent variables X_i and X_j as unimportant if percentage of the converted users among the data points in which both X_i and X_j are collected is smaller than a threshold 'TH4', and
  wherein the second order cross term being classified as unimportant by at least one of the first refining step and the second refining step is identified as insignificant;

constructing a second K-th order attribution model which is the K-th order attribution model minus the set of insignificant second order cross terms identified in the first refining step and the second refining step;

construct a modified second K-th order attribution model by replacing the first function of two of the M independent variables in the second K-th order attribution model by a third function of two of the M independent variables;

associating the M independent variables of the modified second K-th order attribution model with a second set of M functions of the T numerical quantities associated with the user;

associating the dependent variable Y_1 of the modified second K-th order attribution model with a fourth function of the conversion value associated with the user;

determining a second observation matrix X2 of size N×(M2) based on the set of marketing data, the modified second K-th order attribution model, and the second set of M functions:
  wherein M2 is not less than M,
  wherein M2 is not greater than M+(M)(M−1)/2,
  wherein M columns of the second observation matrix X2 to correspond to the M columns of the first observation matrix X1 with the set of M functions replaced by the second set of M functions, and
  wherein (M2−M) columns of the second observation matrix X2 to each correspond to the third function of two through K quantities in the second order cross terms of the modified second K-th order attribution model, each of the two quantities being one of the second set of M functions applied to the T numerical quantities associated with data points of the set of marketing data;

determining a second conversion vector Y2 of size N×1 based on the marketing data:
  wherein the second conversion vector Y2 is the first conversion vector Y1 with the second function replaced by the fourth function;

performing a second regression analysis based on the second observation matrix X2 and the second conversion vector Y2 to find a second set of optimal model parameters of the modified second K-th order attribution model that best estimate the dependent variable Y_1 by the linear combination of the more than one terms of the M independent variables with respect to a second goodness-of-fit measure;

computing attribution scores associated with the P publishing channels based on the K-th order attribution model, the modified second K-th order attribution model, the first set of optimal model parameters and the second set of optimal model parameters;

receiving a request through a network for the attribution scores associated with the P publishing channels from a marketer client communicatively connected to the processor and the memory through the network; and communicating the attribution scores associated with the P publishing channels to the marketer client through the network.

16. The method of the non-converting publisher attribution weighting and analytics server of claim 15, comprising:
wherein each of the T numerical quantities associated with the user is set to be zero if the corresponding type of marketing data of the user is at least one of "not available" and "non-existent".

17. The method of the non-converting publisher attribution weighting and analytics server of claim 15, comprising:
wherein at least one of the first goodness-of-fit measure and the second goodness-of-fit measure is at least one of a sum of square error, a sum of absolute error, a sum of high order error, a sum of robust error, a weighted sum of square error, a weighted sum of absolute error, a weighted sum of high order error, and a weighted sum of robust error, and
wherein each robust error to comprise:
square error for error magnitude less than a threshold 'TH5', and
absolute error for error magnitude greater than the threshold TH5.

18. A method of a non-converting publisher attribution weighting and analytics server, comprising:
determining 'P' number of publishing channels for advertisements in a marketing campaign for a set of purchasable items using a processor and a memory communicatively coupled with the processor,
wherein a marketing effectiveness of the P publishing channels in generating converted users each with at least one of a desirable action and a purchase from the set of purchasable items in the marketing campaign are to be analyzed using the processor and the memory based on a set of marketing data from a data collection server in a cloud, and
wherein the set of marketing data comprises 'N' number of data points of marketing data collected in the marketing campaign from time T1 to time T2;
determining that a particular data point among the N data points is associated with a user, the particular data point being a set comprising:
a conversion value based on at least one of the desirable action, a first related action related to the desirable action, a second related action related to the purchase, an amount of the purchase, an amount of gained units of the purchase and a profit of the purchase,
wherein the conversion value is non-negative, and
wherein the conversion value is zero if the user is a non-converted user without the at least one of the desirable action and the purchase from the set of purchasable items, and
at least one of 'R' number of types of marketing data associated with the user for each of the P publishing channels such that 'T' number of numerical quantities associated with the user are generated;
constructing a 'K'-th order attribution model where K is an integer greater than one, with the K-th order attribution model comprising:
M number of independent variables comprising $X\_1, X\_2, \ldots,$ and $X\_M$, and
a dependent variable $Y\_1$ to be estimated by a linear combination of more than one terms of the independent variables, comprising:
a zero-th order constant term with a zero-th order model parameter,
M number of first order linear terms each comprising one of the M independent variables weighted by one of M number of first order model parameters, and
(M)(M−1)/2 number of second order cross terms each comprising a first function of two of the M independent variables weighted by one of (M)(M−1)/2 number of second order model parameters,
wherein the first function of the two independent variables is the multiplication of the two independent variables;
associating the M independent variables of the K-th order attribution model with a set of M functions of the T numerical quantities associated with the user associated with the particular data point,
wherein each of the M functions is at least one of a particular numerical quantity associated with a particular type of marketing data and a collection of numerical quantities associated with the particular type of marketing data to provide a flexibility to internally perform aggregations and other calculations;
associating the dependent variable $Y\_1$ of the K-th order attribution model with a second function of the conversion value associated with the user,
wherein the second function of the conversion value is the conversion value;
determining a first observation matrix X1 of size N×M based on the marketing data and the K-th order attribution model:
wherein N rows of the first observation matrix X1 to correspond to the N data points of the marketing data collected in the marketing campaign, and
wherein M columns of the first observation matrix X1 to correspond to the set of M functions associated with the M independent variables of the K-th order attribution model applied to the T numerical quantities associated with the N data points of the set of marketing data;
determining a first conversion vector Y1 of size N×1, with N elements of the first conversion vector Y1 being conversion values of the N data points of the marketing data collected in the marketing campaign,
wherein all positive conversion values corresponding to a set of converted users associated with the N data points are not less than a positive threshold 'TH1';
performing a first regression analysis based on the first observation matrix X1 and the first conversion vector Y1 to find a first set of optimal model parameters of the K-th order attribution model that best estimate the dependent variable $Y\_1$ by the linear combination of the more than one terms of the independent variables with respect to a first goodness-of-fit measure,
wherein the first regression analysis comprises the application of a gradient descent algorithm which is a minimization algorithm and a factorization machine algorithm to obtain a factorized matrix V of size M×L, where L is an integer not greater than M;
performing at least one refining step to identify a set of insignificant second order cross terms of the K-th order attribution model,
wherein the at least one refining step to comprise:
computing a matrix $Q=V*(V^{\wedge}T)$ of size M×M which is the matrix multiplication of the factorized matrix V and its matrix transpose, compute a row mean rowMean_Q and a row standard deviation rowSD_Q for each row of matrix Q, and identifying all elements in the row of matrix Q that are less than a row-adaptive threshold 'TH3' as insignificant, where TH3=rowMean_Q+ C*rowSD_Q is the row mean plus C times row standard deviation, wherein C is greater than 0.0 and less than <3, and wherein the at least one refining step to further comprise, for each of the second order cross term with two independent variables:

identifying all of 'A' number of data points in which the two independent variables are collected, determining 'B' number of converted users among the A data points in which the two independent variables are collected, and identifying the second order cross term with the two independent variables as insignificant if the fraction B/A is less than a threshold 'TH4';

constructing a second K-th order attribution model which is the K-th order attribution model minus the set of insignificant second order cross terms identified in the first refining step and the second refining step;

construct a modified second K-th order attribution model by replacing the first function of two of the M independent variables in the second K-th order attribution model by a third function of two of the M independent variables;

associating the M independent variables of the modified second K-th order attribution model with a second set of M functions of the T numerical quantities associated with the user;

associating the dependent variable Y_1 of the modified second K-th order attribution model with a fourth function of the conversion value associated with the user;

determining a second observation matrix X2 of size N×(M2) based on the set of marketing data, the modified second K-th order attribution model, and the second set of M functions:

wherein M2 is not less than M, wherein M columns of the second observation matrix X2 to correspond to the M columns of the first observation matrix X1 with the set of M functions replaced by the second set of M functions, and wherein (M2−M) columns of the second observation matrix X2 to each correspond to the third function of two quantities in the second order cross terms of the modified second K-th order attribution model, each of the two quantities being one of the second set of M functions applied to the T numerical quantities associated with data points of the set of marketing data;

determining a second conversion vector Y2 of size N×1 based on the marketing data:

wherein the second conversion vector Y2 is the first conversion vector Y1 with the second function replaced by the fourth function;

performing a second regression analysis based on the second observation matrix X2 and the second conversion vector Y2 to find a second set of optimal model parameters of the modified second K-th order attribution model that best estimate the dependent variable Y_1 by the linear combination of the more than one terms of the independent variables with respect to a second goodness-of-fit measure;

computing attribution scores associated with the P publishing channels based on the K-th order attribution model, the modified second K-th order attribution model, the first set of optimal model parameters and the second set of optimal model parameters;

receiving a request through a network for the attribution scores associated with the P publishing channels from a marketer client communicatively connected to the processor and the memory through the network; and communicating the attribution scores associated with the P publishing channels to the marketer client through the network.

19. The method of the non-converting publisher attribution weighting and analytics server of claim 18, further comprising:

receiving an another request through the network for conditional attribution scores of the P publishing channels under a specific condition from the marketer client;

extracting and deriving another data set from the N data points of the set of marketing data under the specific condition;

determining a third observation matrix X3 and a third conversion vector Y3 based on the another data set;

performing a third regression analysis based on the third observation matrix X3 and the third conversion vector Y3 to find a third set of optimal model parameters of the modified second K-th order attribution model that best estimate the dependent variable Y_1 by the linear combination of the more than one terms of the M independent variable with respect to a third goodness-of-fit measure;

computing the conditional attribution scores of the P publishing channels based on at least one of:

the K-th order attribution model, the second K-th order attribution model the modified second K-th order attribution model, the first set of optimal model parameters, the second set of optimal model parameters, and the third set of optimal model parameters; and communicating the conditional attribution scores of the P publishing channels to the marketer client through the network.

20. The method of the non-converting publisher attribution weighting and analytics server of claim 18, further comprising:

constructing at least one of an expanded K-th order attribution model and an expanded modified second K-th order attribution model by expanding at least one of the K-th order attribution model and the modified second K-th order attribution model to include:

'S' number of additional independent variables X_(M+ 1), . . . , X_(M+S), and

S additional first order linear terms for the S additional independent variables;

associating the S additional independent variables with a set of S additional functions of the T numerical quantities associated with the user associated with the particular data point;

expanding at least one of the first observation matrix X1 and the second observation matrix X2 by adding S additional columns corresponding to the S additional functions; and performing at least one of:

the first regression analysis based on an expanded first observation matrix X1 and the first conversion vector Y1 to find a first set of optimal expanded model parameters of the expanded K-th order attribution model, and the second regression analysis based on an expanded second observation matrix X2 and the second conversion vector Y2 to find a second set of optimal expanded model parameters of the expanded modified second K-th order attribution model.

* * * * *